United States Patent
Davidson

(10) Patent No.: US 8,244,882 B2
(45) Date of Patent: Aug. 14, 2012

(54) ON-DEMAND INSTANTIATION IN A HIGH-PERFORMANCE COMPUTING (HPC) SYSTEM

(75) Inventor: Shannon V. Davidson, Hillsboro, MO (US)

(73) Assignee: Raytheon Company, Waltham, MA (US)

(*) Notice: Subject to any disclaimer, the term of this patent is extended or adjusted under 35 U.S.C. 154(b) by 814 days.

(21) Appl. No.: 10/991,994

(22) Filed: Nov. 17, 2004

(65) Prior Publication Data

US 2006/0117208 A1  Jun. 1, 2006

(51) Int. Cl.
*G06F 15/16* (2006.01)

(52) U.S. Cl. .......................................... 709/228

(58) Field of Classification Search ............. 709/220, 709/224, 225, 227, 228
See application file for complete search history.

(56) References Cited

U.S. PATENT DOCUMENTS

| | | |
|---|---|---|
| 4,868,818 A | 9/1989 | Madan |
| 4,885,770 A | 12/1989 | Croll |
| 5,020,059 A | 5/1991 | Gorin et al. |
| 5,280,607 A | 1/1994 | Bruck et al. |
| 5,301,104 A | 4/1994 | Yalamanchili et al. |
| 5,450,578 A | 9/1995 | Mackenthun |
| 5,513,313 A | 4/1996 | Bruck et al. |
| 5,603,044 A | 2/1997 | Annapareddy et al. |
| 5,682,491 A | 10/1997 | Pechanek et al. |
| 5,748,872 A | 5/1998 | Norman |
| 5,748,882 A | 5/1998 | Huang |
| 5,781,715 A | 7/1998 | Sheu |
| 5,805,785 A | 9/1998 | Dias et al. |
| 5,872,928 A | 2/1999 | Lewis et al. ............... 395/200.52 |
| 5,889,953 A | 3/1999 | Thebaut et al. ........... 395/200.51 |
| 5,926,619 A | 7/1999 | Badovinatz et al. |
| 5,933,631 A | 8/1999 | Mealey et al. |
| 5,991,877 A | 11/1999 | Luckenbaugh ................ 713/200 |
| 6,006,242 A | 12/1999 | Poole et al. .................... 707/531 |
| 6,029,246 A | 2/2000 | Bahr .............................. 713/200 |
| 6,088,330 A | 7/2000 | Bruck et al. |
| 6,158,010 A | 12/2000 | Moriconi et al. ............. 713/201 |
| 6,167,502 A | 12/2000 | Pechanek et al. |
| 6,189,100 B1 | 2/2001 | Barr et al. ...................... 713/182 |
| 6,230,252 B1 | 5/2001 | Passint et al. |
| 6,393,581 B1 | 5/2002 | Friedman |

(Continued)

FOREIGN PATENT DOCUMENTS

EP        0 981 089 A2    2/2000

(Continued)

OTHER PUBLICATIONS

Cisco LcalDirector Configuration and Command Reference Guide, Apr. 4, 2001, XP-002352335, p. 1-1-1-5, 3-2-3-9.*

(Continued)

*Primary Examiner* — Moustafa M Meky
*Assistant Examiner* — Hee Soo Kim
(74) *Attorney, Agent, or Firm* — Cantor Colburn LLP

(57) ABSTRACT

In one embodiment, a method for on-demand instantiation in a high-performance computing (HPC) system includes receiving a connection request from a client specifying a first port number and a first host name advertised externally with respect to an HPC server including a cluster of nodes, identifying a service at the HPC server corresponding to the first port number and the first host name, determining whether the identified service is available, and, if the identified service is available, instantiating a host providing the identified service at one or more nodes in the cluster.

29 Claims, 12 Drawing Sheets

U.S. PATENT DOCUMENTS

| | | | |
|---|---|---|---|
| 6,408,326 B1 | 6/2002 | Larsson et al. | 709/201 |
| 6,415,323 B1* | 7/2002 | McCanne et al. | 709/225 |
| 6,453,426 B1 | 9/2002 | Gamache et al. | |
| 6,460,149 B1 | 10/2002 | Rowlands et al. | |
| 6,477,663 B1 | 11/2002 | Laranjeira et al. | |
| 6,480,972 B1 | 11/2002 | Bauman et al. | |
| 6,496,941 B1 | 12/2002 | Segal et al. | |
| 6,597,956 B1 | 7/2003 | Aziz et al. | |
| 6,629,266 B1 | 9/2003 | Harper et al. | |
| 6,633,945 B1 | 10/2003 | Fu et al. | 710/316 |
| 6,658,504 B1 | 12/2003 | Lieber | |
| 6,675,264 B2 | 1/2004 | Chen et al. | 711/141 |
| 6,683,696 B1 | 1/2004 | Urie et al. | |
| 6,691,165 B1 | 2/2004 | Bruck et al. | 709/227 |
| 6,718,486 B1 | 4/2004 | Rosellin et al. | |
| 6,735,660 B1 | 5/2004 | Osten et al. | |
| 6,748,437 B1* | 6/2004 | Modi et al. | 709/227 |
| 6,820,221 B2 | 11/2004 | Fleming | |
| 6,853,388 B2 | 2/2005 | Ueno et al. | |
| 6,918,051 B2 | 7/2005 | Block et al. | |
| 6,918,063 B2 | 7/2005 | Ho et al. | |
| 6,922,791 B2 | 7/2005 | Mashayekhi et al. | |
| 6,950,818 B2 | 9/2005 | Dennis et al. | 707/3 |
| 6,950,833 B2 | 9/2005 | Costello et al. | 707/201 |
| 6,952,766 B2 | 10/2005 | Dervin et al. | |
| 7,016,299 B2 | 3/2006 | Kashyan | |
| 7,028,228 B1 | 4/2006 | Lovy et al. | |
| 7,032,119 B2 | 4/2006 | Fung | |
| 7,043,539 B1 | 5/2006 | Treiber et al. | |
| 7,046,687 B1 | 5/2006 | Brown et al. | 370/412 |
| 7,055,148 B2 | 5/2006 | Marsh et al. | 717/172 |
| 7,065,764 B1 | 6/2006 | Prael et al. | 718/102 |
| 7,073,053 B1 | 7/2006 | Oz et al. | 713/2 |
| 7,093,004 B2 | 8/2006 | Bernardin et al. | |
| 7,107,337 B2 | 9/2006 | Barrow et al. | 709/224 |
| 7,127,597 B2 | 10/2006 | Backman et al. | |
| 7,155,512 B2* | 12/2006 | Lean et al. | 709/224 |
| 7,207,039 B2 | 4/2007 | Komarla et al. | |
| 7,231,430 B2 | 6/2007 | Brownell et al. | |
| 7,237,129 B2 | 6/2007 | Fung | |
| 7,287,179 B2 | 10/2007 | Doyle et al. | |
| 7,299,377 B2 | 11/2007 | Norman | |
| 7,379,983 B2 | 5/2008 | Zaharias | |
| 7,428,583 B1 | 9/2008 | Lortz et al. | 709/223 |
| 7,433,931 B2 | 10/2008 | Richoux | 709/217 |
| 7,644,153 B2 | 1/2010 | Talwar et al. | 709/224 |
| 7,685,597 B1 | 3/2010 | Czajkowski et al. | 718/100 |
| 2001/0049740 A1 | 12/2001 | Karpoff | |
| 2002/0002613 A1* | 1/2002 | Freeman et al. | 709/225 |
| 2002/0059427 A1 | 5/2002 | Tamaki et al. | 709/226 |
| 2002/0062454 A1 | 5/2002 | Fung | 713/300 |
| 2003/0005039 A1 | 1/2003 | Craddock et al. | 709/203 |
| 2003/0005276 A1 | 1/2003 | French et al. | |
| 2003/0009551 A1 | 1/2003 | Benfield et al. | |
| 2003/0046529 A1 | 3/2003 | Loison et al. | 713/2 |
| 2003/0084100 A1* | 5/2003 | Gahan et al. | 709/203 |
| 2003/0097487 A1 | 5/2003 | Rietze et al. | |
| 2003/0135621 A1 | 7/2003 | Romagnoli | |
| 2003/0154112 A1 | 8/2003 | Neiman et al. | |
| 2003/0188071 A1 | 10/2003 | Kunjan et al. | |
| 2003/0191795 A1 | 10/2003 | Bernardin et al. | 709/105 |
| 2003/0204759 A1* | 10/2003 | Singh | 713/320 |
| 2003/0217105 A1 | 11/2003 | Zircher et al. | |
| 2003/0223361 A1 | 12/2003 | Hussain et al. | 370/230 |
| 2003/0237018 A1* | 12/2003 | Baba | 714/4 |
| 2004/0024949 A1 | 2/2004 | Winkler et al. | |
| 2004/0034794 A1 | 2/2004 | Mayer et al. | 713/200 |
| 2004/0054780 A1 | 3/2004 | Romero | 709/226 |
| 2004/0103218 A1* | 5/2004 | Blumrich et al. | 709/249 |
| 2004/0186920 A1 | 9/2004 | Birdwell et al. | 710/1 |
| 2004/0210656 A1 | 10/2004 | Beck et al. | 709/225 |
| 2004/0268000 A1 | 12/2004 | Barker et al. | |
| 2005/0015384 A1 | 1/2005 | Wehrman et al. | 707/100 |
| 2005/0071843 A1 | 3/2005 | Guo et al. | |
| 2005/0149924 A1 | 7/2005 | Komarla et al. | 717/176 |
| 2005/0198200 A1* | 9/2005 | Subramanian et al. | 709/218 |
| 2005/0234846 A1 | 10/2005 | Davidson et al. | |
| 2005/0235055 A1* | 10/2005 | Davidson | 709/223 |
| 2005/0235092 A1 | 10/2005 | Ballew et al. | |
| 2005/0235286 A1 | 10/2005 | Davidson et al. | |
| 2005/0246569 A1 | 11/2005 | Ballew et al. | 714/4 |
| 2005/0251567 A1 | 11/2005 | Ballew et al. | |
| 2005/0256942 A1* | 11/2005 | McCardle et al. | 709/220 |
| 2005/0256977 A1* | 11/2005 | Dehaemer et al. | 710/5 |
| 2006/0106931 A1 | 5/2006 | Richoux | |
| 2006/0112297 A1 | 5/2006 | Davidson | |
| 2006/0117208 A1 | 6/2006 | Davidson | |
| 2006/0195508 A1 | 8/2006 | Bernardin et al. | 709/203 |
| 2007/0067435 A1 | 3/2007 | Landis et al. | 709/224 |
| 2009/0031316 A1 | 1/2009 | Richoux | 718/102 |

FOREIGN PATENT DOCUMENTS

| | | |
|---|---|---|
| JP | 05-274178 | 10/1993 |
| JP | 7200496 | 8/1995 |
| JP | 8227356 | 9/1996 |
| JP | 10-116261 | 5/1998 |
| JP | 10-222475 | 8/1998 |
| JP | 2002-024192 | 1/2002 |
| JP | 2002-108839 | 4/2002 |
| JP | 2003-099412 | 4/2003 |
| JP | 2004-110791 | 4/2004 |
| JP | 2007141305 | 6/2007 |
| KR | 2001-0000624 | 1/2001 |
| WO | WO 02/084509 | 10/2002 |
| WO | WO 02/095580 A1 | 11/2002 |
| WO | WO 03/005192 | 1/2003 |
| WO | WO 03/005292 A1 | 1/2003 |
| WO | WO2005/106696 A1 | 11/2005 |

OTHER PUBLICATIONS

Cisco Lcal Director Configuration and Command Reference Guide, Apr. 4, 2001, XP-002352335, p. 1-1-1-5, 3-2-3-9.*

Managing Mixed-Use Clusters with Cluster-on-Demand, Nov. 20, 2002, XP-002311138, p. 1-12.*

Translated Office Action for Korean Patent Application No. 10-006-7023880, 8 pages, Received Jan. 15, 2008.

Allen et al., "Title: The Cactus Worm: Experiments with Dynamic Resource Discovery and Allocation in a Grid Environment," 16 pages, Jan. 8, 2001.

Translated Office Action for Korean Patent Application No. 94111492, 6 pages, Received Jan. 23, 2008.

Choo et al., "Processor Scheduling and Allocation for 3D Torus Multicomputer Systems", IEEE Transactions on Parallel and Distributed Systems, vol. 11, No. 5, May 2000, pp. 475-484.

Hans-Ulrich Heiss, "Processor Management in Two-Dimensional Grid-Architectures," Interner Bericht Nr. 20/92, XP002416087, 51 pages, Dec. 1992.

EPO Registered Letter, Application No. 05 252 239.8-1243, 6 pages, Mailed Feb. 2, 2007.

The Patent Office of the State Intellectual Property Office of the People's Republic of China, Office Action for Application No. 200510081719.3, 11 pages, Date of Dispatch Apr. 20, 2007.

Hovestadt et al., Scheduling in HPC Resource Management Systems: Queuing vs. Planning, Proceedings of the 9th Workshop on Job Scheduling Strategies for Parallel Processing, Seattle, WA, pp. 1-19, Jun. 2003.

Keller et al., "Anatomy of a Resource Management System for HPC Clusters," Annual Review of Scalable Computing, vol. 3, pp. 1-23, 2001.

Falck et al., Swedish Patent No. 102405, Application No. 102405, Aug. 26, 1941, 4 pages.

Nikkei Solution Business, "Most Up-to-Date Storage Solutions, Powerful for Substantial Cost Reduction in IT Systems," pp. 105-110, Sep. 2003.

Panagiotis, Christias et al., "inetd—Internet Services Daemon," XP-002353275, pp. 1-4, 1994 Man-cgi 1.15S, 1995 Modified for Solaris 2.3, 1994.

Communication from the European Patent Office, European Search Report for Application No. PCT/US2005/012314 6 pages, mailed Sep. 20, 2005, 7 pages.

Communication from the European Patent Office, European Search Report for Application No. PCT/US2005/012313 and Written Opinion of the International Search Authority, mailed Sep. 20, 2005, 14 pages.

Communication from the European Patent Office, European Search Report for Application No. PCT/US2005/012316 and Written Opinion of the International Search Authority, mailed Sep. 14, 2005, 11 pages.

Communication from the European Patent Office, European Search Report for Application No. PCT/US2005/012242 and Written Opinion of the International Search Authority, mailed Sep. 19, 2005, 16 pages.

Communication from the European Patent Office, European Search Report for Application No. PCT/US2005/012031 and Written Opinion of the International Search Authority, mailed Aug. 1, 2005, 11 pages.

Communication from the European Patent Office, European Search Report for Application No. EP 05 25 2235, mailed Jul. 22, 2005, 3 pages.

Communication from the European Patent Office, European Search Report for Application No. PCT/US2005/012643 and Written Opinion of the International Search Authority, mailed Apr. 19, 2006, 11 pages.

Communication from the European Patent Office, European Search Report for Application No. PCT/US2005/012500 and Written Opinion of the International Search Authority, mailed Aug. 1, 2005, 12 pages.

Communication from the European Patent Office, European Search Report for Application No. PCT/US2005/012489 and Written Opinion of the International Search Authority, mailed Nov. 18, 2005, 14 pages.

Haynes et al., "A Visualization Tool for Analyzing Cluster Performance Data," 42 Annual Symposium on Foundations of Computer Science, (FOCS 2001), Las Vegas, Oct. 14-17, 2001, 8 pages.

Patel et al., "Sage: An Application Development Tool Suite for High Performance Computing Systems," Aerospace Conference Proceedings, 2000, IEEE Mar. 18-25, 2000, pp. 491-500.

Baraglia et al., RsdEditor: A Graphical User Interface for Specifying Metacomputer Components, Heterogeneous Computing Workshop, 2000, pp. 336-345, 2000.

Chang et al., "Performance Improvement of Allocation Schemes for Mesh-Connected Computers," Journal of Parallel and Distributed Computing, Academic Press, Duluth, MN, vol. 52, No. 1, Jul. 10, 1998, pp. 40-68.

Liu, et al. "Non-Contiguous Processor Allocation Algorithms for Distributed Memory Multicomputers," Supercomputing '94, Proceedings, Washington, D.C., Nov. 14-18, 1994, pp. 227-236.

Krevat et al., "Job Scheduling for the BlueGene/L System," Lecture Notes in Computer Science, vol. 2537, Jul. 24, 2002, 18 pages.

Rzymianowicz et al., "Clustering SMP Nodes with the ATOLL Network: A Look into the Future of System Area Networks," Proceedings of High Performance Computing, 8th International Conference, May 8, 2000, 10 pages.

Bhanot et al., "The BlueGene/L Supercomputer," 20th International Symposium on Lattice Field Theory, vol. 119, Jun. 2002, 8 pages.

Advanced Micro Devices et al., "Hypertransport Technology I/O Link—A High-Bandwidth I/O Architecture," Jul. 20, 2001, pp. 1-25.

Pinkston et al., "InfiniBand: The "De Facto" Future Standard for System and Local Area Networks or Just a Scalable Replacement for PCI Buses?," Cluster Computing—Kluwer Academic Publishers, vol. 6, No. 2, 2003, pp. 95-104.

Culler et al., "Parallel Computer Architecture—A Hardware/Software Approach, Interconnection Network Design," Morgan Kaufmann, 1999, 30 pages.

Feitelson, "Job Scheduling in Multiprogrammed Parallel Systems", IBM Research Report, Aug. 1997, pp. 1-172.

Kandlur et al., "Hypercube Management in the Presence of Node Failures", third conference on hypercube concurrent computers and applications ACM New York, 1988, pp. 328-336, vol. 1, pp. 328-336.

Wenjian et al., "Efficient Processor Allocation for 3D Tori", Parallel Processing Symposium 1995, Proceedings, 9th International, Apr. 25-28, 1995, IEEE Comput. Soc., pp. 466-471, 921.

Qiao et al., E-Kernel: An Embedding Kernel on the IBM Victor V256, Multiprocessor for Program Mapping and Network Reconfiguration, IEEE Transactions on Parallel and Distributed Systems, IEEE Service Center, vol. 5, No. 9, Sep. 5, 1994, pp. 977-994.

Wong, William, "Switch-Chip Fuels Third-Generation InfiniBand," Nov. 10, 2003, Electronic Design, 2 pages.

Unknown, "HP AlphaServer SC User Guide," Internet Article, Online!, Jul. 12, 2004, retrieved from the internet: URL:http://webl.quadrics.com/onlinedocs/AlphaServer/Eagle/html/AlphaServerUserGuide/ retrieved on Jul. 19, 2005.

Hyunseung et al., "An Efficient Submesh Allocation Scheme for 3D Torus Multicolor Systems," Parallel Algorithms/Architecture Synthesis, 1997, Proceedings, Second Aizu International Symposium Aizu-Wakamatsu, Japan, Mar. 17-21, 1997.

Unknown, "Message Passing Interface (MPI)," Internet Article, Online!, Dec. 23, 2003, pp. 1-33, retrieved from the internet: URL:http//web.archive.org/web/20040102194825/http://www.llnl.gov/computing/tutorial s/mpi/>, retrieved on Jul. 18, 2005, pages.

Davidson et al., U.S. Appl. No. 10/825,345, entitled, *System and Method for Computer Cluster Virtualization Using Dynamic Boot Images and Virtual Disk*, 47 pages of specification, 10 pages of drawings, filed Apr. 15, 2004.

Ballew et al., U.S. Appl. No. 10/824,874, entitled, "*High Performance Computing System and Method*", 47 pages specification, claims and abstract, 10 pages of drawings, filed Apr. 15, 2004.

Ballew et al., U.S. Appl. No. 10/825,539, entitled, "*System and Method for Cluster Management Based on HPC Architecture*", 49 pages specification, claims and abstract, 10 pages of drawings, filed Apr. 15, 2004.

Ballew et al., U.S. Appl. No. 10/826,959, entitled, "*System and Method for Detecting and Managing HPC Node Failure*", 49 pages specification, claims and abstract, 10 pages of drawings, filed Apr. 15, 2004.

Davidson, U.S. Appl. No. 10/824,873, entitled, "*Graphical User Interface for Managing HPC Clusters*", 48 pages specification, claims and abstract, 10 pages of drawings, filed Apr. 15, 2004.

Ballew et al., U.S. Appl. No. 10/825,021, entitled, "*System and Method for Topology-aware Job Scheduling and Backfilling in an HPC Environment*", 49 pages specification, claims and abstract, 10 pages of drawings, filed Apr. 15, 2004.

Davidson, U.S. Appl. No. 10/991,598, entitled, "*Scheduling in a High Performance Computing (HPC) System*", 111 pages specification, claims and abstract, 11 pages of drawings, filed Nov. 17, 2004.

Davidson, U.S. Appl. No. 10/991,754, entitled, *Fault Tolerance and Recovery in a High-Performance Computing (HPC) System*, 117 pages specification, claims and abstract, 12 pages of drawings, filed Nov. 17, 2004.

Notification of Transmittal of the International Search Report or the Declaration (PCT Rule 44.1) mailed Nov. 18, 2005, re International Application No. PCT/US2005/012489, 6 pages.

Written Opinion of the International Searching Authority, International Application No. PCT/US2005/012489, International Filing Date Apr. 12, 2005, 8 pages.

Unknown, "Cisco Local Director Configuration and Command Reference Guide," Internet Article, Online, Apr. 4, 2001, XP002352335, retrieved Nov. 1, 2005.

Moore et al., "Managing Mixed-Use Clusters with Cluster-on-Demand," Internet Article, Nov. 2002, XP002311138.

Di Santo et al., "Kernel Implementation of Locality-Aware Dispatching Techniques for Web Server Clusters," Cluster Computing, 2003 Proceedings, pp. 154-162, Dec. 1, 2003.

Ross et al., "3.3 Connectionless Transport," Feb. 22, 2001, pp. 1-4, retrieved on Nov. 1, 2005.

The Intellectual Property Bureau Ministry of Economic Affairs, Office Action for Application No. 94111492, received Nov. 27, 2006, 2 pages.

Jiun-Sheng et al., "Network Topology Structure on Board of Computer Cluster," Publication No. TW532011B, Data Supplied from the esp@cenet database—Worldwide, 1 page, Received Dec. 18, 2006.

Masaaki et al., Abstract of JP8227356, 1 page, Published Sep. 3, 1996, Received Mar. 21, 2008.

Translated Japanese Patent Application No. 2003-531412, 4 pages, printed Jan. 4, 2008.

Translation of an Office Action, Japanese Patent Application No. 2005-117406, received Dec. 28, 2007, 6 pages.

Translation of an Office Action, Japanese Patent Application No. 2005-117403, received Dec. 28, 2007, 4 pages.

Translation of an Office Action, Japanese Patent Application No. 2005-117404, received Dec. 28, 2007, 7 pages.
Kimitaka et al., "Liquid Crystal Display Device," Abstracts of Japan for Publication No. 2005-241804, published Sep. 8, 2005, 2 pages.
Hidenori et al., "Magnetic Disk Drive," Abstracts of Japan for Publication No. 2007-141305, published Jun. 7, 2007, 2 pages.
Koichiro, "Semiconductor Storage Device and Its Test Method," Abstracts of Japan for Publication No. 2007-200496, published Aug. 9, 2007, 2 pages.
Canadian Patent Application No. 2,503,775, Raytheon Company, Office Action, Jan. 8, 2009.
Malaysian Patent Application No. PI20051531, Raytheon Company, Office Action, Oct. 31, 2008.
John P. Hayes, et al.; *Hypercube Supercomputers*; Proceedings of the IEEE; vol. 77, No. 12; XP-009113537; pp. 1829-1841, Dec. 1989.
Kurt Windisch, et al.; *ProcSimity: An Experimental Tool for Processor Allocation and Scheduling in Highly Parallel Systems*; XP-10130254; pp. 414-421, 1995.
Hee Yong Youn, et al.; *Dynamic Task Scheduling and Allocation for 3D Torus Multicomput Multicomputer Systems*; 1996 International Conference on Parallel Processing; XP-9113574; pp. III-199-III-206, 1996.
Hsing-Lung Chen, et al.; *Distributed Submesh Determination in Faulty Tori and Meshes*; XP-10216762; pp. 65-70, 1997.
Geunmo Kim, et al.; *On Submesh Allocation for Mesh Multicomputers: A Best-Fit Allocation and a Virtual Submesh Allocation for Faulty Meshes*; IEEE Transactions on Parallel and Distributed Systems; vol. 9, No. 2; XP-000736328; pp. 175-185, Feb. 1998.
Moonsoo Kang, et al.; *Job-Based Queue Delay Modeling in a Space-Shared Hypercube*; XP-10356056; pp. 313-318, 1999.
USPTO; Advisory Action for U.S. Appl. No. 10/825,539, filed Apr. 15, 2004 in the name of James D. Ballew; 3 pages, Mar. 11, 2009.
European Patent Office Communication for Application No. 07007897.7-2211; 12 pages, Mar. 19, 2009.
IP Office of Singapore, Examination Report, Application No. 200607088-2, 7 pages, Apr. 13, 2009.
USPTO Office Action for U.S. Appl. No. 10/825,021, filed Apr. 15, 2004, inventor Shannon V. Davidson, 10 pages, Apr. 15, 2009.
USPTO Office Action for U.S. Appl. No. 10/825,345, filed Apr. 15, 2004, inventor Shannon V. Davidson, 13 pages, Apr. 17, 2009.
USPTO Office Communication, U.S. Appl. No. 10/824,874, filed Apr. 15, 2004, inventor James D. Ballew, 3 pages, Apr. 28, 2009.
USPTO; Notice of Allowance and Fee(s) Due for U.S. Appl. No. 10/826,959, filed Apr. 15, 2004 in the name of James D. Ballew; 4 pages, May 12, 2009.
Korean International Patent Office; Notice of Last Preliminary Rejection for Application No. 10-2006-7023880; 5 pages, May 28, 2009.
Korean International Patent Office; Notice of Last Preliminary Rejection English Translation for Application No. 10-2006-07023880; 4 pages, May 28, 2009.
Canadian Intellectual Property Office; Office Action for Application No. 2,503,773; 3 pages, Jun. 4, 2009.
USPTO; Advisory Action for U.S. Appl. No. 10/825,345, filed Apr. 15, 2004 in the name of Shannon V. Davidson; 3 pages, Jun. 25, 2009.
USPTO; Office Action for U.S. Appl. No. 10/825,539, filed Apr. 15, 2004 in the name of James D. Ballew; 16 pages, Jun. 25, 2009.
USPTO; Office Action for U.S. Appl. No. 10/824,873, filed Apr. 15, 2004 in the name of Shannon V. Davidson; 11 pages, Jun. 25, 2009.
Japanese Patent Office; Translation of an Office Action for Application No. 2005-117403; 1 page, Jun. 26, 2009.
Japanese Patent Office; Translation of an Office Action for Application No. 2005-117404; 1 page, Jun. 26, 2009.
Japanese Patent Office; Translation of an Office Action for Application No. 2005-117406; 1 page, Jun. 26, 2009.
*The Patent Office of the State Intellectual Property Office of the People's Republic of China* for Application No. 200510087855.3; 7 pages, Jun. 26, 2009.
USPTO; Office Action for U.S. Appl. No. 10/824,874, filed Apr. 15, 2004 in the name of James D. Ballew; 17 pages, Jun. 5, 2006.
USPTO; Office Action for U.S. Appl. No. 10/826,959, filed Apr. 15, 2004 in the name of James D. Ballew; 15 pages, Oct. 4, 2006.
USPTO; Office Action for U.S. Appl. No. 10/824,874, filed Apr. 15, 2004 in the name of James D. Ballew; 13 pages, Feb. 26, 2007.
USPTO; Office Action for U.S. Appl. No. 10/826,959, filed Apr. 15, 2004 in the name of James D. Ballew; 12 pages, Mar. 12, 2007.
USPTO; Office Action for U.S. Appl. No. 10/825,021, filed Apr. 15, 2004 in the name of Shannon V. Davidson; 9 pages, May 7, 2007.
USPTO; Office Action for U.S. Appl. No. 10/824,874, filed Apr. 15, 2004 in the name of James D. Ballew; 13 pages, Jul. 31, 2007.
USPTO; Notice of Allowance and Fee(s) Due for U.S. Appl. No. 10/991,598, filed Nov. 17, 2004 in the name of Anthony N. Richoux; 18 pages, Sep. 19, 2007.
USPTO; Office Action for U.S. Appl. No. 10/826,959, filed Apr. 15, 2004 in the name of James D. Ballew; 15 pages, Oct. 4, 2007.
USPTO; Office Action for U.S. Appl. No. 10/824,873, filed Apr. 15, 2004 in the name of Shannon V. Davidson; 10 pages, Dec. 4, 2007.
USPTO; Office Action for U.S. Appl. No. 10/825,539, filed Apr. 15, 2004 in the name of James D. Ballew; 18 pages, Jan. 10, 2008.
USPTO; Notice of Allowance and Fee(s) Due for U.S. Appl. No. 10/991,598, filed Nov. 17, 2004 in the name of Anthony N. Richoux; 17 pages, Jan. 22, 2008.
USPTO; Office Action for U.S. Appl. No. 10/826,959, filed Apr. 15, 2004 in the name of James D. Ballew; 17 pages, Jan. 29, 2008.
USPTO; Office Action for U.S. Appl. No. 10/825,021, filed Apr. 15, 2004 in the name of Shannon V. Davidson; 10 pages, Feb. 11, 2008.
USPTO; Office Action for U.S. Appl. No. 10/991,754, filed Nov. 17, 2004 in the name of Shannon V. Davidson; 29 pages, Mar. 20, 2008.
USPTO; Notice of Allowance and Fee(s) Due for U.S. Appl. No. 10/991,598, filed Nov. 17, 2004 in the name of Anthony N. Richoux; 14 pages, Apr. 18, 2008.
USPTO; Office Action for U.S. Appl. No. 10/824,874, filed Apr. 15, 2004 in the name of James D. Ballew; 13 pages, Jul. 11, 2008.
USPTO; Office Action for U.S. Appl. No. 10/825,345, filed Apr. 15, 2004 in the name of Shannon V. Davidson; 12 pages, Jul. 23, 2008.
USPTO; Notice of Allowance and Fee(s) Due for U.S. Appl. No. 10/991,754, filed Nov. 17, 2004 in the name of Shannon V. Davidson; 8 pages, Sep. 9, 2008.
USPTO; Office Action for U.S. Appl. No. 10/826,959, filed Apr. 15, 2004 in the name of James D. Ballew; 17 pages, Oct. 20, 2008.
USPTO; Office Action for U.S. Appl. No. 10/825,021, filed Apr. 15, 2004 in the name of Shannon V. Davidson; 9 pages, Oct. 31, 2008.
USPTO; Office Action for U.S. Appl. No. 10/825,539, filed Apr. 15, 2004 in the name of James D. Ballew; 16 pages, Nov. 13, 2008.
USPTO; Office Action for U.S. Appl. No. 10/824,873, filed Apr. 15, 2004 in the name of Shannon V. Davidson; 14 pages, Nov. 17, 2008.
Canadian Intellectual Property Office; Office Action for Application No. 2,503,781; 4 pages, Jan. 8, 2009.
USPTO; Notice of Allowance and Fee(s) Due for U.S. Appl. No. 10/826,959, filed Apr. 15, 2004 in the name of James D. Ballew; 5 pages, Feb. 11, 2009.
English Translation of the Korean Notice of Final Rejection for Application No. 10-2006-7023880; 5 pages, Feb. 25, 2009.
USPTO; Advisory Action for U.S. Appl. No. 10/824,873, filed Apr. 15, 2004 in the name of Shannon V. Davidson; 3 pages, Feb. 26, 2009.
Perbadanan Harta Intelek Malaysia; Office Action for Application No. PI 200515233 pages, Mar. 6, 2009.
Translation of an Office Action of Japanese Patent Office, Application No. 2005/117402, 6 pages, mailed Jan. 15, 2008, Received Mar. 21, 2008.
United States Patent and Trademark Office, Office Action for U.S. Appl. No. 10/824,873, filed Apr. 15, 2004, Inventor Shannon V. Davidson., (13 pgs), Notification Date Jan. 14, 2010.
USPTO; Advisory Action for U.S. Appl. No. 10/825,021, filed Apr. 15, 2004 in the name of Shannon V. Davidson; (3 pgs), Notification Date Jul. 16, 2009.
Translation of an Office Action of Japanese Patent Office for Application No. 2007-508457; 3 pages, Aug. 12, 2009.
European Patent Office; Communication Pursuant to Article 94(3) EPC for Application No. 05 252 234.9-2211; (3 pg), Aug. 14, 2009.
USPTO; Notice of Allowance and Fee(s) Due for U.S. Appl. No. 10/826,959, filed Apr. 15, 2004 in the name of James D. Ballew; (6 pgs), Date Mailed Aug. 28, 2009.
USPTO; Office Action for U.S. Appl. No. 10/824,874, filed Apr. 15, 2004 in the name of James D. Ballew; (5 pages), Notification Sep. 4, 2009.

USPTO; Office Action for U.S. Appl. No. 10/825,345, filed Apr. 15, 2004 in the name of Shannon V. Davidson; (15 pages), Notification Sep. 16, 2009.
European Patent Office; Communication Pursuant to Article 94(3) EPC for Application No. 07007897.7-2211 / 1814029; (1 page), Sep. 18, 2009.
Look up Tech Terms—Switching Fabric; SearchStorage.com; http://search.techtarget.com; (4 pages), Retrieved Oct. 6, 2009.
USPTO; Office Action for U.S. Appl. No. 10/825,021, filed Apr. 15, 2004 in the name of Shannon V. Davidson; (12 pgs), Notification Oct. 15, 2009.
European Patent Office; Communication Pursuant to Article 94(3) EPC for Application No. 05 737 440.7-1244, Ref. JL36200P.EPP, (4 pages), Nov. 12, 2009.
USPTO, Notice of Allowance and Fee(s)Due/Notice of Allowability for U.S. Appl. No. 10/826,959, filed Apr. 15, 2004, Inventor James D. Ballew, (6 pgs), Mailing Date Dec. 17, 2009.
Cisco Systems; *Cisco 12012 Gigabit Switch Router Switch Fabric Cards Replacement Instructions*; (14 pgs), 2002.
European Patent Office; Communication Pursuant to Article 94(3) EPC for Application No. 05 732 940.1-2211, (4 pgs), Jan. 15, 2010.
United States Patent and Trademark Office, Office Action for U.S. Appl. No. 10/825,539, filed Apr. 15, 2004, Inventor James D. Ballew et al., (19 pgs), Notification Date Jan. 28, 2010.
USPTO; Notice of Allowance and Fee(s) Due for U.S. Appl. No. 10/824,874, filed Apr. 15, 2004 in the name of James D. Ballew; (5 pages), Feb. 8, 2010.
USPTO, Final Office Action for U.S. Appl. No. 10/825,345, filed Apr. 15, 2004, Inventor Shannon V. Davidson, (17 pgs), Notification Date Mar. 19, 2010.
USPTO; Advisory Action for U.S. Appl. No. 10/824,873 filed Apr. 15, 2004, Inventor Shannon V. Davidson; (3 pages), Notification Date Mar. 20, 2010.
Official Letter received Apr. 15, 2010 re: R.O.C. (Taiwanese) Application No. 94111492, notifying of contents of forthcoming second (final) Office Action and indicating opportunity to respond, and Search Report of the EP corresponding application (EP 1566738 A3); (7 pages), Saint Island Int'l letter dated May 13, 2010.
USPTO; Office Action for U.S. Appl. No. 10/825,021, filed Apr. 15, 2004, in the name of Shannon V. Davidson, (12 pgs.), Notification Date Apr. 30, 2010.
USPTO; Advisory Action for U.S. Appl. No. 10/825,539, filed Apr. 15, 2004, in the name of James D. Ballew; (4 pgs.), Notification Date May 25, 2010.
European Patent Office Communication re: Summons to Attend Oral Proceedings Pursuant to Rule 115(1) EPC for Application No. 05 252 239.8-1243 / 1580661, ( 6 pgs), Jul. 27, 2010.
USPTO Office Action for U.S. Appl. No. 10/825,539, filed Apr. 15, 2004 Inventor James D. Ballew et al.; (21 pgs), Notification Date Aug. 9, 2010.
Malaysia Patent Office Communication re: Substantive Examination Adverse Report (Section 30(1)/30(2)) for Application No. PI 20051525, Filing Date Apr. 5, 2005, ( 2 pgs) Mailed Aug. 30, 2010.
Japanese Patent Office Communication, Japanese Office Action and Translation of an Office Action for Application No. 2007-508456, dated Aug. 4, 2010, (6 pg), Mailed Aug. 10, 2010.
USPTO; Notice of Allowance and Fee(s) Due for U.S. Appl. No. 10/824,874, filed Apr. 15, 2004 in the name of James D. Ballew; (10 pgs), Mailed Sep. 20, 2010.
Israel Patent Office Communication Re: Brief Translation of the Office Action, Re: Notice of Deficiencies in Patent No. 178607 (4 pgs), Mailed Sep. 13, 2010.
USPTO; Final Office Action for U.S. Appl. No. 10/825,021, filed Apr. 15, 2004 in the name of Shannon V. Davidson; (13 pgs), Notification Date Oct. 15, 2010.
USPTO Office Action for U.S. Appl. No. 10/825,345, filed Apr. 15, 2004 Inventor Shannon V. Davidson.; (18 pgs), Notification Date Oct. 28, 2010.
Israel Patent Office Communication Re: Brief Translation of the Office Action, Re: Notice of Deficiencies in Patent No. 178610 (4 pgs), Mailed Sep. 20, 2010.

European Patent Office Communication Re: Summons to attend oral proceedings pursuant to Rule 115(1) EPC; Appl. No. 05 732 940.1-2211, dated Jan. 27, 2011/1735714, (7 pgs), Jan. 27, 2011.
European Patent Office Communication Pursuant to Article 94(3) EPC for Application 07 007 897.7-2211, 7 pgs, Dated Feb. 22, 2011.
USPTO Final Office Action for U.S. Appl. No. 10/825,539, filed Apr. 15, 2004 Inventor James D. Ballew et al.; (22 pgs), Notification Date Mar. 17, 2011.
USPTO Final Office Action for U.S. Appl. No. 10/825,345, filed Apr. 15, 2004 Inventor Shannon V. Davidson.; (22 pgs) Notification Date Apr. 15, 2011.
Korean Patent Office; OA and English Translation Re: Notice of Preliminary Rejection; Examination Results Summary Ref: Notification of Reason for Refusal; Application 10-2006-7023881, (7 pgs.), Apr. 26, 2011.
USPTO; Notice of Allowance and Fee(s) Due for U.S. Appl. No. 10/824,874, filed Apr. 15, 2004, Inventor James D. Ballew; (5 pgs), Mailed May 5, 2011.
USPTO; non-final Office Action, U.S. Appl. No. 10/825,021, filed Apr. 15, 2004, Inventor Shannon V. Davidson; (10 pgs), Notification Date May 25, 2011.
USPTO; non final Office Action, U.S. Appl. No. 12/246,783, filed Oct. 7, 2008, Inventor Anthony N. Richoux; (26 pgs), Notification Date May 11, 2011.
Jonsson et al., "*Comparative Performance of InfiniBand Architecture and Gigabit Ethernet Interconnects on Intel® Itanium®2 Microarchitecture-based Clusters*", May 2003, 4th European LS-DYNA Users Conference, (10 pgs), May 2003.
European Patent Office, Munich Germany, Communication re: Summons to attend oral proceedings pursuant to Rule 115(1) EPC, for Application No. 05 742 298.2-2224, (7 pgs), Mailed May 13, 2011.
Cukier, M. et al.; "*AQuA: an adaptive architecture that provides dependable distributed objects*"; 1998 Reliable Distributed Systems. Proceedings. Seventeenth IEEE Symposium on West Lafayette, USA Oct. 20, 1998, pp. 245-253, XP010319083, DOI: DOI:10.1109/RELDIS.1998.740506 ISBN: 978-0/8186-9218, 1998.
Canadian Intellectual Property Office; Office Action for Application No. 2,503,781; file No. 59261; 2 pages, Jun. 6, 2011.
Japanese Patent Office Communication, Japanese OA and English Translation for Appl No. 2005-117404, Appeal No. 2009-14314, drafted Nov. 30, 2010, (6 pgs), Mailed Dec. 7, 2010.
Israel Patent Office Communication Re: Brief Translation of the Office Action, Re: Notice of Deficiencies in Patent No. 178608 (4 pgs), Mailed Sep. 20, 2010.
Israel Patent Office Communication Re: Hebrew version and brief English Translation of Office Action, ref: Patent appl. No. 179827 (3 pgs), Mailed Oct. 12, 2010.
Japanese Patent Office Communication, Japanese Office Action and Translation of an Office Action for Application No. 2007-508457, JBBL/P0631, dated Sep. 29, 2010, (12 pg), Mailed Oct. 12, 2010.
European Patent Office Communication Re: Decision to Refuse a European Patent Application, No. 05 252 239.8-1243, at the oral proceedings dated Mar. 11, 2010, Ref. JL 5105, and minutes in accordance with Rule 124(4) EPC (63 pgs), Mailed Dec. 2, 2010.
Israel Patent Office Communication Re: Hebrew version and brief English Translation of Office Action, ref: Patent appl. No. 178606 (3 pgs), Mailed Sep. 19, 2010.
Perbadanan Harat Intelek Malaysia; Malaysia Patent Office Communication re: Substantive Examination Adverse Report (Section 30(1)/30(2)) for Appl. No. PI 20051526, filing date Apr. 5, 2005, (3 pgs), Mailed Jan. 31, 2011.
USPTO; Office Action for U.S. Appl. No. 10/825,021, filed Apr. 15, 2004 in the name of Shannon V. Davidson; 10 pgs, Notification Date Nov. 10, 2011.
USPTO; Notice of Allowance, U.S. Appl. No. 10/825,345, filed Apr. 15, 2004 in the name of Shannon V. Davidson; 10 pgs, Notification Date Oct. 27, 2011.
USPTO; Notice of Allowance, Supplemental Notice; U.S. Appl. No. 12/246,783, filed Oct. 7, 2008 in the name of Anthony N. Richoux; 11 pgs, Notification Date Sep. 29, 2011 and Oct. 17, 2011.

European Patent Office Communication, Netherlands Communication re: Summons to attend oral proceedings in accordance to Rule 115(1) EPC, for Application No. 05 252 240.6-1243 / 1662388, (8 pgs), Aug. 5, 2011.

European Patent Office Communication, Munich Germany Communication re: Minutes of oral proceedings in accordance to Rule 124(4) EPC, for Application No. 05 732 940.1-2211, (14 pgs), Jul. 13, 2011.

European Patent Office Communication, Netherlands Communication re: Summons to attend oral proceedings in accordance to Rule 115(1) EPC, for Application No. 05 737 440.7-1244 / 1735949, (7 pgs), Aug. 4, 2011.

Korean Patent Office Communication, OA and English Translation re: Notice of Preliminary Rejection; KIPO Examination Results Summary, Ref: Detailed Grounds for Rejection for Appl. No. 10-2007-7013503, (6 pgs), Jul. 18, 2011.

USPTO; Notice of Allowance and Fee(s) Due for U.S. Appl. No. 10/824,874, filed Apr. 15, 2004, in the name of James D. Ballew; (7 pgs.), Aug. 22, 2011.

Korean Patent Office Communication, OA and English Translation, Examination Results Summary re: KIPO's Notice of Preliminary Rejection (English Translation) for Application 10-2006-7023882, (4 pgs.), Jul. 18, 2011.

Canadian intellectual Property Office; Office Action for Application No. 2,503,773; file No. 59259; (2 pgs), Aug. 9, 2011.

European Patent Office, Netherlands, Communication pursuant to Article 94(3) EPC Office Action for Application No. 05 252 237.2-1243 / JL5127 (6 pgs), Aug. 2, 2011.

Japanese Patent Office Communication, Japanese Office Action and Translation of Office Action for Application No. 2007-508456, dated Jul. 26, 2011, (11 pgs), Mailed Aug. 2, 2011.

Japanese Patent Office Communication, Japanese Office Action and Translation of Office Action for Application No. 2005-117404, dated Aug. 26, 2011, (41 pgs), Mailed Aug. 30, 2011.

European Patent Office—Munich, Germany Communication re: Examining Div., oral proceedings of Sep. 22, 2011, Decision to refuse EU patent appl., Appl. 05 742 298.2-2224 / 1735708, (Feb. 11, 2011), Nov. 2, 2011.

USPTO; Office Action for U.S. Appl. No. 10/824,873, filed Apr. 15, 2004 in the name of Shannon V. Davidson; 14 pgs, Notification Date Nov. 18, 2011.

Japanese Patent Office Communication, Japanese OA and English Translation for Appl No. 2007-508520, dated Jun. 17, 2011; (6 pgs), Jun. 28, 2011.

Masashi Shiraishi et al.; *Parallel Job Execution Tool: ParaJET*; Institute of Electronics, Information and Communication Engineers, Technical Report of IEICE, CPSY95-60 (Aug. 1996), Mitsubishi Electric Corp., IT R&D Center; (9 pgs), 1997.

Korean Patent Office Communication, Korean OA and Translation for Appl. No. 10-2006-7021323, dated Jul. 14, 2011, KIPO Examination Results Summary Ref: Detailed Grounds for Rejection (8 pgs), Jul. 14, 2011.

* cited by examiner

*FIG. 6B*
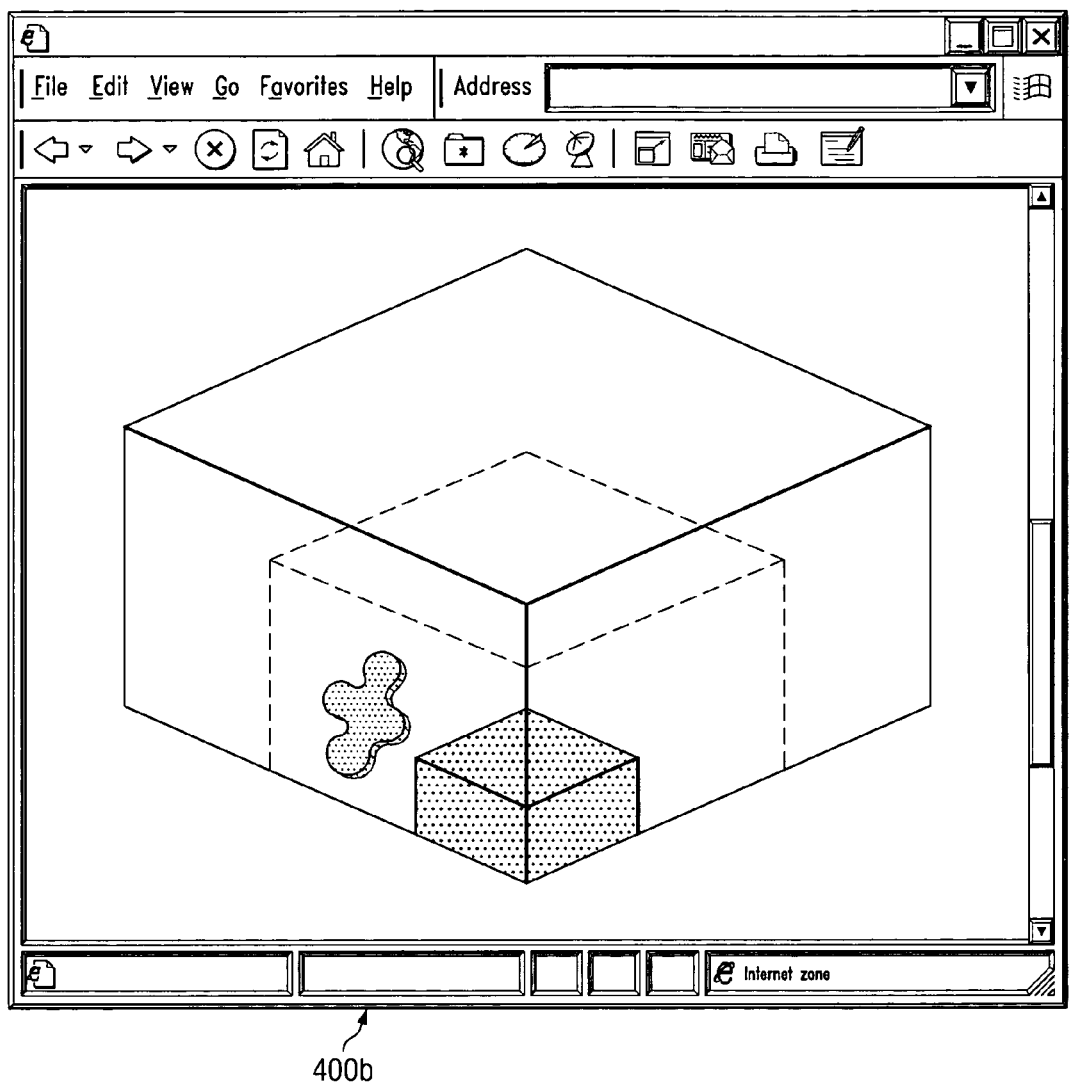
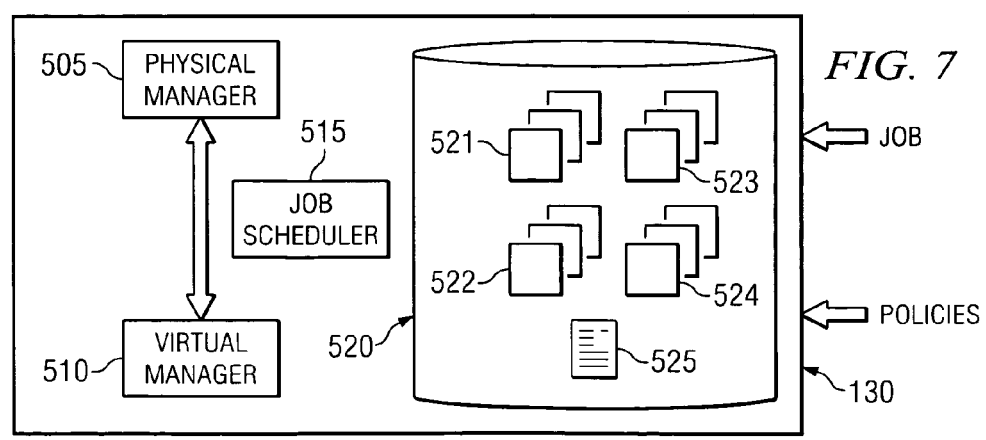
*FIG. 7*

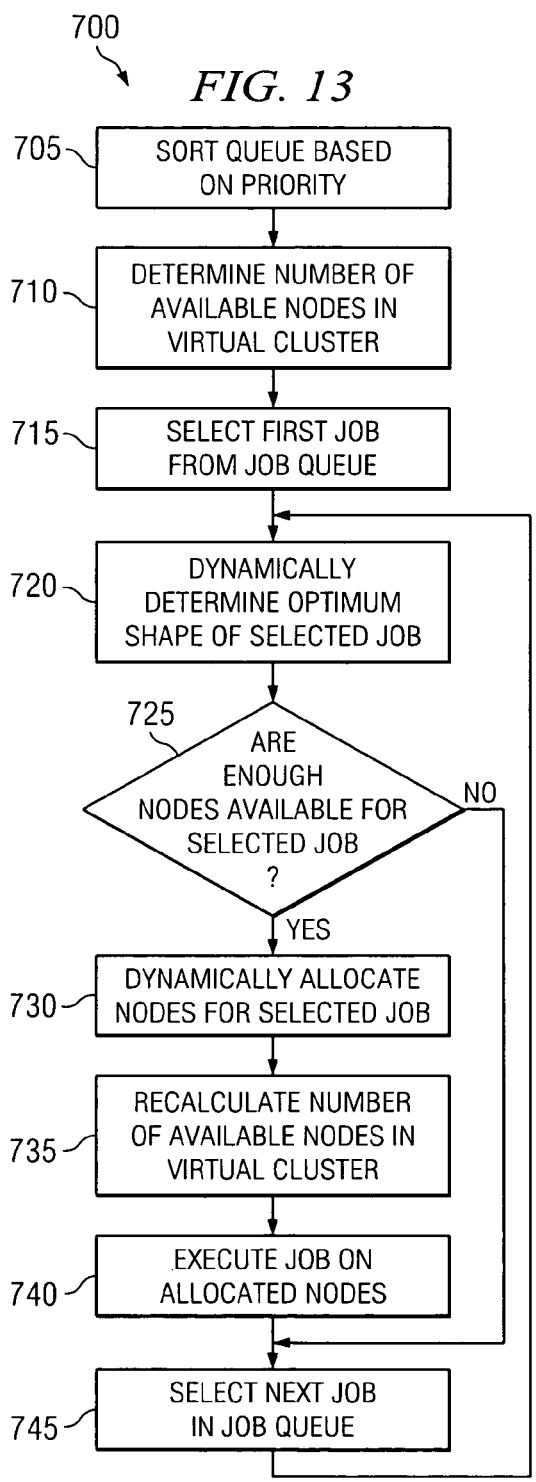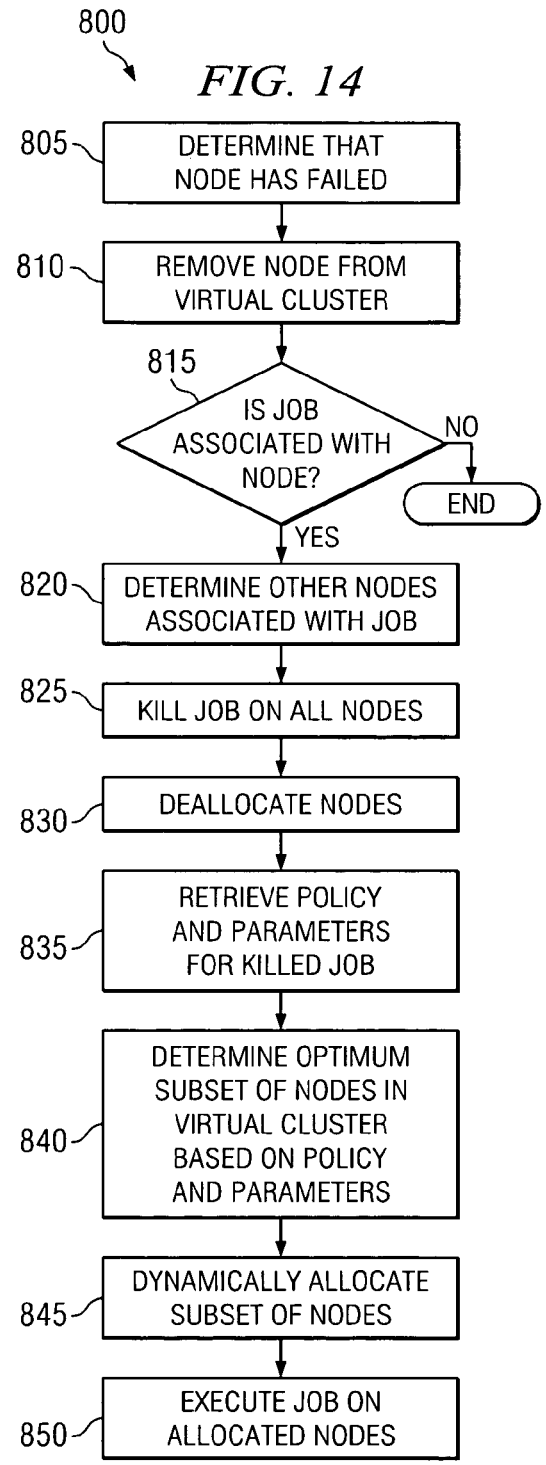

ON-DEMAND INSTANTIATION IN A HIGH-PERFORMANCE COMPUTING (HPC) SYSTEM

TECHNICAL FIELD

This disclosure relates generally to data processing and more particularly to on-demand instantiation in an HPC system.

BACKGROUND

High-performance computing (HPC) is often characterized by the computing systems used by scientists and engineers for modeling, simulating, and analyzing complex physical or algorithmic phenomena. Currently, HPC machines are typically designed using Numerous HPC clusters of one or more processors referred to as nodes. For most large scientific and engineering applications, performance is chiefly determined by parallel scalability and not the speed of individual nodes; therefore, scalability is often a limiting factor in building or purchasing such high-performance clusters. Scalability is generally considered to be based on i) hardware, ii) memory, input/output (I/O), and communication bandwidth; iii) software; iv) architecture; and v) applications. The processing, memory, and I/O bandwidth in most conventional HPC environments are normally not well balanced and, therefore, do not scale well. Many HPC environments do not have the I/O bandwidth to satisfy high-end data processing requirements or are built with blades that have too many unneeded components installed, which tend to dramatically reduce the system's reliability. Accordingly, many HPC environments may not provide robust cluster management software for efficient operation in production-oriented environments.

SUMMARY

The present invention may reduce or eliminate disadvantages, problems, or both associated with HPC systems.

In one embodiment, a method for on-demand instantiation in a high-performance computing (HPC) system includes receiving a connection request from a client specifying a first port number and a first host name advertised externally with respect to an HPC server including a cluster of nodes, identifying a service at the HPC server corresponding to the first port number and the first host name, determining whether the identified service is available, and, if the identified service is available, instantiating a host providing the identified service at one or more nodes in the cluster.

In one embodiment, logic for on-demand instantiation in a high-performance computing (HPC) system, the logic encoded in a computer-readable medium, may be operable when executed to (i) receive a connection request from a client specifying a first port number and a first host name, the first port number and the first host name advertised externally with respect to an HPC server comprising a cluster of nodes; (ii) identify a service at the HPC server corresponding to the first port number and the first host name; (iii) determine whether the identified service is available; and (iv) if the identified service is available, instantiate a host providing the identified service at one or more nodes in the cluster.

Particular embodiments of the present invention may provide one or more technical advantages. As an example, particular embodiments may enable clients to request services at an HPC server. In particular embodiments, a service at an HPC server are available to a client only if a request from the client to access the service meets one or more criteria for access to the service. Particular embodiments provide high availability of hosts in a virtual cluster. Particular embodiments dynamically monitor Internet service requests and map such requests to and instantiate hosts providing the requested services. Particular embodiments of the present invention provide all, some, or none of the above technical advantages. Particular embodiments may provide one or more other technical advantages, one or more of which may be readily apparent to a person skilled in the art from the figures, description, and claims herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 6A-6B illustrate various embodiments of a graphical user interface in accordance with the system of FIG. 1;

FIG. 7 illustrates one embodiment of the cluster management software in accordance with the system in FIG. 1;

FIG. 13 is a flowchart illustrating a method for dynamic backfilling of the grid in accordance with the high-performance computing system of FIG. 1;

FIG. 14 is a flow chart illustrating a method for dynamically managing a node failure in accordance with the high-performance computing system of FIG. 1.

DETAILED DESCRIPTION OF THE DRAWINGS

Figure 1:
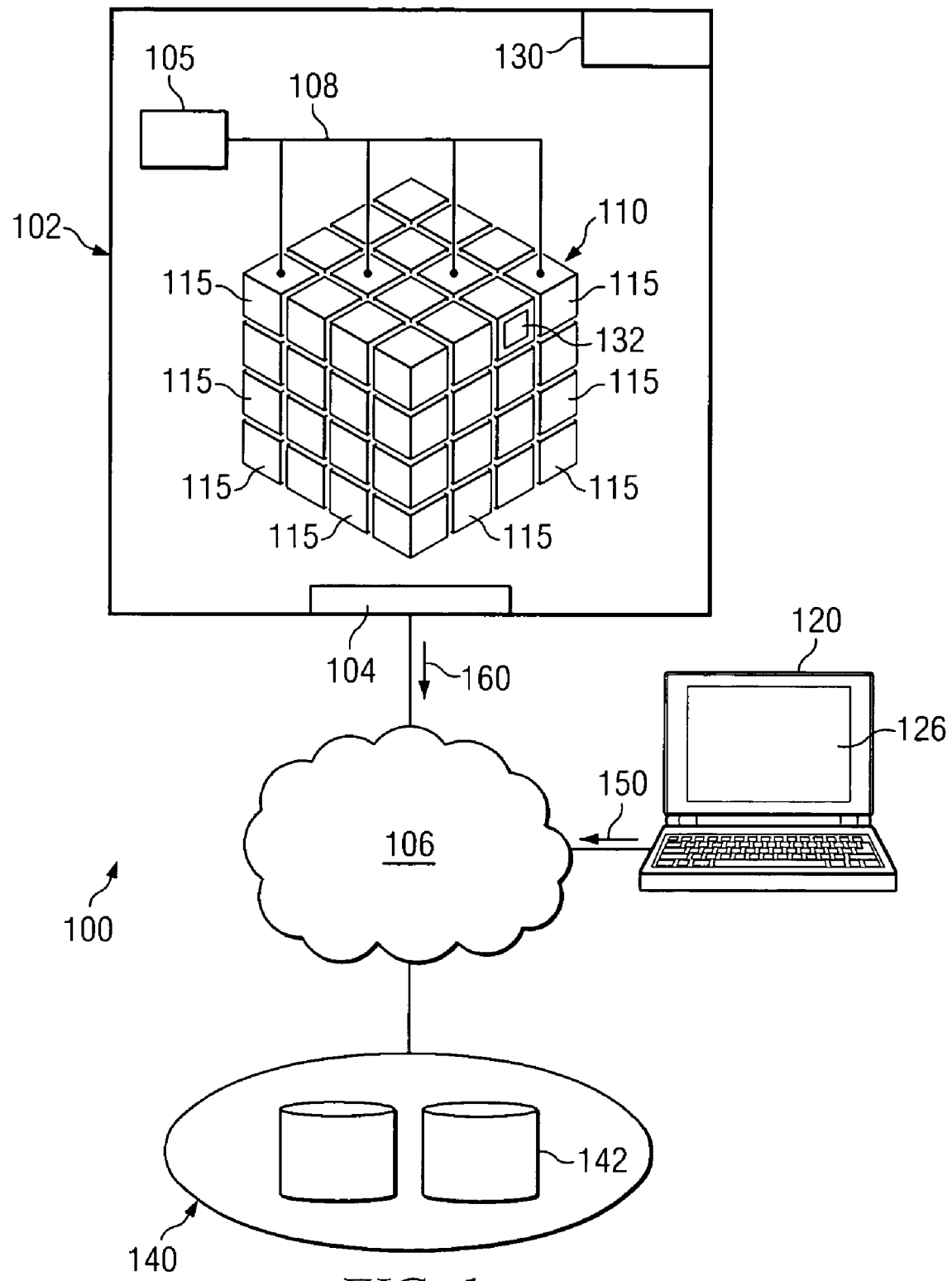
FIG. 1 illustrates an example high-performance computing system in accordance with one embodiment of the present disclosure.

FIG. 1 is a block diagram illustrating a HPC system 100 for executing software applications and processes, for example an atmospheric, weather, or crash simulation, using HPC techniques. System 100 provides users with HPC functionality dynamically allocated among various computing nodes 115 with I/O performance substantially similar to the processing performance. Generally, these nodes 115 are easily scaleable because of, among other things, this increased I/O performance and reduced fabric latency. For example, the scalability of nodes 115 in a distributed architecture may be represented by a derivative of Amdahl's law:

$$S(N)=1/((FP/N)+FS)\times(1-Fc\times(1-RR/L))$$

where S(N)=Speedup on N processors, Fp=Fraction of Parallel Code, Fs=Fraction of Non-Parallel Code, Fc=Fraction of processing devoted to communications, and RR/L=Ratio of Remote/Local Memory Bandwidth. Therefore, by HPC system 100 providing I/O performance substantially equal to or nearing processing performance, HPC system 100 increases overall efficiency of HPC applications and allows for easier system administration.

HPC system 100 is a distributed client/server system that allows users (such as scientists and engineers) to submit jobs 150 for processing on an HPC server 102. For example, system 100 may include HPC server 102 that is connected, through network 106, to one or more administration workstations or local clients 120. But system 100 may be a standalone computing environment or any other suitable environment. In short, system 100 is any HPC computing environment that includes highly scaleable nodes 115 and allows the user to submit jobs 150, dynamically allocates scaleable nodes 115 for job 150, and automatically executes job 150 using the allocated nodes 115. Job 150 may be any batch or online job operable to be processed using HPC techniques and submitted by any apt user. For example, job 150 may be a request for a simulation, a model, or for any other high-performance requirement. Job 150 may also be a request to run a data center application, such as a clustered database, an online transaction processing system, or a clustered application server. The term "dynamically," as used herein, generally means that certain processing is determined, at least in part, at run-time based on one or more variables. The term "automatically," as used herein, generally means that the appropriate processing is substantially performed by at least part of HPC system 100. It should be understood that "automatically" further contemplates any suitable user or administrator interaction with system 100 without departing from the scope of this disclosure.

HPC server 102 comprises any local or remote computer operable to process job 150 using a plurality of balanced nodes 115 and cluster management engine 130. Generally, HPC server 102 comprises a distributed computer such as a blade server or other distributed server. However the configuration, server 102 includes a plurality of nodes 115. Nodes 115 comprise any computer or processing device such as, for example, blades, general-purpose personal computers (PC), Macintoshes, workstations, Unix-based computers, or any other suitable devices. Generally, FIG. 1 provides merely one example of computers that may be used with the disclosure. For example, although FIG. 1 illustrates one server 102 that may be used with the disclosure, system 100 can be implemented using computers other than servers, as well as a server pool. In other words, the present disclosure contemplates computers other than general purpose computers as well as computers without conventional operating systems (OSs). As used in this document, the term "computer" is intended to encompass a personal computer, workstation, network computer, or any other suitable processing device. HPC server 102, or the component nodes 115, may be adapted to execute any OS including Linux, UNIX, Windows Server, or any other suitable OS. According to one embodiment, HPC server 102 may also include or be communicably coupled with a remote web server. Therefore, server 102 may comprise any computer with software and/or hardware in any combination suitable to dynamically allocate nodes 115 to process HPC job 150.

At a high level, HPC server 102 includes a management node 105, a grid 110 comprising a plurality of nodes 115, and cluster management engine 130. More specifically, server 102 may be a standard 19" rack including a plurality of blades (nodes 115) with some or all of the following components: i) dual-processors; ii) large, high bandwidth memory; iii) dual host channel adapters (HCAs); iv) integrated fabric switching; v) FPGA support; and vi) redundant power inputs or N+1 power supplies. These various components allow for failures to be confined to the node level. But it will be understood that HPC server 102 and nodes 115 may not include all of these components.

Management node 105 comprises at least one blade substantially dedicated to managing or assisting an administrator. For example, management node 105 may comprise two blades, with one of the two blades being redundant (such as an active/passive configuration). In one embodiment, management node 105 may be the same type of blade or computing device as HPC nodes 115. But, management node 105 may be any node, including any Number of circuits and configured in any suitable fashion, so long as it remains operable to at least partially manage grid 110. Often, management node 105 is physically or logically separated from the plurality of HPC nodes 115, jointly represented in grid 110. In the illustrated embodiment, management node 105 may be communicably coupled to grid 110 via link 108. Reference to a "link" encompasses any appropriate communication conduit implementing any appropriate communications protocol. As an example and not by way of limitation, a link may include one or more wires in one or more circuit boards, one or more internal or external buses, one or more local area networks (LANs), one or more metropolitan area networks (MANs), one or more wide area networks (WANs), one or more portions of the Internet, or a combination of two or more such links, where appropriate. In one embodiment, link 108 provides Gigabit or 10 Gigabit Ethernet communications between management node 105 and grid 110.

Grid 110 is a group of nodes 115 interconnected for increased processing power. Typically, grid 110 is a 3D Torus, but it may be a mesh, a hypercube, or any other shape or configuration without departing from the scope of this disclosure. Reference to a "torus" may encompass all or a portion of grid 110, where appropriate, and vice versa, where appropriate. The links between nodes 115 in grid 110 may be serial or parallel analog links, digital links, or any other type of link that can convey electrical or electromagnetic signals such as, for example, fiber or copper. Each node 115 is configured with an integrated switch. This allows node 115 to more easily be the basic construct for the 3D Torus and helps minimize XYZ distances between other nodes 115. Further, this may make copper wiring work in larger systems at up to Gigabit rates with, in some embodiments, the longest cable being less than 5 meters. In short, node 115 is generally optimized for nearest-neighbor communications and increased I/O bandwidth.

Each node 115 may include a cluster agent 132 communicably coupled with cluster management engine 130. Generally, agent 132 receives requests or commands from management node 105 and/or cluster management engine 130. Agent 132 could include any hardware, software, firmware, or combination thereof operable to determine the physical status of node 115 and communicate the processed data, such as through a "heartbeat," to management node 105. In another embodiment, management node 105 may periodically poll agent 132 to determine the status of the associated node 115. Agent 132 may be written in any appropriate computer language such as, for example, C, C++, Assembler, Java, Visual Basic, and others or any combination thereof so long as it remains compatible with at least a portion of cluster management engine 130.

Cluster management engine 130 could include any hardware, software, firmware, or combination thereof operable to dynamically allocate and manage nodes 115 and execute job 150 using nodes 115. For example, cluster management engine 130 may be written or described in any appropriate computer language including C, C++, Java, Visual Basic, assembler, any suitable version of 4GL, and others or any combination thereof. It will be understood that while cluster management engine 130 is illustrated in FIG. 1 as a single multi-tasked module, the features and functionality performed by this engine may be performed by multiple modules such as, for example, a physical layer module, a virtual layer module, a job scheduler, and a presentation engine (as shown in more detail in FIG. 7). Further, while illustrated as external to management node 105, management node 105 typically executes one or more processes associated with cluster management engine 130 and may store cluster management engine 130. Moreover, cluster management engine 130 may be a child or sub-module of another software module without departing from the scope of this disclosure. Therefore, cluster management engine 130 comprises one or more software modules operable to intelligently manage nodes 115 and jobs 150. In particular embodiments, cluster management engine includes a scheduler 515 for allocating nodes 115 to jobs 150, as described below. Scheduler 515 may use a scheduling algorithm to allocate nodes 115 to jobs 150, as further described below.

Server 102 may include interface 104 for communicating with other computer systems, such as client 120, over network 106 in a client-server or other distributed environment. In certain embodiments, server 102 receives jobs 150 or job policies from network 106 for storage in disk farm 140. Disk farm 140 may also be attached directly to the computational array using the same wideband interfaces that interconnects the nodes. Generally, interface 104 comprises logic encoded in software and/or hardware in a suitable combination and operable to communicate with network 106. More specifically, interface 104 may comprise software supporting one or more communications protocols associated with communications network 106 or hardware operable to communicate physical signals.

Network 106 facilitates wireless or wireline communication between computer server 102 and any other computer, such as clients 120. Indeed, while illustrated as residing between server 102 and client 120, network 106 may also reside between various nodes 115 without departing from the scope of the disclosure. In other words, network 106 encompasses any network, networks, or sub-network operable to facilitate communications between various computing components. Network 106 may communicate, for example, Internet Protocol (IP) packets, Frame Relay frames, Asynchronous Transfer Mode (ATM) cells, voice, video, data, and other suitable information between network addresses. Network 106 may include one or more local area networks (LANs), radio access networks (RANs), metropolitan area networks (MANs), wide area networks (WANs), all or a portion of the global computer network known as the Internet, and/or any other communication system or systems at one or more locations. MAC stands for media access control, where appropriate.

In general, disk farm 140 is any memory, database or storage area network (SAN) for storing jobs 150, profiles, boot images, or other HPC information. According to the illustrated embodiment, disk farm 140 includes one or more storage clients 142. Disk farm 140 may process and route data packets according to any of a Number of communication protocols, for example, InfiniBand (IB), Gigabit Ethernet (GE), or FibreChannel (FC). Data packets are typically used to transport data within disk farm 140. A data packet may include a header that has a source identifier and a destination identifier. The source identifier, for example, a source address, identifies the transmitter of information, and the destination identifier, for example, a destination address, identifies the recipient of the information.

Client 120 is any device operable to present the user with a job submission screen or administration via a graphical user interface (GUI) 126. At a high level, illustrated client 120 includes at least GUI 126 and comprises an electronic computing device operable to receive, transmit, process and store any appropriate data associated with system 100. It will be understood that there may be any Number of clients 120 communicably coupled to server 102. Further, "client 120" and "user of client 120" may be used interchangeably as appropriate without departing from the scope of this disclosure. Moreover, for ease of illustration, each client is described in terms of being used by one user. But this disclosure contemplates that many users may use one computer to communicate jobs 150 using the same GUI 126.

As used in this disclosure, client 120 is intended to encompass a personal computer, touch screen terminal, workstation, network computer, kiosk, wireless data port, cell phone, personal data assistant (PDA), one or more processors within these or other devices, or any other suitable processing device. For example, client 120 may comprise a computer that includes an input device, such as a keypad, touch screen, mouse, or other device that can accept information, and an output device that conveys information associated with the operation of server 102 or clients 120, including digital data, visual information, or GUI 126. Both the input device and output device may include fixed or removable storage media such as a magnetic computer disk, CD-ROM, or other suitable media to both receive input from and provide output to users of clients 120 through the administration and job submission display, namely GUI 126.

Figure 6A:
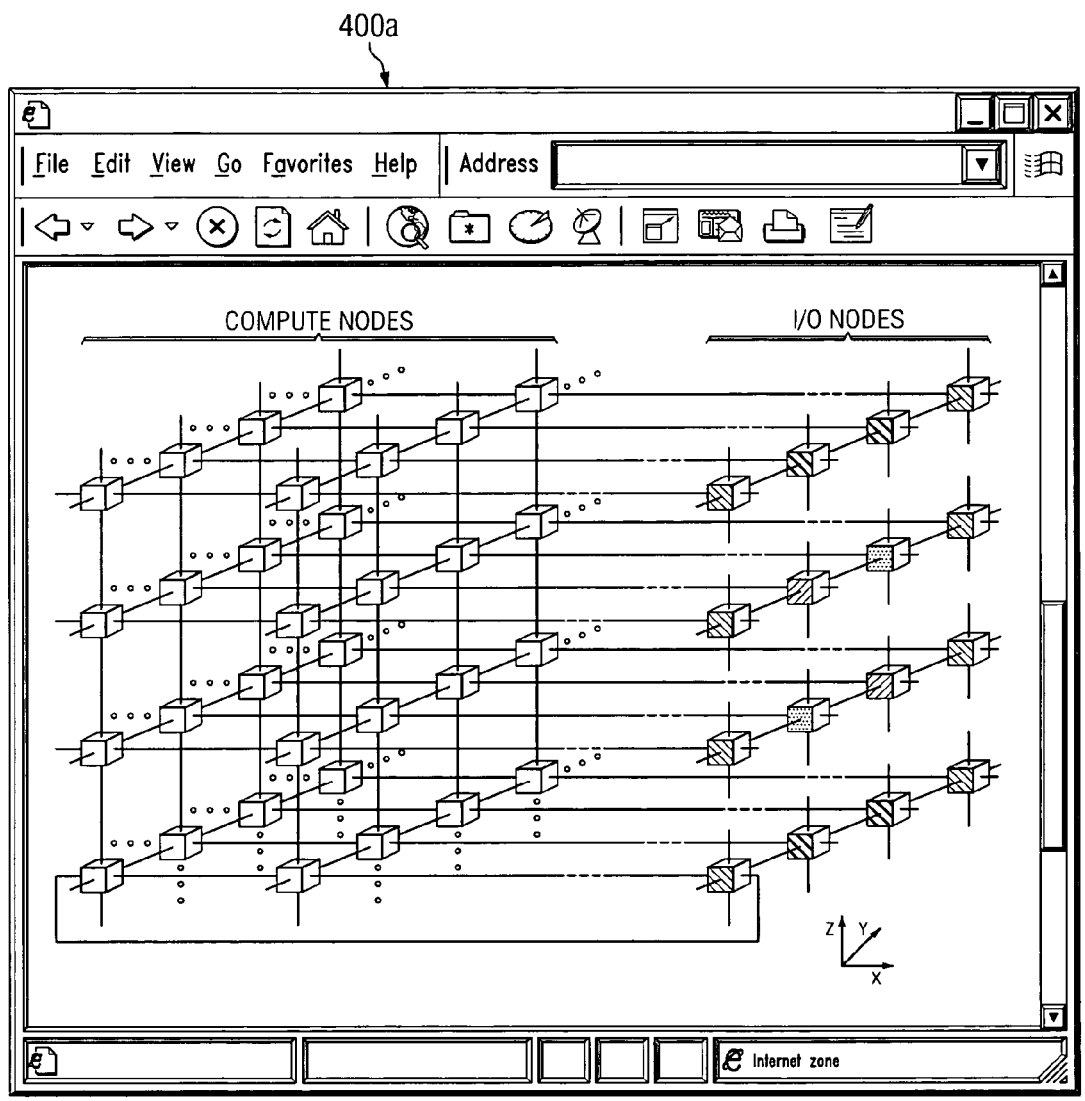

GUI 126 comprises a graphical user interface operable to allow i) the user of client 120 to interface with system 100 to submit one or more jobs 150; and/or ii) the system (or network) administrator using client 120 to interface with system 100 for any suitable supervisory purpose. Generally, GUI 126 provides the user of client 120 with an efficient and user-friendly presentation of data provided by HPC system 100. GUI 126 may comprise a plurality of customizable frames or views having interactive fields, pull-down lists, and buttons operated by the user. In one embodiment, GUI 126 presents a job submission display that presents the various job parameter fields and receives commands from the user of client 120 via one of the input devices. GUI 126 may, alternatively or in combination, present the physical and logical status of nodes 115 to the system administrator, as illustrated in FIGS. 6A-6B, and receive various commands from the administrator. Administrator commands may include marking nodes as (un)available, shutting down nodes for maintenance, rebooting nodes, or any other suitable command. Moreover, it should be understood that the term graphical user interface may be used in the singular or in the plural to describe one or more graphical user interfaces and each of the displays of a particular graphical user interface. Therefore, GUI 126 contemplates any graphical user interface, such as a generic web browser, that processes information in system 100 and efficiently presents the results to the user. Server 102 can accept data from client 120 via the web browser (e.g., Microsoft Internet Explorer or Netscape Navigator) and return the appropriate HTML or XML responses using network 106.

In one aspect of operation, HPC server 102 is first initialized or booted. During this process, cluster management engine 130 determines the existence, state, location, and/or other characteristics of nodes 115 in grid 110. As described above, this may be based on a "heartbeat" communicated upon each node's initialization or upon near immediate polling by management node 105. Next, cluster management engine 130 may dynamically allocate various portions of grid 110 to one or more virtual clusters 220 based on, for example, predetermined policies. In one embodiment, cluster management engine 130 continuously monitors nodes 115 for possible failure and, upon determining that one of the nodes 115 failed, effectively managing the failure using any of a variety of recovery techniques. Cluster management engine 130 may also manage and provide a unique execution environment for each allocated node of virtual cluster 220. The execution environment may consist of the hostname, IP address, OS, configured services, local and shared file systems, and a set of installed applications and data. The cluster management engine 130 may dynamically add or subtract nodes from virtual cluster 220 according to associated policies and according to inter-cluster policies, such as priority.

When a user logs on to client 120, he may be presented with a job submission screen via GUI 126. Once the user has entered the job parameters and submitted job 150, cluster management engine 130 processes the job submission, the related parameters, and any predetermined policies associated with job 150, the user, or the user group. Cluster management engine 130 then determines the appropriate virtual cluster 220 based, at least in part, on this information. Engine 130 then dynamically allocates a job space 230 within virtual cluster 220 and executes job 150 across the allocated nodes 115 using HPC techniques. Based, at least in part, on the increased I/O performance, HPC server 102 may more quickly complete processing of job 150. Upon completion, cluster management engine communicates results 160 to the user.

Figure 2:
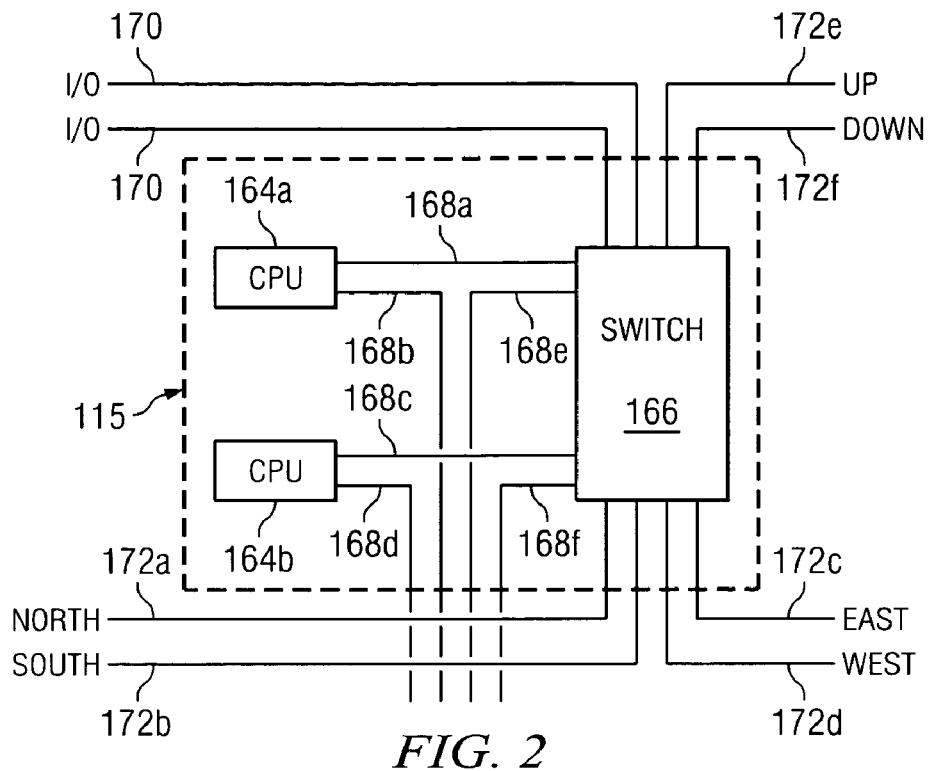
FIG. 2 illustrates an example node in the HPC system illustrated in FIG. 1.

FIG. 2 illustrates an example node (or blade) 115. A node 115 includes any computing device in any orientation for processing all or a portion, such as a thread or process, of one or more jobs 150. As an example and not by way of limitation, a node 115 may include a XEON motherboard, an OPTERON motherboard, or other computing device. Node 115 has an architecture providing an integrated fabric that enables distribution of switching functionality across nodes 115 in grid 110. In particular embodiments, distributing such functionality across nodes 115 in grid 110 may obviate centralized switching in grid 110, which may in turn increase fault tolerance in grid 110 and enable parallel communication among nodes 115 in grid 110.

Node 115 includes two CPUs 164 and a switch (or fabric) 166. Reference to a node 115 may encompass two CPUs 164 and a switch 166, where appropriate. Reference to a node 115 may encompass just a CPU 164, where appropriate. Switch 166 may be an integrated switch. In particular embodiments, switch 166 has twenty-four ports. Two ports on switch 166 may couple node 115 to management node 105 for input and output to and from node 115. In addition, two ports on switch 166 may each couple node 115 to another node 115 along an x axis of grid 110, two ports on switch 166 may each couple node 115 to another node 115 along a y axis of grid 110, and two ports on switch 166 may each couple node 115 to another node 115 along a z axis of grid 110 to facilitate implementation of a 3D mesh, a 3D torus, or other topology in grid 110. Additional ports on switch 166 may couple node 115 to other nodes 115 in grid 110 to facilitate implementation of a multidimensional topology (such as a 4D torus or other nontraditional topology including more than three dimensions) in grid 110. In particular embodiments, one or more ports on switch 166 may couple node 115 to one or more other nodes 115 along one or more diagonal axes of grid 110, which may reduce communication jumps or hops between node 115 and one or more other node 115 relatively distant from node 115. As an example and not by way of limitation, a port on switch 166 may couple node 115 to another node 155 residing along a northeasterly axis of grid 110 several 3D jumps away from node 115. In particular embodiments, switch 166 is an InfiniBand switch. Although a particular switch 166 is illustrated and described, the present invention contemplates any suitable switch 166.

Link 168a couples CPU 164a to switch 166. Link 168b couples CPU 164a to another switch 166 in another node 115, as described below. Link 168c couples CPU 164b to switch 166. Link 168d couples CPU 164b to other switch 166, as described below. Links 168e and 168f couple switch 166 to two other CPUs 164 in other node 115, as further described below. In particular embodiments, a link 168 includes an InfiniBand 4X link capable of communicating approximately one gigabyte per second in each direction. Although particular links 168 are illustrated and described, the present invention contemplates any suitable links 168. Links 170 are I/O links to node 115. A link 170 may include an InfiniBand 4X link capable of communicating approximately one gigabyte per second in each direction. Although particular links 170 are illustrated and described, the present invention contemplates any suitable links 170. Links 172 couple switch 166 to other switches 166 in other nodes 115, as described below. In particular embodiments, a link 172 includes an InfiniBand 12X link capable of communicating approximately three gigabytes per second in each direction. Although particular links 172 are illustrated and described, the present invention contemplates any suitable links 172.

Figure 3:
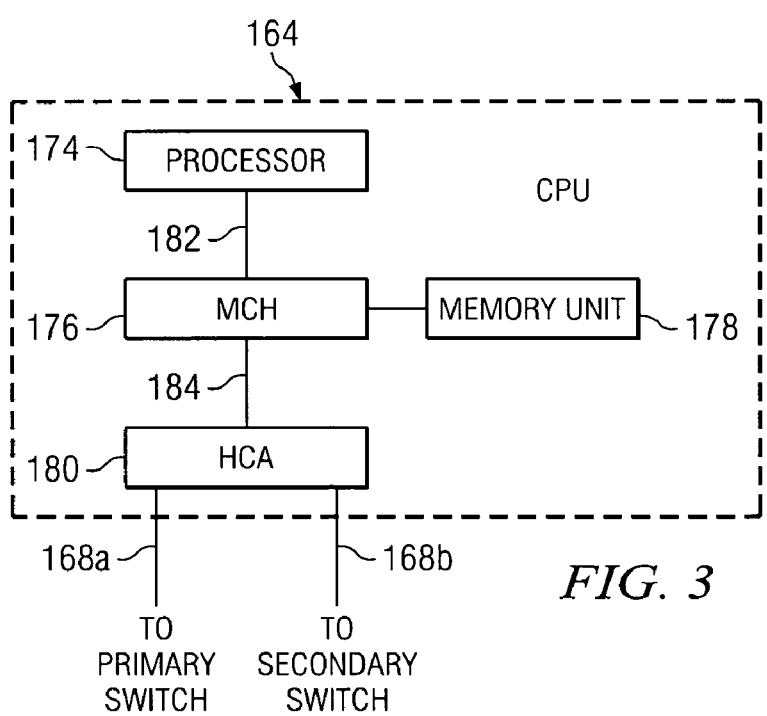
FIG. 3 illustrates an example central processing unit (CPU) in a node.

FIG. 3 illustrates an example CPU 164 in a node 115. Although an example CPU 164 is illustrated and the described, the present invention contemplates any suitable CPU 164. CPU 164 includes a processor 174, a memory controller hub (MCH) 176, a memory unit 178, and a host channel adapter (HCA) 180. Processor 174 includes a hardware, software, or embedded logic component or a combination of two or more such components. In particular embodiments, processor 174 is a NOCONA XEON processor 174 from INTEL. In particular embodiments, processor 174 is an approximately 3.6 gigahertz processor having an approximately 1 megabyte cache and being capable of approximately 7.2 gigaflops per second. In particular embodiments, processor 174 provides HyperThreading. In particular embodiments, processor 174 includes a memory controller providing efficient use of memory bandwidth. Although a particular processor 174 is illustrated and described, the present invention contemplates any suitable processor 174.

Bus 182 couples processor 174 and MCH 176 to each other. In particular embodiments, bus 182 is an approximately 800 MHz front side bus (FSB) capable of communicating approximately 6.4 gigabytes per second. Although a particular bus 182 is illustrated and described, the present invention contemplates any suitable bus 182. MCH 176 includes a hardware, software, or embedded logic component or a combination of two or more such components facilitating communication between processor 174 and one or more other components of HPC system 100, such as memory unit 178. In particular embodiments, MCH 176 is a northbridge for CPU 164 that controls communication between processor 174 and one or more of memory unit 178, bus 182, a Level 2 (L2) cache, and one or more other components of CPU 164. In particular embodiments, MCH 176 is a LINDENHURST E7520 MCH 176. In particular embodiments, Memory unit 178 includes eight gigabytes of random access memory (RAM). In particular embodiments, memory unit 178 includes two double data rate (DDR) memory devices separately coupled to MCH 176. As an example and not by way of limitation, memory unit 178 may include two DDR2-400 memory devices each capable of approximately 3.2 Gigabytes per second per channel. Although a particular memory unit 178 is illustrated and described, the present invention contemplates any suitable memory unit 178.

In particular embodiments, a link couples MCH 176 to an I/O controller hub (ICH) that includes one or more hardware, software, or embedded logic components facilitating I/O between processor 174 and one or more other components of HPC system 100, such as a Basic I/O System (BIOS) coupled to the ICH, a Gigabit Ethernet (GbE) controller or other Ethernet interface coupled to the ICH, or both. In particular embodiments, the ICH is a southbridge for CPU 164 that controls I/O functions of CPU 164. The Ethernet interface coupled to the ICH may facilitate communication between the ICH and a baseboard management controller (BMC) coupled to the Ethernet interface. In particular embodiments, management node 105 or other component of HPC system 100 includes one or more such BMCs. In particular embodiments, a link couples the Ethernet interface to a switch providing access to one or more GbE management ports.

Bus 184 couples MCH 176 and HCA 180 to each other. In particular embodiments, bus 184 is a peripheral component interconnect (PCI) bus 184, such as a PCI-Express 8X bus 184 capable of communicating approximately 4 gigabytes per second. Although a particular bus 184 is illustrated and described, the present invention contemplates any suitable bus 184. HCA 180 includes a hardware, software, or embedded logic component or a combination of two or more such components providing channel-based I/O to CPU 164. In particular embodiments, HCA 180 is a MELLANOX InfiniBand HCA 180. In particular embodiments, HCA 180 provides a bandwidth of approximately 2.65 gigabytes per second, which may allow approximately 1.85 gigabytes per processing element (PE) to switch 166 in node 115 and approximately 800 megabytes per PE to I/O, such as Basic I/O System (BIOS), an Ethernet interface, or other I/O. In particular embodiments, HCA 180 allows a bandwidth at switch 166 to reach approximately 3.7 gigabytes per second for an approximately 13.6 gigaflops per second peak, an I/O rate at switch 166 to reach approximately 50 megabytes per gigaflop for approximately 0.27 bytes per flop, or both. Although a particular HCA 180 is illustrated and described, the present invention contemplates any suitable HCA 180. Each link 168 couples HCA 180 to a switch 166. Link 168*a* couples HCA 180 to a first switch 166 that is a primary switch 166 with respect to HCA 180, as described below. In particular embodiments, node 115 including HCA 180 includes first switch 166. Link 168*b* couples HCA 180 to a second switch 166 that is a secondary switch with respect to HCA 180, as described below. In particular embodiments, a node 115 not including HCA 180 includes second switch 166, as described below.

Figure 4:
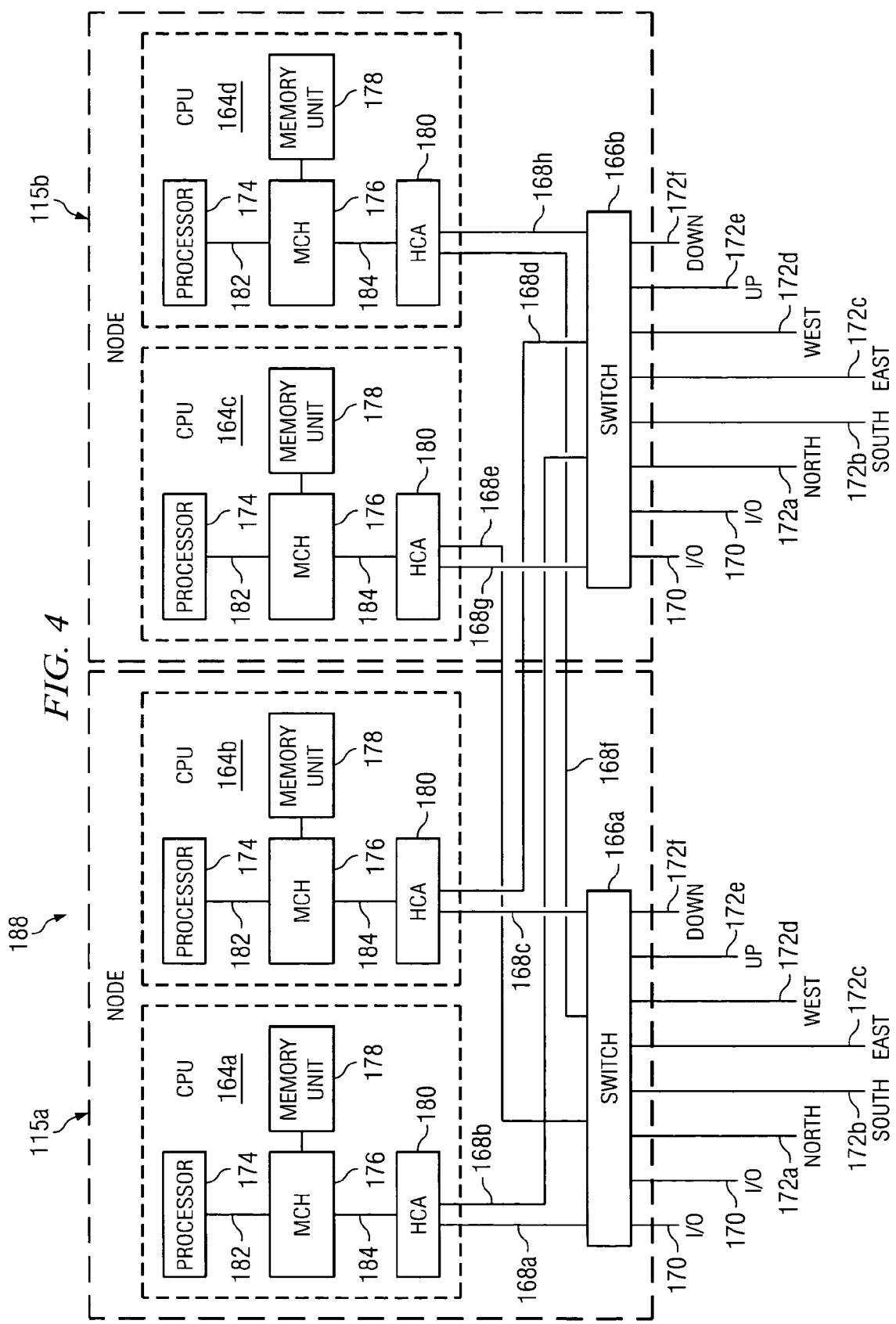
FIG. 4 illustrates an example node pair.

FIG. 4 illustrates an example node pair 186 including two switches 166 and four processors 174. Switches 166 in node pair 186 are redundant with respect to each other, which may increase fault tolerance at node pair 186. If a first switch 166 in node pair 186 is not functioning properly, a second switch 166 in node pair 186 may provide switching for all four CPUs 166 in node pair 186. In node pair 186, switch 166*a* is a primary switch 166 with respect to CPUs 164*a* and 164*b* and a secondary switch 166 with respect to CPUs 164*c* and 164*d*. Switch 166*b* is a primary switch 166 with respect to CPUs 164*c* and 164*d* and a secondary switch 166 with respect to CPUs 164*a* and 164*b*. If both switches 166*a* and 116*b* are functioning properly, switch 166*a* may provide switching for CPUs 164*a* and 164*b* and switch 166*b* may provide switching for CPUs 164*c* and 164*d*. If switch 166*a* is functioning properly, but switch 166*b* is not, switch 166*a* may provide switching for CPUs 164*a*, 164*b*, 164*c*, and 164*d*. If switch 166*b* is functioning properly, but switch 166*a* is not functioning properly, switch 166*b* may provide switching for CPUs 164*a*, 164*b*, 164*c*, and 164*d*.

Links 172 couple each node 115 in node pair 186 to six nodes 115 outside node pair 186 in grid 110. As an example and not by way of limitation, link 172*a* at switch 166*a* couples node 115*a* to a first node 115 outside node pair 186 north of node 115*a* in grid 110, link 172*b* at switch 166*a* couples node 115*a* to a second node 115 outside node pair 186 south of node 115*a* in grid 110, link 172*c* at switch 166*a* couples node 115*a* to a third node 115 outside node pair 186 east of node 115*a* in grid 110, link 172*d* at switch 166*a* couples node 115*a* to a fourth node 115 outside node pair 186 west of node 115*a* in grid 110, link 172*e* at switch 166*a* couples node 115*a* to a fifth node 115 outside node pair 186 above node 115*a* in grid 110, and link 172*f* at switch 166*a* couples node 115*a* to a sixth node 115 outside node pair 186 below node 115*a* in grid 110. In particular embodiments, links 172 couple nodes 115*a* and 115*b* in node pair 186 to sets of nodes 115 outside node pair 186 that are different from each other. As an example and not by way of limitation, links 172 at switch 166*a* may couple node 115*a* to a first set of six nodes 115 outside node pair 186 that includes a first node 115 outside node pair 186, a second node 115 outside node pair 186, a third node 115 outside node pair 186, a fourth node 115 outside node pair 186, a fifth node 115 outside node pair 186, and a sixth node 115 outside node pair 186. Links 172 at switch 166*b* may couple node 115*b* to a second set of six nodes 115 outside node pair 186 that includes a seventh node 115 outside node pair 186, an eighth node 115 outside node pair 186, a ninth node 115 outside node pair 186, a tenth node 115 outside node pair 186, an eleventh node 115 outside node pair 186, and a twelfth node 115 outside node pair 186.

In particular embodiments, a link 172 may couple a first node 115 adjacent a first edge of grid 110 to a second node 115 adjacent a second edge of grid 110 opposite the first edge. As an example and not by way of limitation, consider a first node 115 adjacent a left edge of grid 110 and a second node 115 adjacent a right edge of grid 110 opposite the left edge of grid 110. A link 172 may couple first and second nodes 115 to each other such that first node 115 is east of second node 115 and second node 115 is west of first node 115, despite a location of first node 115 relative to a location of second node 115 in grid 110. As another example, consider a first node 115 adjacent a front edge of grid 110 and a second node 115 adjacent a back edge of grid 110 opposite the front edge of grid 110. A link 172 may couple first and second nodes 115 to each other such that first node 115 is south of second node 115 and second node 115 is north of first node 115, despite a location of first node 115 relative to a location of second node 115 in grid 110. As yet another example, consider a first node 115 adjacent a top edge of grid 110 and a second node 115 adjacent a bottom edge of grid 110 opposite the top edge of grid 110. A link 172 may couple first and second nodes 115 to each other such that first node 115 is below second node 115 and second node 115 is above first node 115, despite a location of first node 115 relative to a location of second node 115 in grid 110.

Figure 5A:
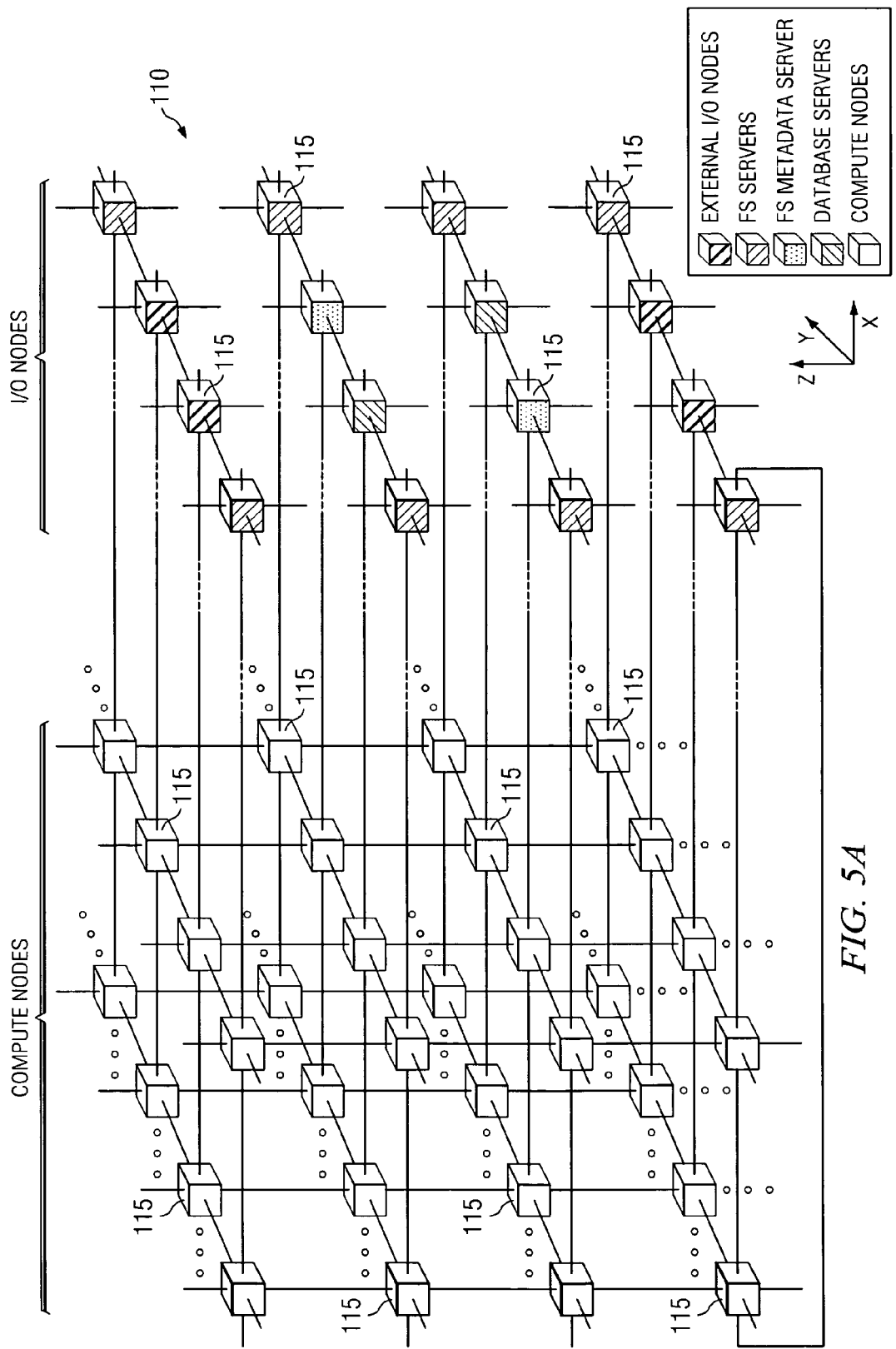
FIGS. 5A-5D illustrate various embodiments of the grid in the system of FIG. 1 and the usage thereof.
Figure 5B:
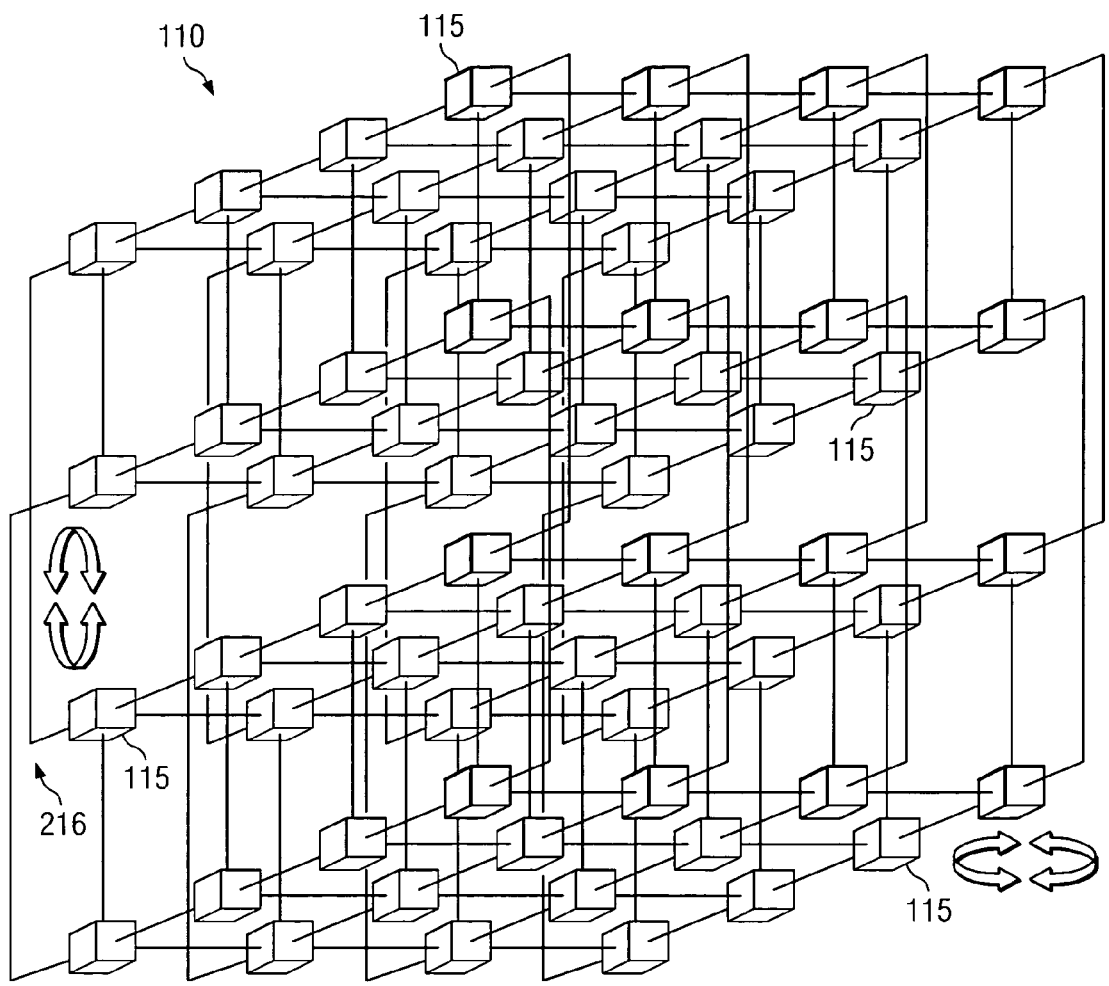

FIGS. 5A-5D illustrate various embodiments of grid 110 in system 100 and the usage or topology thereof. FIG. 5A illustrates one configuration, namely a 3D Torus, of grid 110 using a plurality of node types. For example, the illustrated node types are external I/O node, files system (FS) server, FS metadata server, database server, and compute node. FIG. 5B illustrates an example of "folding" of grid 110. Folding generally allows for one physical edge of grid 110 to connect to a corresponding axial edge, thereby providing a more robust or edgeless topology. In this embodiment, nodes 115 are wrapped around to provide a near seamless topology connect by a node line 216. Node line 216 may be any suitable hardware implementing any communications protocol for interconnecting two or more nodes 115. For example, node line 216 may be copper wire or fiber optic cable implementing Gigabit Ethernet. In particular embodiments, a node line 216 includes one or more links 172, as described above.

Figure 5C:
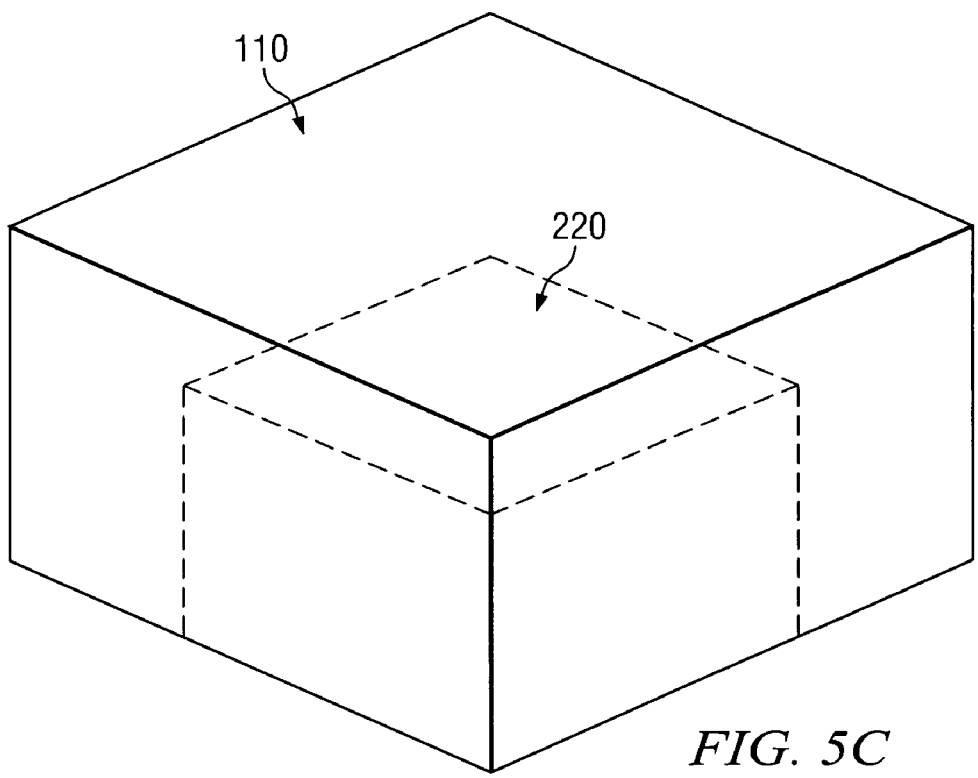

FIG. 5C illustrates grid 110 with one virtual cluster 220 allocated within it. While illustrated with only one virtual cluster 220, there may be any Number (including zero) of virtual clusters 220 in grid 110 without departing from the scope of this disclosure. Virtual cluster 220 is a logical grouping of nodes 115 for processing related jobs 150. For example, virtual cluster 220 may be associated with one research group, a department, a lab, or any other group of users likely to submit similar jobs 150. Virtual cluster 220 may be any shape and include any Number of nodes 115 within grid 110. Indeed, while illustrated virtual cluster 220 includes a plurality of physically neighboring nodes 115, cluster 220 may be a distributed cluster of logically related nodes 115 operable to process job 150.

Virtual cluster 220 may be allocated at any appropriate time. For example, cluster 220 may be allocated upon initialization of system 100 based, for example, on startup parameters or may be dynamically allocated based, for example, on changed server 102 needs. Moreover, virtual cluster 220 may change its shape and size over time to quickly respond to changing requests, demands, and situations. For example, virtual cluster 220 may be dynamically changed to include an automatically allocated first node 115 in response to a failure of a second node 115, previously part of cluster 220. In certain embodiments, clusters 220 may share nodes 115 as processing requires. In particular embodiments, scheduler 515 may allocate one or more virtual clusters 220 to one or more jobs 150 according to a scheduling algorithm, as described below.

Figure 5D:
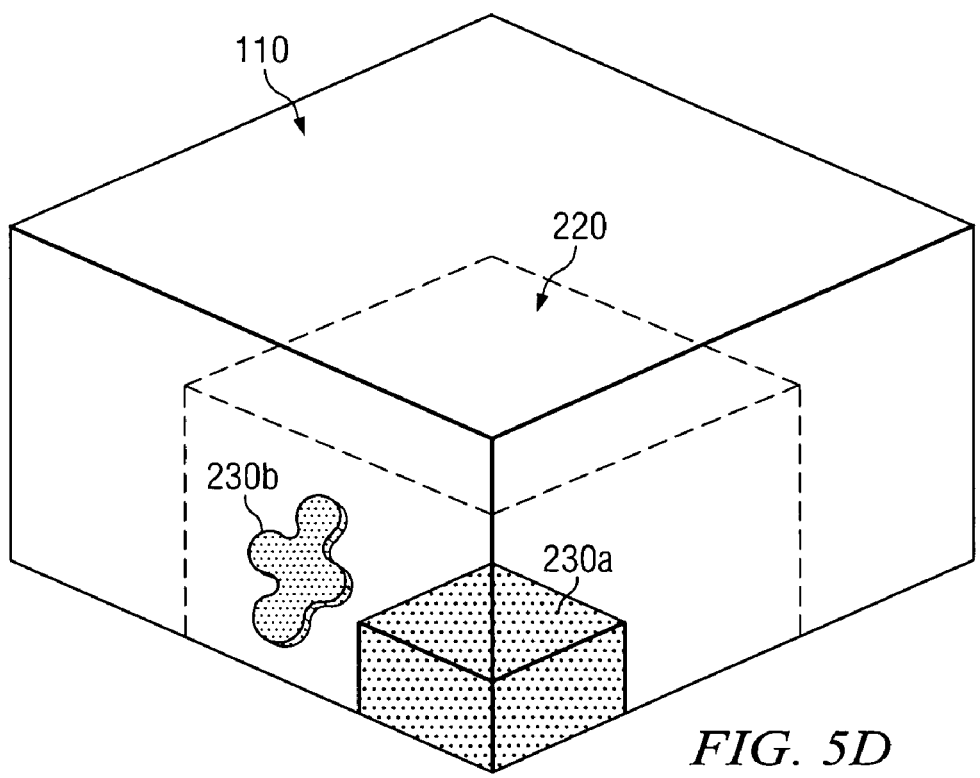

FIG. 5D illustrates various job spaces, 230a and 230b respectively, allocated within example virtual cluster 220. Generally, job space 230 is a set of nodes 115 within virtual cluster 220 dynamically allocated to complete received job 150. Typically, there is one job space 230 per executing job 150 and vice versa, but job spaces 230 may share nodes 115 without departing from the scope of the disclosure. The dimensions of job space 230 may be manually input by the user or administrator or dynamically determined based on job parameters, policies, and/or any other suitable characteristic. In particular embodiments, scheduler 515 may determine one or more dimensions of a job space 230 according to a scheduling algorithm, as described below.

FIGS. 6A-6B illustrate various embodiments of a management graphical user interface 400 in accordance with the system 100. Often, management GUI 400 is presented to client 120 using GUI 126. In general, management GUI 400 presents a variety of management interactive screens or displays to a system administrator and/or a variety of job submission or profile screens to a user. These screens or displays are comprised of graphical elements assembled into various views of collected information. For example, GUI 400 may present a display of the physical health of grid 110 (illustrated in FIG. 6A) or the logical allocation or topology of nodes 115 in grid 110 (illustrated in FIG. 6B).

FIG. 6A illustrates example display 400a. Display 400a may include information presented to the administrator for effectively managing nodes 115. The illustrated embodiment includes a standard web browser with a logical "picture" or screenshot of grid 110. For example, this picture may provide the physical status of grid 110 and the component nodes 115. Each node 115 may be one of any Number of colors, with each color representing various states. For example, a failed node 115 may be red, a utilized or allocated node 115 may be black, and an unallocated node 115 may be shaded. Further, display 400a may allow the administrator to move the pointer over one of the nodes 115 and view the various physical attributes of it. For example, the administrator may be presented with information including "node," "availability," "processor utilization," "memory utilization," "temperature," "physical location," and "address." Of course, these are merely example data fields and any appropriate physical or logical node information may be display for the administrator. Display 400a may also allow the administrator to rotate the view of grid 110 or perform any other suitable function.

FIG. 6B illustrates example display 400b. Display 400b presents a view or picture of the logical state of grid 100. The illustrated embodiment presents the virtual cluster 220 allocated within grid 110. Display 400b further displays two example job spaces 230 allocate within cluster 220 for executing one or more jobs 150. Display 400b may allow the administrator to move the pointer over graphical virtual cluster 220 to view the Number of nodes 115 grouped by various statuses (such as allocated or unallocated). Further, the administrator may move the pointer over one of the job spaces 230 such that suitable job information is presented. For example, the administrator may be able to view the job name, start time, Number of nodes, estimated end time, processor usage, I/O usage, and others.

It will be understood that management GUI 126 (represented above by example displays 400a and 400b, respectively) is for illustration purposes only and may include none, some, or all of the illustrated graphical elements as well as additional management elements not shown.

FIG. 7 illustrates one embodiment of cluster management engine 130, in accordance with system 100. In this embodiment, cluster management engine 130 includes a plurality of sub-modules or components: physical manager 505, virtual manager 510, scheduler 515, and local memory or variables 520.

Physical manager 505 is any software, logic, firmware, or other module operable to determine the physical health of various nodes 115 and effectively manage nodes 115 based on this determined health. Physical manager may use this data to efficiently determine and respond to node 115 failures. In one embodiment, physical manager 505 is communicably coupled to a plurality of agents 132, each residing on one node 115. As described above, agents 132 gather and communicate at least physical information to manager 505. Physical manager 505 may be further operable to communicate alerts to a system administrator at client 120 via network 106.

Virtual manager 510 is any software, logic, firmware, or other module operable to manage virtual clusters 220 and the logical state of nodes 115. Generally, virtual manager 510 links a logical representation of node 115 with the physical status of node 115. Based on these links, virtual manager 510 may generate virtual clusters 220 and process various changes to these clusters 220, such as in response to node failure or a (system or user) request for increased HPC processing. Virtual manager 510 may also communicate the status of virtual cluster 220, such as unallocated nodes 115, to scheduler 515 to enable dynamic backfilling of unexecuted, or queued, HPC processes and jobs 150. Virtual manager 510 may further determine the compatibility of job 150 with particular nodes 115 and communicate this information to scheduler 515. In certain embodiments, virtual manager 510 may be an object representing an individual virtual cluster 220.

In particular embodiments, cluster management engine 130 includes scheduler 515. Scheduler 515 includes a hardware, software, or embedded logic component or one or more such components for allocating nodes 115 to jobs 150 according to a scheduling algorithm. In particular embodiments, scheduler 515 is a plug in. In particular embodiments, in response to cluster management engine 130 receiving a job 150, cluster management engine 130 calls scheduler 515 to allocate one or more nodes 515 to job 150. In particular embodiments, when cluster management engine 130 calls scheduler 515 to allocate one or more nodes 515 to a job 150, cluster management engine 130 identifies to scheduler 515 nodes 115 in grid 110 available for allocation to job 150. As an example and not by way of limitation, when cluster management engine 130 calls scheduler 515 to allocate one or more nodes 115 to a job 150, cluster management engine 130 may communicate to scheduler 515 a list of all nodes 115 in grid 110 available for allocation to job 150. In particular embodiments, cluster management engine 130 calls scheduler 515 to allocate one or more nodes 115 to a job 150 only if a Number of nodes 115 available for allocation to job 150 is greater than or equal to a Number of nodes 115 requested for job 150.

As described above, in particular embodiments, grid 110 is a three dimensional torus of switches 166 each coupled to four CPUs 164. Scheduler 515 logically configures grid 110 as a torus of nodes 115. A torus of size [x,y,z] switches 166 provides six possible logical configurations: [4x,y,z], [x,4y,z], [x,y,4z], [2x,2y,z], [2x,y,2z], and [x,2y,2z]. When scheduler 515 allocates one or more nodes 115 to a job 150, scheduler 515 may select a logical configuration best suited to job 150.

Message Passing Interface (MPI) is a standard for communication among processes in a job 150. In particular embodiments, scheduler 515 assigns an MPI Rank to each node 115 allocated to a job 150. For a job 150 including N processes, scheduler 150 assigns a unique integer Rank between 0 and N−1 to each process. To communicate a message to a first process in job 150, a second process in job 150 may specify a Rank of the first process. Similarly, to receive a message from a first process in a job 150, a second process in job 150 may specify a Rank of the first process. Scheduler 150 may also define one or more broadcast groups each facilitating communication of messages from processes in the broadcast group to all other processes in the broadcast group. To receive a message from a first process in a broadcast group, a second process in the broadcast group may specify the broadcast group In particular embodiments, scheduler 515 handles three types of requests: "spatial," "compact," and "any." Reference to a "request" encompasses a job 150, where appropriate, and vice versa, where appropriate. When a user submits a job 150 to HPC server 102, the user may specify a request type. A "spatial" request encompasses a job 150 described spatially. One class of existing MPI applications assumes a spatial relationship among processes in a job 150. Weather models are an example. To process a job 150 including a weather model, HPC server 102 may use a two dimensional grid encompassing longitude and latitude (or a similar coordinate system) to partition the surface of the earth and divides the time period into discrete time steps. Each process of job 150 models the weather for a particular area. At the beginning of each time step, the process exchanges boundary values with each of four other processes neighboring the process and then computes weather for the particular area. To process a job 150 including a weather model, HPC server 102 may use a three dimensional grid encompassing longitude, latitude, and altitude (or a similar coordinate system) instead of a two dimensional grid to partition the surface of the earth.

For an MPI application assuming a spatial relationship among processes in a job 150, a user may request a triplet {Sx,Sy,Sz} of nodes 115 for job 150. If all the dimensions S are greater than one, the request is a three dimensional request. If one of the dimensions S is equal to one, the request is a two dimensional request. If two of the dimensions S are equal to one, the request is a one dimensional request. To allocate nodes 115 to the request, scheduler 150 may map spatial coordinates to MPI Rank as follows: $[x,y,z] \rightarrow x \times Sy \times Sz + y \times Sz + z$. Sx, Sy, and Sz indicate a size of the request, x is between zero and Sx, y is between zero and Sy, and z is between zero and Sz. To allocate nodes 115 to a two dimensional request, scheduler 150 may map spatial coordinates to MPI Rank as follows: $[x,y] \rightarrow x \times Sy + y$. In particular embodiments, to map spatial coordinates to MPI Rank, scheduler 515 first increments along a z axis of grid 110, then increments along a y axis of grid 110, and then increments along an x axis of grid 110. To accommodate an incorrect assumption regarding scheduler 515 mapping spatial coordinates to MPI Rank, e.g., first incrementing along an x axis of grid 110, then incrementing along a y axis of grid 110, and then incrementing along a z axis of grid 110, cluster management engine 30 may present a requested job 150 to scheduler 515 as, e.g., {Sz,Sy,Sx}.

A "compact" request encompasses a job 150 not described spatially. Scheduler 515 may allocate nodes 115 to a compact request to minimize a maximum communication distance (or hop count) between each pair of nodes 115 allocated to the compact request. An "any" request encompasses a job 150 requiring little or no interprocess communication. Scheduler 150 may allocate any set of nodes 115 to satisfy an any request. Such a job 150 provides scheduler 150 an opportunity to fill holes resulting from fragmentation in grid 110.

When a user submits a job 150 to HPC server 102, the user may also specify an aggressive flag on job 150. In particular embodiments, an aggressive flag is a floating-point Number between zero and one indicating a degree of leeway allotted to scheduler 515 for purposes of allocating nodes 115 to job 150. A higher Number gives scheduler 515 more leeway than a lower Number does. If a user submits a spatial request to HPC server 102 and sets an aggressive flag on the spatial request to zero, scheduler 515 schedules job 150 only if nodes 115 are available to accommodate the spatial request. In particular embodiments, if a user submits a spatial request to HPC server 102 and sets an aggressive flag on the spatial request to a Number greater than zero, scheduler 515 tries to accommodate the spatial request, but, if scheduler 515 cannot accommodate the spatial request, schedules job 150 as a compact request. In particular embodiments, a compact request may allow unlimited hop counts between pairs of nodes 115 allocated to the compact request. Scheduler 150 can always accommodate such a request because, as described above, cluster management engine 130 calls scheduler 515 only if a Number of nodes 115 available for allocation is greater than or equal to a Number of nodes 115 requested. In particular embodiments, an aggressive flag on a compact request indicates a limit on hop counts between pairs of nodes 115 allocated to the compact request. In such embodiments, the limit on hop counts may equal 1/1−a, where a is the aggressive flag.

In particular embodiments, when cluster management engine 130 calls scheduler 515 to allocate one or more nodes 115 to a job 150, cluster management engine 130 provides the following input to scheduler 515: a Number of nodes 115 requested; a request type; a size of job 150; an aggressive flag on job 150; a switch-based size of grid 110 (which scheduler 515 later adjusts to determine a node-based size of grid 110); a Number of nodes 115 per switch 166 (which, in particular embodiments, equals four); a Number of nodes 115 available for allocation to job 150; and identification of one or more nodes 115 available for allocation to job 150 (such as, for example, a list of all nodes 115 available for allocation to job 150). In particular embodiments, RequestedNodes indicates the Number of nodes 115 requested, RequestType indicates the request type, RequestedSize (which includes an array) indicates the size of job 150, AggressiveFlag indicates the aggressive flag on job 150, TorusSize (which includes array) indicates the switch-based size of grid 110, NodesPerSwitch indicates the Number of nodes 115 per switch 166, NumFreeNodes indicates the Number of nodes 115 available for allocation to job 150, and FreeNodeList (which includes an array) identifies one or more nodes 115 available for allocation to job 150.

In particular embodiments, when scheduler 515 schedules (or attempts to schedule) a job 150, scheduler 515 provides the following output: identification of nodes 115 allocated to job 150 (such as a list of nodes 115 allocated to job 150); an MPI Rank of each node allocated to job 150; and a return value indicating that (1) scheduler 515 scheduled job 150, (2) scheduler 515 did not schedule job 150, or (3) scheduler 515 can never schedule job 150.

In particular embodiments, to allocate nodes 115 to a job 150, scheduler 515 first initializes variables for scheduling job 150, then schedules job 150 according to the variables, and then converts the schedule (or results) for processing at cluster management engine 130. Three variables—SpatialAllowed, CompactAllowed, and AnyAllowed—indicate allowed types of scheduling. Scheduler 515 may use the following example logic to initialize SpatialAllowed, CompactAllowed, and AnyAllowed:

```
If the NodesRequested = 1
   SpatialAllowed = False
   CompactAllowed = False
   AnyAllowed = True
Else If RequestedType = SPATIAL
   SpatialAllowed = True
   AnyAllowed = False
   If AggressiveFlag > 0
      CompactAllowed = True
   Else
      ComPactAllowed = False
Else If RequestedType = Compact
   SpatialAllowed = False
   CompactAllowed = True
   AnyAllowed = False
Else If RequestedType = Any
   SpatialAllowed = False
   CompactAllowed = False
   AnyAllowed = True
```

In particular embodiments, scheduler 515 orients a switch-based size of grid 110 to indicate larger dimensions of grid 110 before smaller dimensions of grid 110. TorusMap (which includes an array) indicates the switch-based size of grid 110 oriented to indicate larger dimensions of grid 110 before smaller dimensions of grid 110. Scheduler 515 applies TorusMap to all nodes 115 identified in FreeNodeList. InverseTorusMap (which includes an array) is an inverse of TorusMap, and scheduler 515 applies InverseTorusMap to a list of nodes 115 allocated to a job 150 before returning the list to cluster management engine 130 for processing. As an example and not by way of limitation, if cluster management engine 130 communicates a switch-based torus size of 14×16×15 to scheduler 515, scheduler 515 sets TorusMap to {2,0,1}. The switch-based torus size then becomes 16×15×14 and, for a node 155 in FreeNodeList having indices {x,y,z}, the indices of node 155 after scheduler 515 applies TorusMap are {y,z,x}. The InverseTorusMap for the above example is {1,2,0}.

In particular embodiments, NumMapDimensions indicates a Number of dimensions for modification when converting a switch-based torus to a node-based torus. MapDimsions[2] and MapMod[2] provide indices of the dimensions for modification and respective multipliers of the dimensions for modification. Scheduler 515 may multiply one of the dimensions for modification by four or multiply each of two of the dimensions for modification by two. Scheduler 515 determines which multiplication to apply and then modifies a size of the torus, initially described in terms of switches, accordingly. Scheduler 515 determines, according to RequestType, which multiplication to apply.

In particular embodiments, scheduler 515 applies one or more geometric transformations to a request to generate a list of meshes satisfying the request. A mesh includes a box embedded in grid 110. A start point, [Sx,Sy,Sz], and an end point, [Ex,Ey,Ez], define a mesh. A mesh "wraps" in one or more dimensions if the mesh has a start point greater than an end point in the one or more dimensions. As an example and not by way of limitation, a mesh with a start point at [3,7,5] and an end point at [2,9,4] wraps in the x and y dimensions. A point, [x,y,z], in grid 110 resides in a nonwrapping mesh if [Sx≦x≦Ex], [Sy≦y≦Ey], and [Sz≦z≦Ez]. After scheduler 515 generates a list of meshes satisfying the request, scheduler 515 loops through the list until scheduler 515 identifies a mesh that is schedulable with respect to a set of nodes 155 available for allocation to the request. Generally, a three dimensional request tends to result in six meshes satisfying the request, a two dimensional request tends to result in tens of meshes satisfying the request, and a one dimensional request tends to result in hundreds of meshes satisfying the request. In particular embodiments, scheduler 515 sets a node-based torus for a two or three dimensional request to maximize a Number of meshes satisfying the request.

To initialize variables for scheduling (or allocating one or more nodes 115 to) a one dimensional request, scheduler 515 sets a y axis and a z axis of switches 166 in grid 110 to a 2×2 configuration of nodes 115. Scheduler 515 maps job 150 so that a z axis of switches 166 in grid 110 is an unused dimension. Scheduler 515 then folds job 150 along the z axis into the y axis. Therefore, in particular embodiments, the following applies to a one dimensional request:

NumMapDimensions=2
MapDimension[0]=1
MapDimension[1]=2
MapMod[0]=2
MapMod[1]=2

[n] indicate a one dimensional array having an index ranging from 0 to 1−n, where appropriate. As an example and not by way of limitation, a={4,6,2} corresponds to a[0]=4, a[1]=6, and a[2]=2, where appropriate.

In particular embodiments, scheduler 515 may also set a y axis and a z axis of switches 166 in grid 110 to a 2×2 configuration of nodes 115 to initialize variables for scheduling a two dimensional request. In particular embodiments, scheduler 515 folds a two dimensional requests into a third, unused dimension to generate a more compact shape for scheduling. Because many such folds may be possible, scheduler 515 may select a configuration (which may be different from a 2×2 configuration of nodes 115) that generates a greatest Number of such folds. Scheduler 515 may check each of six possible configurations for a two dimensional request and calculate a Number of possible folds for each of the six possible configurations. In particular embodiments, scheduler 515 selects a configuration allowing a greatest Number of possible folds. In particular embodiments, in the event of a tie between two 1×4 configurations, scheduler 515 first selects the 1×4 configuration modifying the z axis and then selects the 1×4 configuration modifying the y axis. In particular embodiments, in the event of a tie between a 1×4 configuration and a 2×2 configuration, scheduler 515 selects the 2×2 configuration. In particular embodiments, in the event of a tie between two or more 2×2 configurations, scheduler 515 first selects the 2×2 configuration modifying the y and z axes, then selects the 2×2 configuration modifying the x and z axes, and then selects the 2×2 configuration modifying the x and y axes. In particular embodiments, scheduler 515 initializes variables for scheduling a three dimensional request as scheduler 515 would initialize variables for scheduling a two dimensional request, except that a three dimensional request allows six orientations (or rotations) that are each unique with respect to each other instead of allowing folds.

In particular embodiments, to initialize variables for scheduling a compact request, scheduler 515 multiples a z axis of the compact request by four to generate a 1×4 configuration. Using a 1×4 configuration to process a compact request facilitates use of all nodes 115 coupled to a switch 166 allocated to the compact request, which in turn reduces fragmentation at switch points in grid 110. In particular embodiments, scheduler 515 similarly initializes variables for scheduling an any request.

A partition is a smallest mesh including all nodes 115 in grid 110 available for scheduling. PartStart[3] indicates a start coordinate of the partition, PartEnd[3] indicates an end coordinate of the partition, PartSize[3] indicates a size of the partition, and PartWraps[3] indicates whether the partition wraps. Scheduler 515 may construct a partition to reduce lengths of searches for nodes 115 satisfying a request. A partition may be much smaller than grid 110. For i=0, 1, and 2, PartStart[i] includes a minimum of all possible i coordinates in FreeMesh (which includes an array) and PartEnd[i] includes a maximum of all possible i coordinates in FreeMesh. PartSize[i]=PartEnd[i]−PartStart[i]+1. If PartSize[i] equals TorusSize[i], PartWraps[i] is True. Scheduler 515 sets NodeInUse (which includes an array) to NODE_NOT_IN_USE for all nodes in FreeMesh and set to NODE_IN_USE for all other nodes.

In particular embodiments, FreeY[i,j,k] contains a Number of free nodes 155 along line {i,j,k} to {i,TorusSize[1]−1,k}. FreeX[i,j,k] includes a Number of free nodes 115 along line {i,j,k} to {TorusSize[0]−1,j,k}. Scheduler 515 uses FreeY[i,j,k] and FreeX[i,j,k] to execute a scan algorithm, as described below. In particular embodiments, scheduler 515 constructs FreeY[i,j,k] and FreeX[i,j,k] only if SpatialAllowed or CompactAllowed is True.

If SpatialAllowed is True, scheduler 515 tries various structures for scheduling a request. A spatial job of size S={Sx,Sy,Sz} has up to six unique orientations: {Sx,Sy,Sz}, {Sx,Sz,Sy}, {Sy,Sx,Sz}, {Sy,Sz,Sx}, {Sz,Sx,Sy}, and {Sz,Sy,Sx}. The six orientations correspond to four unique 90° rotations and two unique 180° rotations that scheduler 515 may apply to a mesh. If any two dimensions are equal to each other, only three unique orientations are available. Scheduler 515 considers all possible orientations when scheduling a mesh. If a job 150 is two dimensional, i.e., one dimension of job 150 equals one, scheduler 515 may fold either of two used dimensions of job 150, i.e., dimensions of job 150 greater than one, into the unused dimension of job 150, i.e., the dimension of job 150 equal to one, in an accordion-like fashion to generate a more compact three dimensional mesh. If scheduler 515 folds a dimension that is not an integral multiple of a length of the fold, a last fold will be shorter than all preceding folds, which will result in a two dimensional mesh concatenated onto a three dimensional mesh. If job 150 is one dimensional, scheduler 515 may fold job 150 into either of two unused dimensions. Scheduler 515 may then fold either of two resulting dimensions into a remaining unused dimension. A resulting shape of the mesh would, generally speaking, be a concatenation of four meshes.

Figure 8:
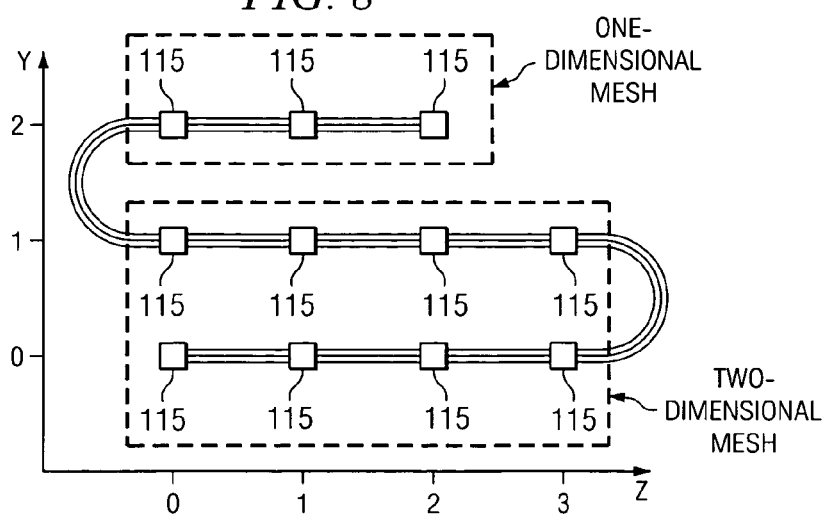
FIG. 8 illustrates an example one dimensional request folded into a y dimension.

FIG. 8 illustrates an example one dimensional request folded into a y dimension. In FIG. 8, scheduler 515 has folded the one dimensional request, {1,1,11}, into the y dimension using a fold length of four to generate a two dimensional mesh, {1,2,4}, and a one dimensional mesh {1,1,3}, concatenated onto the two dimensional mesh. Scheduler 515 may Number a first fold zero, a second fold one, and a third, short fold two. When scheduler 515 assigns an MPI Rank to nodes 115 along a fold, the MPI Rank is incremented as a z value increases along even-Numbered folds and as z values decrease along odd-Numbered folds. As an example and not by way of limitation, the MPI Rank for node 115 at [0,0] may be zero, the MPI Rank for node 115 at [0,1] may be one, the MPI Rank for node 115 at [0,2] may be two, and the MPI Rank for node 115 at [0,3] may be three. The MPI Rank for node 115 at [1,3] may be four, the MPI Rank for node 115 at [1,2] may be five, and so on. Concatenation starts at z=0, since the fold has an even Number. If scheduler 515 folded the request using an odd Number of complete folds, concatenation would instead start at z=3 and continue inward toward x=0. In particular embodiments, scheduler 515 only considers accordion-like folds. Other types of folds exist. As an example and not by way of limitation, a fold may produce a staircase shape. Scheduler 515 may prohibit certain folds on one dimensional jobs 150. As described above, in particular embodiments, scheduler 515 folds one dimensional jobs 150 twice. A second fold either folds a dimension that scheduler 515 folded first or folds a dimension that scheduler 515 folded into first. In FIG. 8, scheduler 515 has folded a z dimension and folded into a y dimension. If a second fold folds a dimension that scheduler 515 folded first, scheduler 515 may generate up to three concatenations, for a total of four meshes. In particular embodiments, scheduler 515 allows no more than two concatenations. As a result, when scheduler 515 schedules a one dimensional job 150, a second fold is restricted to folding a dimension that scheduler 515 folded into first, unless the first fold did not result in concatenation. If a size of job 150 is an integral multiple of fold length, no concatenation results. In particular embodiments, such a restriction ensures that scheduler 515 allows no more than two concatenations. In particular embodiments, scheduler 515 initially constructs all possible meshes satisfying a request. If the request is one or two dimensional, scheduler 515 constructs each possible accordion-like fold and each possible orientation of each such fold. If the request is three dimensional, scheduler 515 constructs each possible orientation of the request. In particular embodiments, scheduler 515 records each such construction using a list of Try Structures, as described below.

If CompactAllowed is True, scheduler 515 constructs a compact mesh containing a requested Number of nodes 115. Scheduler 515 designates the mesh a best fit and stores the mesh in BestFit (which includes an array). As an example and not by way of limitation, let N be the requested Number of nodes 115 and Q be a cubic root of N truncated to an integer. Scheduler initially sets BestFit to {Q, Q, Q}. If N=$Q^3$, scheduler 515 is done. Otherwise, scheduler 515 will increment one or more dimensions of BestFit according to a BuildCompactFits function, as described below. Scheduler 515 then constructs all meshes having dimensions greater than or equal to dimensions of BestFit and less than or equal to dimensions of grid 110 and records the meshes using Fit (which includes an array).

Scheduler 515 then removes undesirable meshes from Fit. As described above, in particular embodiments, grid 110 is a three dimensional torus of switches 166 each coupled to four CPUs 164. Scheduler 515 modifies the torus by either a factor of four in one dimension or a factor of two in two dimensions to account for grid 110 including four CPUs 164 per switch 166. To increase a likelihood scheduler 515 will satisfy a request so that, when one CPU 164 at a switch 166 executes a process, all CPUs 164 at switch 166 execute processes, scheduler 515 keeps only meshes having sizes in the one or more modified dimensions that are integral multiples of the multiplication factor. As an example and not by way of limitation, if scheduler 515 multiplied a torus of switches 166 in a y dimension by two and in a z dimension by two, scheduler 515 would keep only meshes in Fit having even y and z dimensions.

Scheduler 515 then sorts remaining meshes in Fit according to maximum hop counts in the remaining meshes. A maximum distance between any two nodes in a mesh of size {Sx,Sy,Sz} is (Sx+1)+(Sy-1)+(Sz-1). If two meshes have maximum hop counts identical to each other, scheduler 515 puts the mesh closer to being a cube before the other mesh. As an example and not by way of limitation, $M_1$={4,6,16} and $M_2$={8,9,9} have the same maximum distance, but scheduler 515 puts $M_2$ before $M_1$.

Even if scheduler 515 did not remove undesirable meshes from Fit, scheduler 515 would not generate all meshes including at least N nodes 115. As an example and not by way of limitation, if N equaled twenty-seven and BestFit equaled {3,3,3}, Fit would not include mesh {1,1,27}. Mesh {1,1,27} would not result in a reasonable Number of meshes and would always result in at least one mesh satisfying a request, since Fit would include a mesh equal to grid 110 and cluster management engine 130 calls scheduler 515 only if N is less than or equal to a Number of nodes 115 in grid 110.

Figure 9:
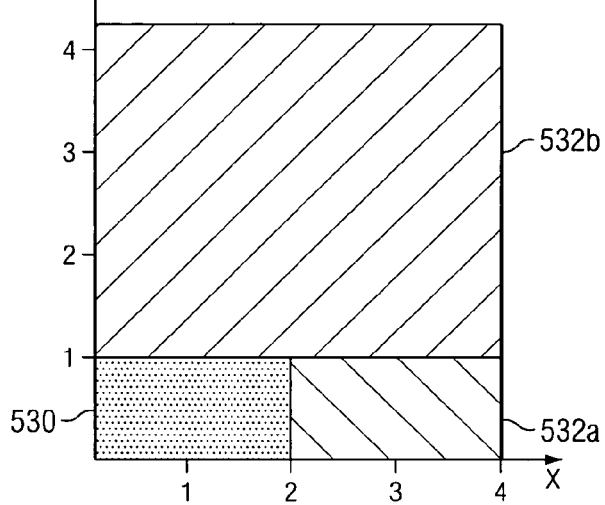
FIG. 9 illustrates two free meshes constructed using a y axis as an inner loop.
Figure 10:
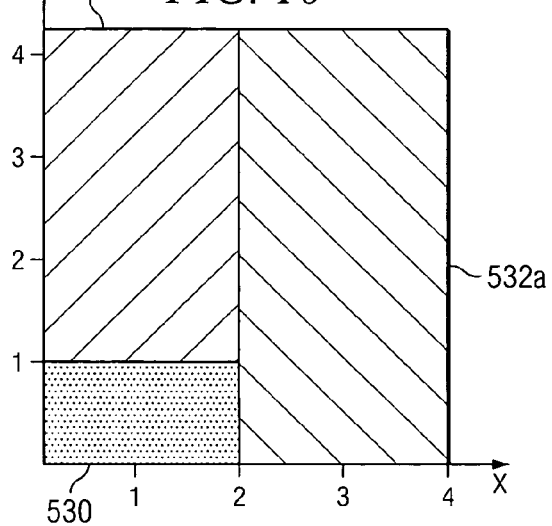
FIG. 10 illustrates two free meshes constructed using an x axis as an inner loop.

If AnyAllowed is true, to construct one or more free meshes, scheduler 515 loops through NodeInUse with an x axis as an outer loop, a y axis next, and a z axis as an inner loop until scheduler 515 identifies a free node 115. A free mesh includes a mesh including only free nodes 115, and a free node 115 includes a node 115 allocatable to a job 150. Scheduler 515 constructs NumFreeMeshes and FreeMesh[NumFreeMeshes]. NumFreeMeshes indicates a Number of free meshes in grid 110, and FreeMesh is a list identifying, for each free mesh in grid 110, one or more free meshes structures in grid 110. As an example and not by way of limitation, indices of node 115 may be {i1,j1,k1}. Scheduler 515 may increment a z axis until scheduler 515 identifies a nonfree node 115, such as, for example, {i1,j1,k2}. Scheduler 515 may set FreeMesh.start[2] to k1 and FreeMesh.end[2] to k2-1. FreeMesh.start[2] corresponds to a start value of a free mesh along the z axis, and FreeMesh.end[2] corresponds to an end value of the free mesh. Scheduler 515 may then increment a y axis, starting at j1, to identify a first value, j2, so that line, {i1,j2,k1} through {i1, j1, k2-1}, includes at least one nonfree node. Scheduler 515 then sets FreeMesh.start[1] to j1 and FreeMesh.end[2] to j2-1. Scheduler 515 then increments an x axis, starting at i1, to identify a first value, i2, so that plane, {i2,j1,k1} through {i2,j2-1,k2-1}, includes at least one nonfree node. Scheduler then sets FreeMesh.start[0] to i1 and FreeMesh.end[0] to i2-1. Scheduler 515 repeats the above process scheduler 515 covers all nodes 115 in grid 110. The above process does not result in a unique set of free meshes. Looping in a different order tends to generate a different set of free meshes, but only if two or more free meshes share a boundary with each other. A free mesh entirely surrounded by nodes 115 in is always unique. FIGS. 9 and 10 illustrate a difference between using a y axis as an inner loop and an x axis as an inner loop in a two dimensional case. FIG. 9 illustrates two free meshes constructed using a y axis as an inner loop, and FIG. 10 illustrates two free meshes constructed using an x axis as an inner loop. In FIG. 9, area 530 includes nodes 115 in use, area 532a is a first free mesh, and area 532b is a second free mesh. Similarly, in FIG. 10, area 530 includes nodes 115 in use, area 532a is a first free mesh, and area 532b is a second free mesh.

In particular embodiments, scheduler 515 uses a first scheduling algorithm to schedule spatial requests, a second scheduling algorithm to schedule compact requests, and a third scheduling algorithm to schedule any requests. The first and second scheduling algorithms are similar to each other, but use scan algorithms that are relatively different from each other. If scheduler 515 schedules a job 150, scheduler 515 lists nodes 150 allocated to job 150 in AssignedNodeList according to MPI Rank, i.e., AssignedNodeList[i] has MPI Rank i.

To schedule a spatial request having size {Sx,Sy,Sz}, scheduler 515 uses a scan algorithm to search for a start point in NodeInUse for the spatial request. The following example logic provides an example description of an example scan algorithm. PartStart is a start point and PartEnd is an end point of a partition and Tx, Ty, and Tz are torus sizes in x,y, and z dimensions, respectively.

```
For x = PartStart[0] to PartEnd[0]
    For y = PartStart[1] to PartEnd[1]
        For z = PartStart[2] to PartEnd[2]
            Hit = True
            For i = x to x+Sx-1
                For j = y to y+Sy-1
                    For k = z to z+Sz-1
                        If (NodeInUse[i mod Tx, j mod Ty, k mod Tz) =
                            NODE_IN_USE
                            Hit = False
                        End If
                    End For
                End For
            End For
            If (Hit = True)
                Return True
            End If
        End For
    End For
End For
Return False
```

In particular embodiments, a scan algorithm applicable to a compact request replaces the above Hit flag with a Count value incremented in an innermost loop as follows:

```
Count = 0
For i = x to x+Sx-1
    For j = y to y+Sy-1
        For k = z to z+Sz-1
            If (NodeInUse[i mod Tx,j mod Ty, k mod Tz] =
            NODE_NOT_IN_USE
                Count = Count + 1
            End If
        End For
    End For
End For
If (Count ≧ RequestedNodes)
    Return True
End If
```

The above logic is relatively inefficient, since scheduler 515 evaluates each point in NodeInUse up to Sx×Sy×Sz times. In the above scan of a compact request, as a z loop increments from, say, z1 to z1+1, i and j inner loops do not change and a k loop changes only at end points. As a result, a two dimensional mesh from {x,y,z1} to {x+Sx,y+Sy-1,z1} is excluded from further calculations and scheduler 515 adds a two dimensional mesh from {x,y,(z1+1)+Sz-1} to {x+Sx-1,y+Sy-1,(z1+1)+Sz-1} to further calculations. i,j, and k inner loops count free nodes 115 in a sequence of two dimensional meshes along a z axis of size {Sx,Sy,1}. A z loop removes one mesh and adds another. At a y loop, a similar effect occurs along a y axis. FreeX and FreeY (which both include arrays) facilitate reducing processing time. In particular embodiments, scheduler 515 uses the following algorithm to scan a compact request:

```
Define an array, zPlane[TorusSize[2]], to store two dimensional mesh
counts.
Compute an end point of x, y, and z loops as follows:
    For i = 0 to 2
        If PartWraps[i] = True, end[i] = PartEnd[i]
        Else end[i] = PartEnd[i] - Size[i]
    Now x will loop from PartStart[0] to End[0] and so on.
x loop
    For each z = PartStart[2] to PartEnd[2], re-compute zPlane for meshes
    {x,PartStart[1],z} to {x+Sx-1,PartStart[1]+Sy-1,z}
        In particular embodiments, scheduler 515 would use three loop
        here. FreeY used here reduces a Number of loops to two: one loop
        for x and one lop for z. FreeY[x,PartStart[1],z] -
        FreeY[x,PartStart[1]+Sy,2] provides a Number of free nodes 115
        along line {x,PartStart[1],z} to {x,PartStart[1]+Sy-1,z} inclusively.
    Set NewX = True for the below y loop.
y loop
    If NewX = True
        Do nothing.
    Else
        Update zPlane
        For each z = PartStart[2] to PartEnd[2],
            Subtract free nodes 115 in line segment from {x,y-1,z} to
            {x+Sx-1,y-1,z} from Zplane[z]
                Use FreeX[x,y-1,z] - FreeX[x+Sx,y-1,z] to avoid
                looping over x
            Add free nodes 115 in line segment from {x,y+Sy-1,z} to
            {x+Sx-1,y+Sy-1,z} to zPlane[z]
                Use FreeX[x,y+Sy-1,z] - FreeX[x+Sx,y+Sy-1,z] to
                avoid looping over x
    Set NewX = False for a next y increment
    Set NewY = True for the below z loop
z loop
    If NewY = True
        Sum zPlane from z = PartStart[2] to z = PartEnd[2] and record
        results in Count
    Else
        Subtract zPlane[z-1] from Count
        Compute zPlane[z+Sz-1], which is a sum of free nodes 115 in a two
        dimensional mesh from {x,y,z+Sz-1} to {x+sX-1,y+Sy-1,z+Sz-1}.
```

As described above, use FreeX to reduce a Number of loops from two to one.
Add zPlane[z+Sz-1] to Count
If Count ≧ RequestedNodes, Return True In particular embodiments, scheduler 515 applies one or more of the following modifications to address a partition wrapping in a dimension: (1) if indices in the dimension exceed array bounds, scheduler 515 applies a modulus function to the indices before any array reference; and (2) if the partition wraps in an x dimension or a y dimension, to compute free nodes 115 for a line segment, e.g., from point a to point b, scheduler 515 computes free nodes 115 for two line segments, one from point a to an end of the partition in the x or y dimension and another from a beginning of the partition to point b.

In particular embodiments, a scan algorithm applicable to a spatial request is similar to the above scan algorithm applicable to a compact request. In particular embodiments, differences between a scan algorithm applicable to a spatial request and the above scan algorithm applicable to a compact request include the following: (1) instead of scheduler 515 identifying a point in a mesh having a particular Count, scheduler 515 looks for a point in the mesh at which all nodes 115 are free, which tends to reduce a memory references; and (2) scheduler 515 may need to handle one or more concatenated meshes, since, as described above, scheduler 515 may be dealing with a one dimensional request or a two dimensional request folded to produce a base mesh having up to two additional meshes concatenated onto the base mesh. In particular embodiments, such modifications to the scan algorithm tend to reduce a maximum run time associated with scheduler 515 scheduling a 16×16×16 configuration by one or more orders of magnitude.

To schedule a spatial request, scheduler 515 uses a scheduling algorithm that applies a scan algorithm to each Try structure in a list of Try structures until scheduler 515 identifies a Try Structure that is schedulable. If no Try structures in the list are schedulable and an aggressive flag on the spatial request is zero, scheduler 515 returns to cluster management engine 130 without scheduling the spatial request. Otherwise, scheduler 515 uses a compact scheduling algorithm to try to schedule the spatial request.

In particular embodiments, scheduling a request according to a spatial algorithm involves up to three transformations: two folds and one rotation. Scheduler 515 keeps track of the transformations using the following fields in Try:

Try.rMap is a mapping function for rotation. Try.rMap is an array having three elements that maps indices of a point. As an example and not by way of limitation, Try.rMap={1, 0, 2} means index 0 gets mapped to 1, index 1 gets mapped to 0 and index 2 gets mapped to 2 so that, under the map, {x, y, z}→{y, x, z}.

Try.irMap is an inverse of Try.rMap.

Try.NumFoldMaps indicates a Number of folds producing a Try Structure.

Try.foldLength is an array indicating lengths of folds.

Try.foldFrom is an array indicating an index of a folded dimension. As an example and not by way of limitation, Try.foldFrom[i]=2 indicates that an i fold folded a z axis.

Try.foldTo is an array indicating an index of a dimension folded into.

Try.foldFix is an array indicating an index of a dimension that remained fixed.

In particular embodiments, after scheduler 515 determines that a job 150 is schedulable at a starting point in grid 110 using a Try structure, scheduler 515 assigns MPI Ranks as follows:

Scheduler 515 applies an inverse rotation map to the starting point to map the starting point to a pretransformed mesh. Scheduler 515 constructs folds to leave the starting point of the mesh fixed so that scheduler 515 need not apply an inverse fold.

Scheduler 515 loops through the pretransformed mesh into to generate MPI Rank. As described above, in particular embodiments, an x axis is an outer loop, a y axis is a middle loop, and a z axis is an inner loop.

Scheduler 515 applies the transformations applied to the pretransformed mesh to each point {x,y,z} in the loop according to an order scheduler 515 applied the transformations to the pretransformed mesh, i.e., scheduler 515 folds 0, then folds 1, and then rotates the point to get a point, {x',y',z'}, in the pretransformed mesh. Scheduler 515 then inserts the node, {x',y',z'}, into an end of AssignedNodeList.

In particular embodiments, a compact scheduling algorithm applies a scan algorithm to each mesh in a list of Try structures until the compact scheduling algorithm identifies a Try structure that works. A Number of meshes in the list may be relatively large. As an example and not by way of limitation, for a torus including 16×16×16 nodes 115 and a request for one hundred nodes 115, BestFit={4,4,5}, which results in over two thousand meshes in a Try structures list. Although applying a binary search to the Try structures list may be desirable, a binary search of the Try structures list would not work in particular embodiments. A binary search including condition C would not work unless, (1) if C were true for element i, C were true for all j greater than or equal to i and, (2) if C were false for element i, C were false for all j less than or equal to i. In particular embodiments, a binary search of a Try structures list would not work, since a possibility exists that a scan using, for example, mesh M1={4,4,4} would find enough nodes to satisfy a request, while a scan using, for example, mesh M2={2,2,10} would not, despite M2 being above M1 in the Try structures list. In particular embodiments, a binary search of maximum distances works. If scheduler 515 groups meshes in a Try structures list according to maximum distance, then, if scheduler 515 identifies a fit for a mesh in the list having a maximum distance i, for all j greater than or equal to i, at least one mesh in the list having a maximum distance j will also fit. If no mesh in the list having a maximum distance i fits, no mesh in the list having a maximum distance less than or equal to i will fit either. As an example and not by way of limitation, suppose {x,y,z} is a mesh having a maximum distance i that fits. Therefore, {x,y,z+1} has a maximum distance i+1 and, since {x,y,z+1} covers {x, y, z}, {x,y,z+1} also works. Induction applies to all j greater than or equal to i. If no mesh in the list having a maximum distance i works, with respect to any mesh {x,y,z} having a maximum distance i−1, {x,y,z+1} has a maximum distance i and also does not fit. Neither does {x,y,z} since {x,y,z+1} covers {x,y,z}. Accordingly, Scheduler 515 constructs MaxDistance[NumMaxDistances,2] during initialization.

In particular embodiments, a binary search of meshes in Fit does not guarantee a best fit, but provides a reasonably good upper bound on a best fit. In particular embodiments, a binary search of meshes in Fit is efficient, e.g., generating approximately ten scans for approximately one thousand meshes. Scheduler 515 may use an upper bound to run a binary search on maximum lengths or run a linear search downward from the upper bound. In particular embodiments, a linear search downward tends to be more efficient.

Scheduler 515 runs a binary search on Fit and returns HighFit and HighStart[3]. HighFit is an index of Fit satisfying a request, and HighStart is a starting point of a fit in grid 110. An algorithm for running a linear search downward begins with HighFit and HighStart. In particular embodiments, scheduler 515 decrements a maximum distance of a current HighFit mesh. Scheduler 515 then loops through all meshes including the maximum distance until scheduler 515 identifies a mesh satisfying the request. If scheduler 515 identifies a mesh satisfying the request, scheduler 515 sets the mesh to HighFit, decremented the maximum distance again, and repeats the process. If scheduler 515 identifies no such meshes, the algorithm exits and a current HighFit is a best fit. If scheduler 515 cannot identify a fit for a particular maximum distance, then scheduler 515 cannot identify a fit for a shorter maximum distance.

Scheduler 515 loops through a Fit mesh and inserts one or more nodes 115 into an end of AssignedNodeList. An order of the three loops depends on how scheduler 515 mapped a switch-based torus to a node-based torus. If scheduler mapped the switch-based torus using a 4×1 configuration in one dimension, the one dimension is an inner loop. If scheduler 515 mapped the switch-based torus using a 2×2 configuration in two dimensions, the two dimensions are innermost loops.

To schedule an any request, scheduler 515 loops through FreeMesh and fills the any request until scheduler 515 has assigned a requested Number of nodes 115 to the any request Scheduler 515 inserts nodes 115 into AssignedNodeList incrementally as scheduler 515 loops through FreeMesh. In particular embodiments, scheduler 515 loops through FreeMesh as follows:

A z axis is an innermost loop. Scheduler 515 expanded the z axis by a factor of four when scheduler 515 converted a switch-based torus to a node-based torus.

Using the z axis as an innermost loop tends to avoid fragmentation of CPUs 164 coupled to a switch 116.

A smaller one of two remaining dimensions in FreeMesh is a middle loop, and a larger one of the two remaining dimensions is an outermost loop.

Scheduler 515 lists selected nodes 115 using node-based coordinates in AssignedNodeList according to MPI Rank. AssignedNodeList[i,0] is a x coordinate of a node 115 of MPI Rank i, AssignedNodeList[i,1] is a y coordinate of node 115 of MPI Rank i, and AssignedNodeList[i,2] is a z coordinate of node 115 of MPI Rank i. FreeNodeList is a list of available nodes 115 passed to scheduler 515 in switch-based coordinates. In particular embodiments, to set an mpiRank field in FreeNodeList, scheduler 515 uses the following example algorithm:

---

For i = 0 to NumFreeNodes − 1
  Convert AssignedNodeList[i] to switch-based coordinates and add them to To[4]
  Apply InverseTorusMap to first three elements of To
  For j = 0 to NumFreeNodes − 1
    If To [k] = FreeNodeList[j].coordinate[k] for all k = 0,1,2,3
      FreeNodeList[j].mpiRank = i
      Exit j loop

---

The following example logic describes particular embodiments of scheduler 515. In particular embodiments, when cluster management engine 130 calls scheduler 515 to schedule a job 150, cluster management engine 130 communicates values for the following input parameters to scheduler 515:

| | |
|---|---|
| RequestedNodes: | Indicates a Number of nodes 115 requested. |
| RequestType: | Indicates a request type. Set to SPATIAL, COMPACT, or ANY. |
| RequestSize: | An array having three elements indicating a request size. Valid only for SPATIAL requests. |
| AggressiveFlag: | A floating-point number between zero and one indicating a degree of leeway allotted to scheduler 515 for purposes of allocating nodes 115 to job 150. |
| TorusSize: | An array having three elements indicating a switch-based size of grid 110. |
| NodesPerSwitch: | A Number of CPUs 164 coupled to each switch 166 in grid 110. |
| NumFreeNodes: | A Number of nodes 115 in FreeNodeList. |
| FreeNodeList: | A list of FreeNode structures indicating switch-based coordinates of nodes 115 available for scheduling. |

In particular embodiments, scheduler 515 returns one of the following after scheduler 515 attempts to schedule a job 150:

| | |
|---|---|
| PQS_ASSIGNED: | Indicates scheduler 515 has scheduled job 150. |
| PQS_NO_ASSIGNMENT_AT_SPECIFIED_TIME: | Indicates scheduler 515 has not schedule job 150. |
| PQS_NO_ASSIGNMENT_FOR_JOB_CATEGORY: | Indicates scheduler 515 can never schedule job 150, even if all nodes 115 in grid 110 are available. |

If scheduler 515 schedules job 150, scheduler 515 sets mpiRank fields of FreeNode structures accordingly. In particular embodiments, a wrapper function between cluster management engine 130 and scheduler 515 converts input from cluster management engine 130 to a format that scheduler 515 expects and converts output from scheduler 515 to a format that cluster management engine 130 expects.

In particular embodiments, setSchedulable, which determines whether a job 150 is theoretically schedulable, encompasses the following example logic:

```
If setSchedulable( ) = False
    Return PQS_NO_ASSIGNMENT_FOR_JOB_CATEGORY
End If
If initScheduler( ) = False
    Return PQS_NO_ASSIGNMENT_AT_SPECIFIED_TIME
End If
If RequestedNodes > NumFreeNodes
    ret = False
Else
    ret = scheduleJob( )
End If
If ret = True
    setMpiRank( )
    Return PQS_ASSIGNED
Else
    Return PQS_NO_ASSIGNMENT_AT_SPECIFIED_TIME
End If
```

In particular embodiments, Rank, which scheduler 515 calls to rank job sizes, encompasses the following example logic. Input to Rank includes a one dimensional array, In[3], having three elements. Output from Rank includes a one dimensional array, Rank[3], having three elements indicating, in increasing size, indices of In. In[Rank[0]]≦In[Rank[1]]≦In[Rank[2]]. In particular embodiments, Rank includes a bubble algorithm.

```
Rank[0] = 0
Rank[1] = 1
Rank[2] = 2
For i = 0 to 2
    For j = i+1 to 2
        If In[Rank[j]] < In[Rank[i]]
            k = Rank[j]
            Rank[j] = Rank[i]
            Rank[i] = k
        End If
    End For
End For
```

In particular embodiments, setSchedulable, which determines whether a job 150 is theoretically schedulable, encompasses the following example logic:

```
For i = 0 to 2
    If TorusSize[i] ≦ 1
    Return False
End For
If RequestedNodes > TorusSize[0] × TorusSize[1] × TorusSize[2] ×
                    NodesPerSwitch
    Return False
End If
If NodesPerSwitch not equal to four
    Return False;
End If
If RequestType = SPATIAL
    factor[0] = 2
    factor[1] = 2
    Rank(TorusSize, tRank)
    Rank(RequestedSize, jRank)
    NumJobDim = 0
    NumExceed = 0
    For i = 0 to 2
        If RequestedSize[i] > 1)
            NumJobDim = NumJobDim + 1
        Else If RequestedSize[i] < 1
            Return False
        End If
        If RequestedSize[jRank[i]] > TorusSize[tRank[i]]
            Exceed[NumExceed] = i
            NumExceed = NumExceed + 1
        End If
    End For
    If NumExceed = 0
        Return True
    Else If NumExceed = 1
        If RequestedSize[jRank[Exceed[0]] ≦ NodesPerSwitch ×
                          TorusSize[tRank[Exceed[0]]
            Return True
        End If
        If NumJobDim < 3
            Return True
        End If
        Return False
    Else
        If RequestedSize[jRank[Exceed[0]] ≦ factor[0] ×
                          TorusSize[tRank[Exceed[0] and
                          RequestedSize[jRank[Exceed[1]] ≦ factor[1] ×
                          TorusSize[tRank[Exceed[1]]
            Return True
        End If
        If NumJobDim < 3 and (RequestedSize[jRank[Exceed[0]] ≦
                          NodesPerSwitch × TorusSize[tRank[Exceed[0]] or
                          RequestedSize[jRank[Exceed[1]] ≦ NodesPerSwitch ×
                          TorusSize[tRank[Exceed[1]])
            Return True
        End If
        return False
    End If
return True
```

In particular embodiments, initScheduler, which sets allowed scheduling types, encompasses the following example logic. If a job 150 requests only one node 115, initScheduler sets an allowed type to Any, regardless of an original request:

```
If RequestedNodes = 1 or RequestType = Any
   AnyAllowed = True
   SpatialAllowed = False
   CompactAllowed = False
Else If RequestType = Compact
   CompactAllowed = True
   AnyAllowed = False
   SpatialAllowed = False
Else If RequestType = Spatial
   SpatialAllowed = True
   AnyAllowed = False
   If AggressiveFlag > 0
      CompactAllowed = True
   Else
      Compact Allowed = False
   End If
End If
factor[0] = 2
factor[1] = 2
Rank(TorusSize, tRank)
TorusMap[0] = tRank[2]
TorusMap[1] = tRank[1]
TorusMap[2] = tRank[0]
InverseTorusMap[tRank[0]] = 2
InverseTorusMap[tRank[1]] = 1
InverseTorusMap[tRank[2]] = 0
If SpatialAllowed = True
   If setTorusForSpatial( ) = False
      Return False
   End If
Else If CompactAllowed = True
   If setTorusForCompact1( ) = False
      Return False
   End If
Else
   If setTorusForAny( ) = False
      Return False
   End If
End If
For i = 0 to NumMapDimensions
   TorusSize[mapDiminsions[i]] = mapMod[i] ×
   TorusSize[mapDiminsions[i]]
End For
SetPartition( )
If SpatialAllowed = True
   buildSpatialTries( )
End If
If compactAllowed = True
   buildCompactFits( )
End If
If AnyAllowed = True
   buildFreeMeshes( )
End If
If SpatialAllowed = True or CompactAllowed = True
   InitScan( )
End If
return True
```

In particular embodiments, setTorusForSpatial, which maps a switch-based torus to a node-based torus for a spatial request, encompasses the following example logic:

```
Rank(RequestedSize, jRank)
NumDim = 0
dNdx = 0
For i = 0 to 2
   If RequestedSize[i] > 1
      twoD[NumDim] = i
      NumDim = NumDim + 1
```
```
   Else
      oneD[dNdx] = i
      dNdx = dNdx + 1
   End If
End For
If NumDim = 1
   Return setTorusFor1D( )
Else If NumDim = 2
   Return setTorusFor2D( )
Else
   Return setTorusFor3D( )
End If
```

In particular embodiments, setTorusFor1D, which multiplies grid 110 by two factors in two largest dimensions of job 150,jRank[2] and jRank[1], encompasses the following example logic:

```
NumMapDiminsions = 2
mapDiminsions[0] = jRank[2]
mapDiminsions[1] = jRank[1]
mapMod[0] = factor[0]
mapMod[1] = factor[0]
For i = 0 to 3
   ntSize[i] = TorusSize[TorusMap[i]]
End For
For i = 0 to 3
   TorusSize[i] = ntSize[i]
End For
For i = 0 to 3
   RequestedSize[i] = OriginalSize[jRank[i]]
   JobMap[jRank[i]] = i
End For
Return True
```

In particular embodiments, setTorusFor2D maps a switch-based torus to a node-based torus in one of six ways:

1. $\{T[0], T[1], T[2]\} \rightarrow \{T[0], 2 \times T[1], 2 \times T[2]\}$
2. $\{T[0], T[1], T[2]\} \rightarrow \{2 \times T[0], T[1], 2 \times T[2]\}$
3. $\{T[0], T[1], T[2]\} \rightarrow \{2 \times T[0], 2 \times T[1], T[2]\}$
4. $\{T[0], T[1], T[2]\} \rightarrow \{T[0], T[1], 4 \times T[2]\}$
5. $\{T[0], T[1], T[2]\} \rightarrow \{T[0], 4 \times T[1], T[2]\}$
6. $\{T[0], T[1], T[2]\} \rightarrow \{4 \times T[0], T[1], T[2]\}$ T is TorusSize. The first three configurations result from scheduler 515 configuring nodes 115 per switch 166 as 2×2 nodes 115. The last three configurations result from scheduler 515 configuring nodes 115 per switch 166 as 1×1 nodes 115. In particular embodiments, setTorusFor2D counts Try structures that scheduler 515 would generate for each map and selects a map that would generate a greatest number of Try structures. In the event of a tie, setTorusFor2D selects a map according to the above order. Scheduler 515 constructs-pSize [6,4] to include:

pSizes[i, 0]=size of the partition in the x dimension for configuration i.

pSizes[i, 1]=size of the partition in the y dimension for configuration i.

pSizes[i, 2]=size of the partition in the z dimension for configuration i.

pSizes[i, 3]=the Number of tries that would be generated for configuration i.

In particular embodiments, setTorusFor2D encompasses the following example logic:

```
max = -1
maxNdx = -1
For i = 0 to 2
   For j = i+1 to 3
      NumMapDiminsions = 2
      mapDiminsions[0] = (i+j) mod 3
      mapDiminsions[1] = (i+j+1) mod 3
      mapMod[0] = factor[0]
      mapMod[1] = factor[1]
      setTestPartSize(testPartSize)
      pSizes[i + j - 1, 2] = testPartSize[2]
      pSizes[i + j - 1, 1] = testPartSize[1]
      pSizes[i + j - 1, 0] = testPartSize[0]
      pSizes[i + j - 1][3] = cnt2DTries(testPartSize, RequestedSize)
      If pSizes[i + j - 1][3] > max
         max = pSizes[i + j - 1][3]
         maxNdx = i + j - 1
      End If
   End For
End For
For i = 0 to 3
   NumMapDiminsions = 1
   mapDiminsions[0] = 2 - i
   mapMod[0] = NodesperGrid
   setTestPartSize(testPartSize)
   pSizes[i+3, 2] = testspSize[2]
   pSizes[i+3, 1] = testspSize[1]
   pSizes[i+3, 0] = testspSize[0]
   pSizes[i+3][3] = cnt2DTries(testPartSize, RequestedSize)
   if pSizes[i+3][3] > max
      max = pSizes[i+3][3]
      maxNdx = i+3
   End If
End For
If max ≦ 0
   if CompactAllowed = True
      SpatialAllowed = False
      Return setTorusForCompact( )
   Else
      return False
   End If
Else
   For i = 0 to 2
      ntSize[i] = TorusSize[TorusMap[i]]
   End For
   For i = 0 to 2
      TorusSize[i] = ntSize[i]
   End For
   If maxNdx < 3
      NumMapDiminsions = 2
      mapDiminsions[0] = (maxNdx+1) mod 3
      mapDiminsions[1] = (maxNdx+2) mod 3
      mapMod[0] = factor[0]
      mapMod[1] = factor[1]
      RequestedSize[mapDiminsions[0]] = OriginalSize[jRank[1]]
      RequestedSize[mapDiminsions[1]] = OriginalSize[jRank[2]]
      RequestedSize[3 - mapDiminsions[0] - mapDiminsions[1] =
                 OriginalSize[jRank[0]]
      JobMap[jRank[1]] = mapDiminsions[0]
      JobMap[jRank[2]] = mapDiminsions[1]
      JobMap[jRank[0]] = 3- mapDiminsions[0]- mapDiminsions[1]
   Else
      NumMod = 1
      NumMapDiminsions = 1
      mapDiminsions[0] = (5 - maxNdx) mod 3
      mapMod[0] = NodesperGrid
      If mapDiminsions[0] = 2
         i = 1
      Else
         i = 2
      End If
      RequestedSize[mapDiminsions[0]] = OriginalSize[jRank[2]]
      RequestedSize[i] = OriginalSize[jRank1]]
      RequestedSize[3 - mapDiminsions[0] - i] = OriginalSize[jRank[0]]
      JobMap[jRank[2]] = mapDiminsions[0]
      JobMap[jRank[1]] = i
      JobMap[jRank[0]] = 3 - mapDiminsions[0] - i
   End If
End If
Return True
```

In particular embodiments, setTorusFor3D encompasses the following example logic:

```
max = -1
maxNdx = -1
For i = 0 to 2
   For j = i+1 to 2
      NumMapDiminsions = 2
      mapDiminsions[0] = (i+j) mod 3
      mapDiminsions[1] = (i+j+1) mod 3
      mapMod[0] = factor[0]
      mapMod[1] = factor[1]
      setTestPartSize(testPartSize)
      pSizes[i + j - 1, 2] = testPartSize[2]
      pSizes[i + j - 1, 1] = testPartSize[1]
      pSizes[i + j - 1, 0] = testPartSize[0]
      pSizes[i + j - 1, 3] = cnt2DTries(testPartSize, RequestedSize)
      If (pSizes[i + j - 1,3] > max)
         max = pSizes[i + j - 1, 3]
         maxNdx = i + j - 1
      End If
   End For
End For
For i = 0 to 2
   NumMapDiminsions = 1
   mapDiminsions[0] = 2 - i
   mapMod[0] = NodesperGrid;
   setTestPartSize(testPartSize)
   pSizes[i+3, 2] = testPartSize[2]
   pSizes[i+3, 1] = testPartSize[1]
   pSizes[i+3, 0] = testPartSize[0]
   pSizes[i+3], 3] = cnt2DTries(testPartSize, RequestedSize
   If pSizes[i+3][3] > max
      max = pSizes[i+3, 3]
      maxNdx = i+3
   End If
End For
If max ≦ 0
   If CompactAllowed = True
      SpatialAllowed = False
      Return setTorusForCompact( )
   Else
      return False
   End If
Else
   For i = 0 to 2
      ntSize[i] = TorusSize[TorusMap[i]]
   End For
   For i = 0 to 2
      TorusSize[i] = ntSize[i]
   End For
   If maxNdx < 3
      NumMod = 2
      mod[0] = (maxNdx+1)mod 3
      mod[1] = (maxNdx+2) mod 3
      NumMapDiminsions = 2
      mapDiminsions[0] = (maxNdx+1) mod 3
      mapDiminsions[1] = (maxNdx+2) mod 3
      mapMod[0] = factor[0]
      mapMod[1] = factor[1]
      RequestedSize[mapDiminsions[0]] = OriginalSize[jRank[1]]
      RequestedSize[mapDiminsions[1]] = OriginalSize[jRank[2]]
      RequestedSize[3 - mapDiminsions[0] - mapDiminsions[1]] =
                 OriginalSize[jRank[0]]
      JobMap[jRank1]] = mapDiminsions[0]
      JobMap[jRank2]] = mapDiminsions[1]
      JobMap[jRank0]] = 3 - mapDiminsions[0] - mapDiminsions[1]
```

```
Else
    NumMod = 1
    mod[0] = 2 – (maxNdx – 3)
    NumMapDiminsions = 1
    mapDiminsions[0] = (5 – maxNdx) mod 3
    mapMod[0] = NodesperGrid
    If mapDiminsions[0] = 2
        i = 1
    Else
        i = 2
    End If
    RequestedSize[mapDiminsions[0]] = OriginalSize[jRank[2]]
    RequestedSize[i] = OriginalSize[jRank[1]]
    requestedSize[3 – mapDiminsions[0] – i] = originalSize[jRank[0]];
    JobMap[jRank[2]] = mapDiminsions[0]
    JobMap[jRank[1]] = i
    JobMap[jRank[0]] = 3 – mapDiminsions[0] – i
    End If
End If
Return True
```

In particular embodiments, setTorusForCompact, which sets a z dimension of a compact request to a 4×1 configuration, encompasses the following example logic:

```
For i = 0 to 3
    ntSize[i] = TorusSize[tMap[i]]
End For
For i = 0 to 3
    TorusSize[i] = ntSize[i]
End For
NumMapDiminsions = 1
mapDiminsions[0] = 2
mapMod[0] = NodesperGrid
Return True
```

In particular embodiments, setTorusForAny, which sets a z dimension of an any request to a 4×1 configuration, encompasses the following example logic:

```
For i = 0 to 3
    ntSize[i] = TorusSize[tMap[i]]
End For
For i = 0 to 3
    TorusSize[i] = ntSize[i]
End For
NumMapDiminsions = 1
mapDiminsions[0] = 2
mapMod[0] = NodesperGrid
Return True
```

In particular embodiments, setPartition encompasses the following example logic:

```
For i = 0 to TorusSize[0] – 1
    For j = 0 to TorusSize[1] – 1
        For k = 0 to TorusSize[2] – 1
            NodeInUse[i,j,k] = NODE_IN_USE
        End For
    End For
End For
For i = 0 to 2
    PartStart[i] = TorusSize[i]
    PartEnd[i] = 0
End For
For i = 0 to NumFreeNodes – 1
    To[0] = FreeNodes[i].coordinate[TorusMap[0]]
    To[1] = FreeNodes[i].coordinate[TorusMap[1]]
    To[2] = FreeNodes[i].coordinate[TorusMap[2]]
    If NumMapDiminsions = 1
        To[MapDimension[0]] = To[MapDimension[0]] × MapMod[0] +
            FreeNodes[i].coordinate[3]
    Else
        To[MapDimension[0]] = To[MapDimension[0]] × MapMod[0] +
            FreeNodes[i].coordinate[3] / MapMod[1]
        To[MapDimension[1]] = To[MapDimension[1]] × MapMod[1] +
            FreeNodes[i].coordinate[3] mod MapMod[1]
    End If
    NodeInUse[To[0]], To[1], To[2]] = NODE_NOT_IN_USE
    For j = 0 to 2
        If To[j] < PartStart[j]
            PartStart[j] = To[j]
        End If
        If To[j] < PartStart[j]
            PartStart[j] = To[j]
        End If
    End For
End For
For i = 0 to 2
    If PartStart[i] = 0 and PartEnd[i] = TorusSize[i] – 1
        PartWraps[i] = True
    Else
        PartWraps[i] = False
    End If
    PartSize[i] = PartEnd[i] – PartStart[i] + 1
End For
```

In particular embodiments, initScan, which constructs FreeY and FreeX, encompasses the following example logic:

```
For i = 0 to TorusSize[0] – 1
    For k = 0 to TorusSize[2]– 1
        Count = 0
        For j = TorusSize[1] – 1 to 0 by –1
            If NodeInUse[i,j,k] = NODE_NOT_IN_USE
                Count = Count + 1
            End If
            FreeY[i,j,k] = Count
        End For
    End For
End For
For j = 0 to TorusSize[1] – 1
    For k = 0 to TorusStSize[2]– 1
        Count = 0
        For i = TorusSize[0] – 1 to 0 by –1
            If NodeInUse[i,j,k] = NODE_NOT_IN_USE
                Count = Count + 1
            End If
            FreeX[i,j,k] = Count
        End For
    End For
End For
```

In particular embodiments, buildSpatialTries, which determines a Number of dimensions in a request, encompasses the following example logic:

```
NumDim = 0
For i = 0 to 2
    If RequestedSize[i] > 1)
        NumDim = NumDim + 1
    End If
End For
If NumDim = 1
    build1DTry( )
Else If NumDim = 2
    build2DTry( )
```

```
        Else
            for i = 0 to 2
                Try.baseSize[i] RequestedSize[i]
            End For
            Try.NumConcats = 0
            Try.NumFoldMaps = 0
            NumberOfTries = 0
            build3Dtry(Try, NumberOfTries)
        End If
```

In particular embodiments, build3Dtry, which builds TryList for a three dimensional request and builds Try structures for each fold in a one dimensional request or a two dimensional request, encompasses the following example logic:

```
setOrient(Try, NumOrient, orient)
if NumOrient > 0
    For (i = 0 to NumOrient − 1
        ++NumTries;
        For j = 0 to 2
            TryList[NumberOfTries].baseSize[j] = Try.baseSize[orient[i, j]]
        End For
        TryList[NumberOfTries].NumConcats = Try.NumConcats;
        For j = 0 to TryList[NumberOfTries].NumConcats − 1
            For k = 0 to 2
                TryList[NumberOfTries.concatSize[j, k] =
                    Try.concatSize[j,orient[i, k]];
                TryList[NumberOfTries].concatStartNode[j, k] =
                    Try.concatStartNode[j, orient[i, k]];
            End For
        End For
        TryList[NumberOfTries].NumFoldMaps = Try.NumFoldMaps;
        For j = 0 to TryList[NumberOfTries].NumFoldMaps
            TryList[NumberOfTries].foldLength[j] = Try.foldLength[j]
            TryList[NumberOfTries].foldFrom[j] = Try.foldFrom[j]
            TryList[NumberOfTries].foldTo[j] = Try.foldTo[j]
            TryList[NumberOfTries].foldFix[j] = Try.foldFix[j]
        End For
        For k = 0 to 2
            TryList[NumberOfTries].rMap[k] = orient[i, k]
            TryList[NumberOfTries].irMap[orient[i, k]] = ;
        End For
        NumberOfTries = NumberOfTries + 1
```

In particular embodiments, setOrient, which calculates a Number of unique rotations, NumOrient, for a Try structure and an indices map for each rotation, encompasses the following example logic:

```
NumOrient = 0;
If try.NumberOfConcatanations > 0
    For i = 0 to 2
        size[i] = try.baseSize[i];
        For j = 0 to try.NumConcats − 1
            If try.concatStartNode[j, i] ≧ size[i]
                size[i] = Try.concatStartNode[j, i] + Try.concatSize[j, i];
            Else If Try.concatStartNode[j, i] < 0
                size[i] = size[i] − try.concatStartNode[j, i]
            End If
        End For
    End For
    If size[0] ≦ PartSize[0] and size[1] ≦ PartSize[1] andsize[2] ≦
            PartSize[2]
        orient[NumOrient, 0] = 0
        orient[NumOrient, 1] = 1
        orient[NumOrient, 1] = 2
        NumOrient = NumOrient + 1
    End If
    If size[0] ≦ PartSize[0] and size[2] ≦ PartSize[1] andsize[1] ≦
            PartSize[2]
        orient[NumOrient, 0] = 0
        orient[NumOrient, 1] = 2
        orient[NumOrient, 2] = 1
        NumOrient = NumOrient + 1
    End If
    If size[1] ≦ PartSize[0] and size[0] ≦ PartSize[1] andsize[2] ≦
            PartSize[2]
        orient[NumOrient, 0] = 1
        orient[NumOrient, 1] = 0
        orient[NumOrient, 2] = 2
        NumOrient = NumOrient + 1
    End If
    If size[1] ≦ PartSize[0] and size[2] ≦ PartSize[1] andsize[0] ≦
            PartSize[2]
        orient[NumOrient, 0] = 1
        orient[NumOrient, 1] = 2
        orient[NumOrient, 2] = 0
        NumOrient = NumOrient + 1
    End If
    If size[2] ≦ PartSize[0] and size[0] ≦ PartSize[1] andsize[1] ≦
            PartSize[2]
        orient[NumOrient, 0] = 2
        orient[NumOrient, 1] = 0
        orient[NumOrient, 2] = 1
        NumOrient = NumOrient + 1
    End If
    If size[2] ≦ PartSize[0] and size[1] ≦ PartSize[1] andsize[0] ≦
            PartSize[2]
        orient[NumOrient, 0] = 2
        orient[NumOrient, 1] = 1
        orient[NumOrient, 2] = 0
        NumOrient = NumOrient + 1
    End If
Else If Try.baseSize[0] = Try.baseSize[1]
    If try.baseSize[0] = try.baseSize[2]
        If Try.baseSize[0] ≦ PartSize[0] and Try.baseSize[1] ≦
                PartSize[1] and Try.baseSize[2] ≦ PartSize[2]
            orient[NumOrient, 0] = 0
            orient[NumOrient, 1] = 1
            orient[NumOrient, 2] = 2
            NumOrient = NumOrient + 1
        End If
    Else
        If Try.baseSize[0] ≦ PartSize[0] and Try.baseSize[1] ≦
                PartSize[1] and Try.baseSize[2] ≦ PartSize[2]
            orient[NumOrient, 0] = 0
            orient[NumOrient, 1] = 1
            orient[NumOrient, 2] = 2
            NumOrient = NumOrient + 1
        End If
        If Try.baseSize[0] ≦ PartSize[0] and Try.baseSize[2] ≦
                PartSize[1] and Try.baseSize[1] ≦ PartSize[2]
            orient[NumOrient, 0] = 0
            orient[NumOrient, 1] = 2
            orient[NumOrient, 2] = 1
            NumOrient = NumOrient + 1
        End If
        If Try.baseSize[2] ≦ PartSize[0] and Try.baseSize[0] ≦
                PartSize[1] and Try.baseSize[1] ≦ PartSize[2]
            orient[NumOrient, 0] = 2
            orient[NumOrient, 1] = 0
            orient[NumOrient, 2] = 1
            NumOrient = NumOrient + 1
        End If
    End if
Else if Try.baseSize[0] = Try.baseSize[2]
    If Try.baseSize[0] ≦ PartSize[0] and Try.baseSize[1] ≦
            PartSize[1] and Try.baseSize[2] ≦ PartSize[2]
        orient[NumOrient, 0] = 0
        orient[NumOrient, 1] = 1
        orient[NumOrient, 2] = 2
        NumOrient = NumOrient + 1
```

```
      End If
      If Try.baseSize[0] ≦ PartSize[0] and Try.baseSize[1] ≦
              PartSize[2] and Try.baseSize[1] ≦ PartSize[2]
          orient[NumOrient, 0] = 0
          orient[NumOrient, 1] = 2
          orient[NumOrient, 2] = 1
          NumOrient = NumOrient + 1
      End If
      If Try.baseSize[1] ≦ PartSize[0] and Try.baseSize[0] ≦
              PartSize[1] and Try.baseSize[2] ≦ PartSize[2]
          orient[NumOrient, 0] = 1
          orient[NumOrient, 1] = 0
          orient[NumOrient, 2] = 2
          NumOrient = NumOrient + 1
      End If
  Else Tf Try.baseSize[1] = Try≧baseSize[2])
      If Try.baseSize[0] ≦ PartSize[0] and Try.baseSize[1] ≦
              PartSize[1] and Try.baseSize[2] ≦ PartSize[2]
          orient[NumOrient, 0] = 0
          orient[NumOrient, 1] = 1
          orient[NumOrient, 2] = 2
          NumOrient = NumOrient + 1
      End If
      If Try.baseSize[1] ≦ PartSize[0] and Try.baseSize[0] ≦
              PartSize[1] and Try.baseSize[2] ≦ PartSize[2]
          orient[NumOrient, 0] = 1
          orient[NumOrient, 1] = 0
          orient[NumOrient, 2] = 2
          NumOrient = NumOrient + 1
      End If
      If Try.baseSize[1] ≦ PartSize[0] and Try.baseSize[2] ≦
              PartSize[1] and Try.baseSize[0] ≦ PartSize[2]
          orient[NumOrient, 0] = 1
          orient[NumOrient, 1] = 2
          orient[NumOrient, 2] = 0
          NumOrient = NumOrient + 1
      End If
  Else
      If Try.baseSize[0] ≦ PartSize[0] and Try.baseSize[1] ≦
              PartSize[1] and Try.baseSize[2] ≦ PartSize[2]
          orient[NumOrient, 0] = 0
          orient[NumOrient, 1] = 1
          orient[NumOrient, 2] = 2
          NumOrient = NumOrient + 1
      End If
      If Try.baseSize[0] ≦ PartSize[0] and Try.baseSize[2] ≦
              PartSize[1] and Try.baseSize[1] ≦ PartSize[2]
          orient[NumOrient, 0] = 0
          orient[NumOrient, 1] = 2
          orient[NumOrient, 2] = 1
          NumOrient = NumOrient + 1
      End If
      If Try.baseSize[1] ≦ PartSize[0] and Try.baseSize[0] ≦
              PartSize[1] and Try.baseSize[2] ≦ PartSize[2]
          orient[NumOrient, 0] = 1
          orient[NumOrient, 1] = 0
          orient[NumOrient, 2] = 2
          NumOrient = NumOrient + 1
      End If
      If Try.baseSize[1] ≦ PartSize[0] and Try.baseSize[2] ≦
              PartSize[1] and Try.baseSize[2] ≦ PartSize[0]
          orient[NumOrient, 0] = 1
          orient[NumOrient, 1] = 2
          orient[NumOrient, 2] = 0
          NumOrient = NumOrient + 1
      End If
      If Try.baseSize[2] ≦ PartSize[0] and Try.baseSize[0] ≦
              PartSize[1] and Try.baseSize[2] ≦ PartSize[1]
          orient[NumOrient, 0] = 2
          orient[NumOrient, 1] = 0
          orient[NumOrient, 2] = 1
          NumOrient = NumOrient + 1
      End If
      If Try.baseSize[2] ≦ PartSize[0] and Try.baseSize[1] ≦
              PartSize[1] and Try.baseSize[2] ≦ PartSize[0]
          orient[NumOrient, 0] = 2
          orient[NumOrient, 1] = 1
          orient[NumOrient, 2] = 0
          NumOrient = NumOrient + 1
      End If
  End If
End If
```

In particular embodiments, build2Dtry encompasses the following example logic:

```
Rank(PartSize, pRank)
build2DFold(PartSize, pRank, RequestedSize, NumFolds, Fold-
List)
For i = 0 to NumFolds − 1
    d1 = RequestedSize[FoldList[i].fixDimension] +
    FoldList[i].foldLengtht +
            FoldList[i].NumFolds
    If FoldList[i].remainder not equal 0
        d1 = d1 + 1
    End If
    For j = i + 1 to NumFolds − 1
        D2 = RequestedSize[FoldList[j].fixDimension] +
        FoldList[j].foldLengtht +
                FoldList[j].NumFolds
        If FoldList[j].remainder not equal 0
            D2 = d2 + 1
        End If
        If d2 < d1
            TempFold = FoldList[j]
            FoldList[j] = FoldList[i]
            FoldList[i] = tempFold
            d1 = d2
        End If
    End For
End For
NumberOfTries = 0
For i = 0 to NumFolds − 1
    try.baseSize[FoldList[i].fixDimension] =
            RequestedSize[FoldList[i].fixDimension]
    try.baseSize[FoldList[i].foldDimension] = FoldList[i].foldLength
    try.baseSize[FoldList[i].oneDimension] = FoldList[i].NumFolds
    If FoldList[i].remainder not equal 0
        try.NumConcats = 1
        If FoldList[i].NumFolds is odd
            Try.concatStartNode[0, FoldList[i]. foldDimension] =
                    FoldList[i].foldLength − FoldList[i].remainder
        Else
            Try.concatStartNode[0, FoldList[i]. foldDimension] = 0
        End If
        try.concatStartNode[0,FoldList[i]. fixDimension] = 0
        try.concatStartNode[0,FoldList[i]. oneDimension] =
        FoldList[i].NumFolds
        try.concatSize[0,FoldList[i]. fixDimension] =
        try.baseSize[FoldList[i].
                fixDimension]
        try.concatSize[0, FoldList[i]. foldDimension] =
        FoldList[i]. remainder
        try.concatSize[0,FoldList[i]. oneDimension] = 1
    Else
        try.NumConcats = 0
    End If
    try.NumFoldMaps = 1
    try.foldLength[0] = FoldList[i].foldLength
    try.foldFrom[0] = FoldList[i].foldDimension
    try.foldTo[0] = FoldList[i]. oneDimension
    try.foldFix[0] = FoldList[i].fixDimension
    build3Dtry(Try, NumberOfTries)
End For
```

In particular embodiments, build2Dfold, which builds all possible folds of a two dimensional mesh, encompasses the following example logic:

```
j = 0
oneD = -1
For i = 0 to 2
   If size[i] = 1 and oneD = -1
      oneD = i
   Else
      twoD[j] = I
      j = j + 1
   End If
End For
If size[twoD[1]] ≧ size[twoD[0]]
   bigD = twoD[1]
   littleD = twoD[0]
Else
   bigD = twoD[0]
   littleD = twoD[1]
End If
startFoldB = sqrt(size[bigD])
If startFoldB × startFoldB not equal size[bigD] or startFoldB = 1
   StartFoldB = startFoldB + 1
End If
endFoldB = size[bigD] / 2
startFoldL = sqrt(size[littleD])
If startFoldL × startFoldL not equal size[littleD] or startFoldL = 1
   StartFoldL = startFoldL + 1
if size[bigD] not equal size[littleD]
   endFoldL = size[littleD] / 2
else
   endFoldL = 1
End If
   NumFolds = 1
If endFoldB ≧ startFoldB
   NumFolds= NumFolds +(endFoldB – startFoldB+1)
End If
If endFoldL ≧ startFoldL
   NumFolds= NumFolds +(endFoldL – startFoldL+1)
End If
foldIndex = 0;
FoldList[foldIndex].foldLength =size[littleD]
FoldList[foldIndex].NumFolds = 1
FoldList[foldIndex].remainder = 0
FoldList[foldIndex].foldD = littleD
FoldList[foldIndex].fixD = bigD
FoldList[foldIndex].oneD = oneD
```

An array, t, constructed according to the example logic below, is a mesh size of a resulting Try. Scheduler 515 records a Rank of t in an array, tRank.

```
t[littleD] = size[bigD]
t[bigD] = FoldList[foldIndex].foldLength
t[oneD] = FoldList[foldIndex].NumFolds
rank(t, tRank)
hit = False
For i1 = 0 to 2 while hit = False
   If t[tRank[i1]] > PartSize[pRank[i1]]
      hit = True
   End If
If hit = False
   foldIndex = foldIndex + 1
End If
For i = startFoldB to endFoldB
   FoldList[foldIndex].foldLength = i
   FoldList[foldIndex].NumFolds = size[bigD] / i
   FoldList[foldIndex].remainder = size[bigD] mod i
   FoldList[foldIndex].foldD = bigD
   FoldList[foldIndex].fixD = littleD
   FoldList[foldIndex].oneD = oneD
   t[littleD] = size[littleD]
   t[bigD] = FoldList[foldIndex].foldLength
   If (FoldList[foldIndex].remainder not equal 0
      t[oneD] = FoldList[foldIndex].NumFolds + 1
   Else
      t[oneD] = FoldList[foldIndex].NumFolds
   End If
   Rank(t, tRank)
   hit = False
   For i1 = 0 to 2 while hit = False
      If t[tRank[i1]] > PartSize[pRank[i1]]
         hit = True
      End If
   End For
   if hit = False
      foldIndex = foldIndex + 1
   End If
End For
For i = startFoldL to endFoldL
   FoldList[foldIndex].foldLength = i
   FoldList[foldIndex].NumFolds = size[littleD] / i
   FoldList[foldIndex].remainder = size[littleD] mod i
   FoldList[foldIndex].foldD = littleD
   FoldList[foldIndex].fixD = bigD
   FoldList[foldIndex].oneD = oneD
   t[bigD] = size[bigD]
   t[littleD] = FoldList[foldIndex].foldLength
   If FoldList[foldIndex].remainder not equal 0
      t[oneD] = FoldList[foldIndex].NumFolds + 1
   Else
      t[oneD] = FoldList[foldIndex].NumFolds
   End If
   Rank(t, tRank)
   hit = False
   for i1 = 0 to 2 while hit = False
      If t[tRank[i1]] > PartSize[pRank[i1]]
         hit = True
      End If
   End For
   If hit = False
      FoldIndex = foldIndex + 1
   End If
End For
```

In particular embodiments, build1Try generates a list of folds of a one dimensional request and, for each fold, calls build2DFold to generate a list of one or more additional folds. build1Try records the list of folds in the OneDFoldList, which encompasses the following example structure:

```
Structure oneDFold
   Fold Structure   oneD
   Fold Structure   twoD[x]
   integer          NumTwoDFolds
   integer          twoDFoldSize[3]
End Structure
```

In particular embodiments, oneD includes a first fold. In particular embodiments, twoD includes a list of folds generated from the first fold. NumTwoDFolds indicates a Number of folds in twoD. In particular embodiments, twoDFoldSize indicates a mesh size passed to build2Dfold. Scheduler 515 generates Try structures for elements of twoD and calls build3Dtry to build all possible rotations of each Try structure. In particular embodiments, build1Try encompasses the following example logic:

```
Rank(PartSize, pRank)
Rank(RequestedSize, jRank[0])
end = sqrt(RequestedSize[jRank[2]])
start = 2
```

```
OneDFoldList[0].oneD.foldLength = RequestedSize[jRank[2]]
OneDFoldList[0].oneD.NumFolds = 1
OneDFoldList[0].oneD.remainder = 0
OneDFoldList[0].oneD.foldD = jRank[2]
OneDFoldList[0].oneD.oneD = jRank[1]
OneDFoldList[0].oneD.fixD = jRank[0]
OneDFoldList[0].twoDFoldSize[jRank[2]] = RequestedSize[jRank[2]]
OneDFoldList[0].twoDFoldSize[jRank[1]] = 1
OneDFoldList[0].twoDFoldSize[jRank[0]] = 1
hit = False
For j = 0 to 2 while hit = False
    if RequestedSize[jRank[j]] > PartSize[pRank[j]]
        hit = True
    End If
End For
If hit = False
    build2DFold(PartSize, pRank, RequestedSize, OneDFoldList[0].twoD,
            OneDFoldList[0].nTwoDFolds)
    OneDFoldList[0].nTwoDFolds = 1
    Num1DFolds = 1;
Else
    Num1DFolds = 0
End If
gotRemZero = False
For i = start to end
    OneDFoldList[Num1DFolds].oneD.foldLength = i
    OneDFoldList[Num1DFolds].oneD.NumFolds =
            RequestedSize[jRank[2]] / i
    OneDFoldList[Num1DFolds].oneD.remainder =
            RequestedSize[jRank[2]] mod i
    OneDFoldList[Num1DFolds].oneD.foldD = jRank[2]
    (OneDFoldList[Num1DFolds].oneD.oneD = jRank[1]
    OneDFoldList[Num1DFolds].oneD.fixD = jRank[0]
    OneDFoldList[Num1DFolds].twoDFoldSize[jRank[2]] =
            OneDFoldList[Num1DFolds].oneD.foldLength
    OneDFoldList[Num1DFolds].twoDFoldSize[jRank[1]] =
            OneDFoldList[Num1DFolds].oneD.NumFolds
    OneDFoldList[Num1DFolds].twoDFoldSize[jRank[0]] = 1
    If OneDFoldList[Num1DFolds].oneD.remainder
            not equal 0 or gotRemZero = False
        If OneDFoldList[Num1DFolds].oneD.remainder = 0
            gotRemZero = True
        End If
        build2DFold(PartSize, pRank, RequestedSize,
                OneDFoldList[Num1DFolds].twoDFoldSize,
                OneDFoldList[Num1DFolds].twoD,
                OneDFoldList[Num1DFolds].nTwoDFolds)
        Num1DFolds = Num1DFolds + 1
    End If
End For
NumberOfTries = 0
For i = 0 to Num1DFolds
    For j = 0 to OneDFoldList[i].nTwoDFolds
        If OneDFoldList[i].oneD.foldD not equal
                OneDFoldList[i].twoD[j].foldD or
                OneDFoldList[i].oneD.remainder = 0
            try.baseSize[OneDFoldList[i].twoD[j].fixD] =
                    OneDFoldList[i].twoDFoldSize[One-
                    DFoldList[i].twoD[j].fixD]
            try.baseSize[OneDFoldList[i].twoD[j].foldD] =
                    OneDFoldList[i].twoD[j].foldLength
            try.baseSize[OneDFoldList[i].twoD[j].oneD] =
                    OneDFoldList[i].twoD[j].NumFolds;
            if OneDFoldList[i].twoD[j].remainder not equal 0
                try.NumConcats = 1
                if OneDFoldList[i].twoD[j].NumFolds is odd
                    try.concatStartNode[0, OneDFoldList[i].twoD[j].foldD] =
                            OneDFoldList[i].twoD[j].foldLength -
                            OneDFoldList[i].twoD[j].remainder
                Else
                    try.concatStartNode[0, OneDFoldList[i].twoD[j].foldD] = 0
                End If
                try.concatStartNode[0, OneDFoldList[i].twoD[j].fixD] = 0
                try.concatStartNode[0, OneDFoldList[i].twoD[j].oneD] =
                        OneDFoldList[i].twoD[j].NumFolds
                try.concatSize[0, OneDFoldList[i].twoD[j].fixD] =
                        try.baseSize[OneDFoldList[i].twoD[j].fixD]
                try.concatSize[0, OneDFoldList[i].twoD[j].foldD] =
                        OneDFoldList[i].twoD[j].remainder
                try.concatSize[0 OneDFoldList[i].twoD[j].oneD] = 1;
            Else
                try.NumConcats = 0
            End If
            If OneDFoldList[i].oneD.remainder not equal 0
                if OneDFoldList[i].oneD.NumFolds is odd
                    try.concatStartNode[try.NumConcats,
                            OneDFoldList[i].oneD.foldD] =
                            OneDFoldList[i].oneD.foldLength -
                            OneDFoldList[i].oneD.remainder
                Else
                    try.concatStartNode[try.NumConcats,
                            OneDFoldList[i].oneD.foldD] = 0
                End If
                try.concatStartNode[try.NumConcats,
                        OneDFoldList[i].oneD.fixD] = 0
                try.concatStartNode[try.NumConcats,
                        OneDFoldList[i].oneD.oneD] =
                        OneDFoldList[i].oneD.NumFolds
                try.concatSize[try.NumConcats, OneDFoldList[i].oneD.fixD] = 1
                try.concatSize[try.NumConcats, OneDFoldList[i].oneD.foldD] =
                        OneDFoldList[i].oneD.remainder
                try.concatSize[try.NumConcats, OneDFoldList[i].oneD.oneD] = 1
                oneDEnd[0] = try.concatStartNode[try.NumConcats, 0] +
                        try.concatSize[try.NumConcats, 0] - 1
                oneDEnd[1] = try.concatStartNode[try.NumConcats, 1] +
                        try.concatSize[try.NumConcats, 1] - 1
                oneDEnd[2] = try.concatStartNode[try.NumConcats, 2] +
                        try.concatSize[try.NumConcats, 2] - 1
                k = try.concatStartNode[try.NumConcats,
                        OneDFoldList[i].twoD[j].foldD]
                l = oneDEnd[OneDFoldList[i].twoD[j].foldD]
                If OneDFoldList[i].twoD[j].NumFolds is odd
                    try.concatStartNode[try.NumConcats,
                            OneDFoldList[i].twoD[j].foldD] =
                            OneDFoldList[i].twoD[j].foldLength - 1 - (k
                            mod OneDFoldList[i].twoD[j].foldLength)
                    oneDEnd[OneDFoldList[i].twoD[j].foldD] =
                            OneDFoldList[i].oneD.foldLength - 1 - (l mod
                            OneDFoldList[i].oneD.foldLength)
                Else
                    try.concatStartNode[try.NumConcats,
                            OneDFoldList[i].twoD[j].foldD] = k mod
                            OneDFoldList[i].twoD[j].foldLength
                    oneDEnd[OneDFoldList[i].twoD[j].foldD] = l mod
                            OneDFoldList[i].oneD.foldLength
                End If
                try.concatStartNode[try.NumConcats,
                        OneDFoldList[i].oneD.oneD] = k /
                        OneDFoldList[i].twoD.foldLength
                oneDEnd[OneDFoldList[i].oneD.oneD] = l /
                        OneDFoldList[i].oneD.foldLength
                try.concatSize[try.NumConcats, 0] = oneDEnd[0] -
                        try.concatStartNode[try.NumConcats, 0] + 1
                try.concatSize[try.NumConcats, 1] = oneDEnd[1] -
                        try.concatStartNode[try.NumConcats, 1] + 1
                try.concatSize[try.NumConcats, 2] = oneDEnd[2] -
                        try.concatStartNode[try.NumConcats, 2] + 1
                try.NumConcats = try.NumConcats + 1
            End If
            try.NumFoldMaps = 2
            try.foldLength[0] = OneDFoldList[i].oneD.foldLength
            try.foldFrom[0] = OneDFoldList[i].oneD.foldD
            try.foldTo[0] = OneDFoldList[i].oneD.oneD
            try.foldFix[0] = OneDFoldList[i].oneD.fixD
            try.foldLength[1] = OneDFoldList[i].twoD[j].foldLength
            try.foldFrom[1] = OneDFoldList[i].twoD[j].foldD
            try.foldTo[1] = OneDFoldList[i].twoD[j].oneD
            try.foldFix[1] = OneDFoldList[i].twoD[j].fixD
            build3Dtry(Try, NumberOfTries)
        End For
    End For
NumDeleted = 0
For i = 0 to NumberOfTries - 1
    curMax = TryList[i].baseSize[0] + TryList[i].baseSize[1] +
            TryList[i].baseSize[2]
    if TryList[i].NumConcats > 0
        curMax = curMax + 1
```

```
        End If
        For j = i +1toNumberOfTries − 1
            duplicate = True
            For i1 = 0 to 2 while duplicate = True
                If TryList[j].baseSize[i1] not equal TryList[i].baseSize[i]
                    duplicate = False
                End If
            End For
            If duplicate = True and TryList[j].NumConcats =
                           TryList[i].NumConcats)
                For i1 = 0 to TryList[i].NumConcats while duplicate = True
                    For j1 = 0 to 2 while duplicate = True
                        If TryList[j].concatStartNode[i1, j1] not equal
                                   TryList[i].concatStartNode[i1, j1]
                            duplicate = False
                        Else If TryList[j].concatSize[i1, j1] not equal
                                   TryList[i].concatSize[i1, j1]
                            duplicate = False
                        End For
                    End For
                End If
                If duplicate = True
                    For i1 = 0 to 2
                        TryList[j].baseSize[i1] = TorusSize[i1] + 1
                    End For
                    NumDeleted = NumDeleted + 1
                Else
                    nxtMax = TryList[j].baseSize[0] + TryList[j].baseSize[1] +
                                TryList[j].baseSize[2]
                    If TryList[j].NumConcats > 0
                        nxtMax = nxtMax + 1
                    End If
                    If nxtMax < curMax
                        TempTry = TryList[j]
                        TryList[j] = TryList[i]
                        TryList[i] = tempTry
                        curMax = nxtMax
                    End If
                End If
            End For
        End For
        NumberOfTries = NumberOfTries − NumDeleted
```

In particular embodiments, buildCompactFits, which constructs BestFit[3], encompasses the following example logic:

```
Rank(PartSize,PartRank)
l = QubeRoot(ResuestedNodes)
hit = False
For i = l to l+1 while hit = False
    For j = i to l+1 while hit = False
        For (k = j to l+1 while hit = False
            If i × j × k ≧ RequestedNodes
                t[0] = i
                t[1] = j
                t[2] = k
                hit = True
            End If
        End For
    End For
End For
If t[0] ≦ PartSize[PartRank[0]]
    If t[1] > PartSize[PartRank[1]]
        t[1] = t[1] − 1
        hit = False
        For t[2] = RequestedNodes / (t[0] × t[1]) to PartSize[PartRank[2]]
                    while hit = False
            If t[0] × t[1] × t[2] ≧ RequestedNodes
                Hit = True
            End If
        End For
    End If
Else
    t[0] = PartSize[PartRank[0]]
    l = sqrt(RequestedNodes / t[0])
    hit = False;
    For j = l to l + 1 while hit = False
        For (k = j to l + 1 while hit = False
            If (t[0] × j × k ≧ RequestedNodes
                t[1] = j
                t[2] = k
                hit = True
            End If
        End For
    End For
    if t[1] > PartSize[PartRank[1]]
        t[1] = PartSize[PartRank[1]]
        t[2] = RequestedNodes / (t[0] × t[1])
        If t[0] × t[1] × t[2] < RequestedNodes
            t[2] = t[2] + 1
        End If
    End If
End If
bestFit[pRank[0]] = t[0];
bestFit[pRank[1]] = t[1];
bestFit[pRank[2]] = t[2];
NumberOfFits = 0
For i = BestFit[0] to PartSize[0]
    For j = BestFit[1] to PartSize[1]
        For k = BestFit[2] to PartSize[2]
            Fit[NumberOfFits,0] = i
            Fit[NumberOfFits,1] = j
            Fit[NumberOfFits,2] = k
            Hit = True
            If (i not equal to PartSize[0]) and(j not equal to PartSize[0]) and
                       (k not equal to PartSize[0])
                For m = 0 to NumMapDimensions While Hit = True
                    If Fit[NumberOfFits,MapDimension[m]] mod MapMod[m]
                                    not equal to 0
                        Hit = False
                    End If
                End For
            End If
            If Hit = True
                NumberOfFits = NumberOfFits + 1
            End If
        End For
    End For
End For
For i = 0 to NumBerOfFits − 1
    d1 = Fit[i, 0] + Fit[i, 1] + Fit[i, 2]
    For j = i + 1 to NumBerOfFits − 1
        d2 = Fit[j, 0] + Fit[j, 1] + Fit[j, 2]
        if d2 < d1
            k = Fit[j, 0]
            Fit[j, 0] = Fit[i, 0]
            Fit[i, 0] = k
            k = Fit[j, 1]
            Fit[j, 1] = Fit[i, 1]
            Fit[i, 1] = k
            k = Fit[j, 1]
            Fit[j, 1] = Fit[i, 1]
            Fit[i, 1] = k
            d1 = d2
        Else If d2 = d1
            Rank(Fit[i], iRank)
            Rank(Fit[j], jRank)
            hit = 0
            For (k = 0 to 2 while hit = 0
                If Fit[j, jRank[k] > Fit[i, iRank[k]
                    hit = 1
                Else If Fit[j, jRank[k] < Fit[i, iRank[k]
                    Hit = −1
            End For
            If hit = 1
                k = Fit[j, 0]
                Fit[j, 0] = Fit[i, 0]
                Fit[i, 0] = k
                k = Fit[j, 1]
                Fit[j, 1] = Fit[i, 1]
                Fit[i, 1] = k
                k = Fit[j, 1]
                Fit[j, 1] = Fit[i, 1]
                Fit[i, 1] = k
                d1 = d2
```

```
        End If
    End If
End For
End For
lastMax = 0
NumMaxDistances = 0
For i = 0 NumberOfFits – 1
    currentMax = Fit[i, 0] + Fit[i, 1] + Fit[i, 2]
    If currentMax not equal lastMax
        MaxDistance[NumberOfMaxDistance, 0] = i
        MaxDistance[NumberOfMaxDistance, 1] = currentMax
        NumberOfMaxDistance = NumberOfMaxDistance + 1
    End If
End For
```

In particular embodiments, buildFreeMeshes Function encompasses the following example logic:

```
NumFreeMeshes = 0
For i = partStart[0] to PartEnd[0]
    For j =PartStart[1] to PartEnd[1]
        For k = PartStart[2] to PartEnd[2]
            If NodeInUse[i,j,k] = NODE_NOT_IN_USE
                NodeInUse[i,j,k] = NODE_ON_HOLD
                meshStart[0] = i
                meshStart[1] = j
                meshStart[2] = k
                inMesh = True
                for mz = k + 1 to PartEnd[2] and inMesh = True
                    if NodeInUse[i,j,mz] not equal NODE_NOT_IN_USE
                        inMesh = False
                    End If
                End For
                If inMesh = True
                    mEnd[2] = mz – 1
                Else
                    mEnd[2] = mz – 2
                If PartWraps[2] and meshStart[2] = 0 and meshEnd[2] not equal
                                PartEnd[2]
                    inMesh = True;
                    For mz = PartEnd[2 to meshEnd[2] by –1 and inMesh = True
                        If NodeInUse [i,j,mz] not equal NODE_NOT_IN_USE
                            inMesh = False
                        End If
                    End For
                    If inMesh = True
                        mz = mz + 1
                    Else
                        mz = mz + 2
                    End If
                    if mz ≦ PartEnd[2]
                        meshStart[2] = mz;
                        meshEnd[2] =meshEnd[2] + TorusSize[2]
                    End If
                End If
                inMesh = True
                For my = j + 1 to PartEnd[1] and inMesh = True
                    For mz = meshStart[2 tomeshEnd[2] an inMesh = True
                        If NodeInUse[i, my, mz mod TorusSize[2]] not equal
                                NODE_NOT_IN_USE
                            inMesh = False
                        End If
                    End For
                    If inMesh = True
                        meshEnd[1] = my – 1
                    Else
                        meshEnd[1] = my – 2
                End If
                If PartWraps[1] and meshStart[1] = 0 and meshEnd[1] not
                            equal PartEnd[1]
                    inMesh = True
                    For my = PartEnd[1] to meshEnd[1] by –1 and inMesh =
                                True
                        For mz = meshStart[2] to meshEnd[2] and inMesh =
                                True
                            If NodeInUse[i,my,mz mod Torus Size[2] not equal
                                    NODE_NOT_IN_USE
                                inMesh = False
                            End If
                        End For
                    End For
                    If inMesh = True
                        My = my + 1
                    Else
                        my = my + 2
                    End If
                    if my ≦ PartEnd[1]
                        meshStart[1] = my
                        meshEnd[1] =meshEnd[1] + TorusSize[1]
                    End If
                End If
            End For
            inMesh = True
            for mx = i + 1 to PartEnd[0] and inMesh = True
                for my = meshStart[1] to meshEnd[1] and inMesh = True
                    for mz = mStart[2] to mEnd[2] and inMesh = True
                        If  NodeInUse[mx,my mod TorusSize[1],mz mod
                                TorusSize[2]]   not   equal
                                NODE_NOT_IN_USE
                            inMesh = False
                        End If
                    End For
                End For
            End For
            If inMesh = True
                meshEnd[0] = mx – 1
            Else
                meshEnd[0] = mx – 2
            End If
            If partWraps[0] and meshStart[0] = 0 and meshEnd[0] not equal
                        PartEnd[0]
                inMesh = True
                For mx = partEnd[0] to meshEnd[0] by –1 and
                inMesh = True
                    For my = meshStart[1] to meshEnd[1] and inMesh = True
                        For mz = meshStart[2] to meshEnd[2] and inMesh =
                                True
                            If NodeInUse[mx,my mod TorusSize[1],mz Mod
                                    TorusSize[2]] not equal
                                    NODE_NOT_IN_USE
                                inMesh = False
                            End If
                        End For
                    End For
                End For
                If inMesh = True
                    Mx = mx + 1
                Else
                    Mx = mx + 2
                End If
                If mx ≦ PartEnd[0]
                    meshStart[0] = mx
                    meshEnd[0] = meshEnd[0] + TorusSize[0]
                End If
            End If
            FreeMesh[NumFreeMeshes].Start[0] = meshStart[0]
            FreeMesh[NumFreeMeshes].Start[1] = meshStart[1]
            FreeMesh[NumFreeMeshes].Start[2] = meshStart[2]
            FreeMesh[NumFreeMeshes].end[0] = meshEnd[0]
            FreeMesh[NumFreeMeshes].end[1] = meshEnd[1]
            FreeMesh[NumFreeMeshes].end[2] = meshEnd[2]
            FreeMesh[NumFreeMeshes].NumNodes = (meshEnd[0] –
                            meshStart[0] + 1) ×(meshEnd[1] –
                            meshStart[1] + 1) ×(meshEnd[2] –
                            meshStart[2] + 1)
            For mx = meshStart[0] to meshEnd[0]
                mx1 = mx mod TorusSize[0]
                For my = meshStart[1] to meshEnd[1]
                    my1 = my mod TorusSize[1]
                    For mz = meshStart[2] to meshEnd[2]
                        mz1 = mz mod TorusSize[2]
                        NodeInUse[mx1], my1], mz1] = NODE_ON_HOLD
                    End For
                End For
            End For
```

```
        For i = 0 to 2
            FreeMesh[NumFreeMeshes].Rank[i] = 2 - l;
        End For
        For l = 0 to 2
            For m = l+1 to 3
                l1 = FreeMesh[NumFreeMeshes].Rank[l]
                m1 = FreeMesh[NumFreeMeshes].Rank[m]
                If meshEnd[m1] - meshStart[m1] <meshEnd[l1] -
                        meshStart[l1]
                    FreeMesh[NumFreeMeshes].Rank[l] = m1
                    FreeMeshRank[m] = l1
                End If
            End For
        End For
        NumFreeMeshes = NumFreeMeshes + 1
    End If
  End For
End For
For i = partStart[0] to PartEnd[0]
    For j = PartStart[1] to PartEnd[1]
        For k = PartStart[2] to PartEnd[2]
            If NodeInUse[i,j,k] = NODE_ON_HOLD
                NodeInUse[i,j,k] = NODE_NOT_IN_USE
            End If
        End For
    End For
End For
For i = 0 to NumFreeMeshes - 1
    For j = i +1 to NumFreeMeshes - 1
        hit = False
        if FreeMesh[j].NumNodes < freeMesh[i].NumNodes
            hit = True;
        Else If FreeMesh[j].NumNodes = freeMesh[i].NumNodes
            hit = True
            For l = 0 to 2 while hit = True
                If FreeMesh[j].Rank[l] > freeMesh[i].Rank[l])
                    Hit = False
                End If
            End For
        End If
        If hit = True
            TempMesh = FreeMesh[j]
            FreeMesh[j] = FreeMesh[i]
            FreeMesh[i] = TempMesh
        End If
    End For
End For
```

In particular embodiments, ScheduleJob, which returns True if scheduler 515 successfully schedules a job 150, encompasses the following example logic:

```
If SpatialAllowed = True
    If scheduleSpatial( ) = True
        return True
    Else If CompactAllowed = True
        return scheduleCompact( )
    End If
Else If CompactAllowed = True
    return scheduleCompact( )
Else
    Return scheduleAny( )
End If
```

In particular embodiments, scheduleSpatial encompasses the following example logic:

```
GotFit = False
For i = 0 to NumberOfTries - 1 while GotFit = False
    If scanSpatial(TryList[i],Start) = True
        GotFit = True
        setSpatialNodeInUse(Try, Start)
    End If
End For
Return GotFit
```

In particular embodiments, setSpatialNodeInUse, which builds AssignedNodeList, encompasses the following example logic:

```
NodeIndex = 0
For (cNode[0] = 0 to OriginalSize[0] - 1
    For cNode[1] = 0 to OriginalSize[1] - 1
        For cNode[2] = 0 to OriginalSize[2] - 1
            For i = 0 to 2
                jcNode[jobMap[i]] = cNode[i]
            End For
            If Try.NumFoldMaps = 1
                mNode[0, Try.foldFix[0]] =jcNode[Try.foldFix[0]]
                mNode[0, Try.foldTo[0]] = jcNode[Try.foldFrom[0]] /
                        Try.foldLength[0]
                If mNode[0, Try.foldTo[0]] is odd
                    mNode[0, Try.foldFrom[0]] = Try.foldLength[0] - 1 -
                            (jcNode[Try.foldFrom[0]] mod
                            Try.foldLength[0])
                Else
                    mNode[0, Try.foldFrom[0]] = jcNode[Try.foldFrom[0]] mod
                            Try.foldLength[0]
                End If
                For i = 0 to 2
                    node[i] = mNode[0, Try.rMap[l]]
                End For
            Else
                mNode[0, Try.foldFix[0]] =jcNode[Try.foldFix[0]]
                mNode[0,Try.foldTo[0]] = jcNode[Try.foldFrom[0]] /
                        Try → foldLnt[0]
                If mNode[0, Try.foldTo[0]] is odd
                    mNode[0, Try.foldFrom[0]] = Try.foldLength[0] - 1 -
                            (jcNode[Try.foldFrom[0]] mod
                            Try.foldLength[0])
                Else
                    mNode[0, Try.foldFrom[0]] = jcNode[Try.foldFrom[0]] mod
                            Try.foldLength[0]
                End If
                mNode[1, Try.foldFix[1]] =mNode[0, Try.foldFix[1]]
                mNode[1, Try.foldTo[1]] = mNode[0, Try.foldFrom[1]] /
                        Try.foldLength[1]
                If mNode[1, Try.foldTo[1]] is odd
                    mNode[1, Try.foldFrom[1]] = Try.foldLength[1] - 1 -
                            (mNode[0, Try.foldFrom[1]] mod
                            Try.foldLength[1])
                Else
                    mNode[1, Try.foldFrom[1]] = mNode[0, Try.foldFrom[1]]
                            modTry → foldLnt[1]
                For i = 0 to 2
                    node[i] = mNode[1, Try.rMap[i]]
                End For
            End If
            For i = 0 to 2
                Node[i] = node[i] mod TorusSize[i]
            End For
            NodeInUse[node[0], node[1], node[2]] = NODE_IN_USE
            AssignedNodeList[NodeIndex, 0] = node[0]
            AssignedNodeList[NodeIndex, 1] = node[2]
            AssignedNodeList[NodeIndex, 2] = node[2]
            NodeIndex = NodeIndex + 1
```

-continued

```
        End For
    End For
End For
```

In particular embodiments, scanSpatial encompasses the following example logic:

```
For i = 0 to 2
    If PartWraps[i])
        End[i] = PartEnd[i]
    Else
        End[i] = PartEnd[i] – Try.baseSize[i] + 1
    End If
End For
zPlaneCnt = Try.baseSize[0] × Try.baseSize[1];
For i = PartStart[0] to End[0]
    newX = True
    For (n = PartStart[2] to PartEnd[2]
        zPlane[n] = 0
    End For
    For l = i to i+try.baseSize[0]
        For n = PartStart[2] to PartEnd[2]
            l1 = l mod TorusSize[0]
            m1 = PartStart[1]
            m2 = (m1 + Try.baseSize[1]) mod TorusSize[1]
            If PartStart[1] + Try.baseSize[1] ≦ PartEnd[1]
                ZPlane[n] = zPlane[n] + FreeY[l1,m1,n] – FreeY[l1,m2,n]
            Else
                ZPlane[n] = zPlane[n]+ FreeY[i1,m1,n]
            End If
        End For
    End For
    For j = PartStart[1] to End[1]
        if newX = False
            l1 = i mod TorusSize[0]
            l2 = (i + Try.baseSize[0]) mod TorusSize[0]
            m1 = (j – 1) mod TorusSize[1]
            if PartWraps[0] = False or i+try.baseSize[0]) PartEnd[0]
                For n = PartStart[2] to PartEnd[2]
                    If i+Try.baseSize[0] ≦ PartEnd[0]
                        zPlane[n] = zPlane[n] – (FreeX[l1,m1,n] –
                            FreeX[l2,m1,n])
                    Else
                        zPlane[n] = zPlane[n] – FreeX[l1,m1,n]
                    End If
                End For
            Else
                For n = PartStart[2] to PartEnd[2]
                    zPlane[n] = zPlane[n] – (FreeX[l1,m1,n]+ (FreeX[0,m1,n] –
                        FreeX[l2,m1,n]))
                End For
            End If
            l1 = i mod TorusSize[0]
            l2 = (i + Try.baseSize[0]) mod TorusSize[0]
            m1 = (j + Try.baseSize[1]) mod TorusSize[1]
            If PartWraps[0] = False or i+try.baseSize[0]) ≦ PartEnd[0]
                For n = PartStart[2] to PartEnd[2]
                    If i + Try.baseSize[0] ≦ PartEnd[0]
                        ZPlane[n] = zPlane[n] + FreeX[l1,m1,n] – FreeX[l1,m2,n]
                    Else
                        ZPlane[n] = zPlane[n] + FreeX[l1,m1,n]
                    End If
                End For
            Else
                For n = PartStart[2] to PartEnd[2]
                    ZPlane[n] = zPlane[n] + FreeX[l1,m1,n]) + (FreeX[0,m2,n]) –
                        FreeX[l1,m2,n]
                End For
            End If
        Else
            newX = False;
            k = PartStart[2];
            while k ≦ End[2])
                hit = True;
                For n = k; to k + Try.baseSize[2] – 1 while hit = True
                    If zPlane[n mod TorusSize[2]] not equal zPlaneCnt
                        hit = False;
                    End If
                End For
                if hit = True
                    Start[0] = i;
                    Start[1] = j;
                    Start[2] = k;
                    For cNdx = 0 to try.NumConcats – 1 while hit = True
                        For m = 0 to 2 while hit = True
                            cStart[m] = Start[m] + Try.concatStartNode[cNdx, m]
                            cEnd[m] = cStart[m] + Try.concatSize[cNdx, m] – 1;
                            if (cEnd[m] ≧ TorusSize[m] && PartWraps[m] = False
                                hit = False;
                        End For
                        For l = cStart[0] to cEnd[0] while hit = True
                            For m = cStart[1] to cEnd[1] while hit = True
                                For n = cStart[2] to cEnd[2] while hit = True
                                    l1 = l mod TorusSize[0]
                                    m1 = m mod TorusSize[1]
                                    n1 = n mod TorusSize[2]
                                    If NodeInUse[l1,m1,n1] not equal
                                            NODE_NOT_IN_USE
                                        hit = False;
                                    End If
                                End For
                            End For
                        End For
                    End For
                    If hit = True
                        Return True;
                    Else
                        K = k + 1
                    End If
                Else
                    k = n + 1
                End If
            End For
        End For
    End For
End For
Return False
```

In particular embodiments, scheduleCompactFunction, which runs a binary search on Fit, encompasses the following example logic:

```
HighFit = NumberOfFits – 1
For i = 0 to 2
    HighStart[i] = PartStart[i]
End For
LowFit = –1
While True
    CurrentFit = LowFit + (HighFit – LowFit) / 2
    If scanCompact(NumberOfNodes, Fit[CurrentFit], HighStart) = True
        HighFit = CurrentFit
    Else
        LowFit = CurrentFit
    End If
    If HighFit = LowFit + 1
        Return
    End If
End While
Hit = False
For i = 0 to NumMaxDistances – 1 While Hit = False
    If HighFit ≧ MaxDistance[i,0]
        HigMaxDistance = i
        Hit = True
    End If
End For
Hit = True
For i = HighMaxDistance – 1 to 0 by –1
    StartFit = MaxDistance[i,0]
    If i =NumMaxDistance – 1
        EndFit = NumberOfFits – 1
```

```
    Else
        EndFit = MaxDistance[i+1,0] − 1
    End If
    Hit = False
    For j = StartFit to EndFit While Hit = False
        If scanCompact(NumberOfNodes, Fit[j], HighStart)= True
            HighFit = j
            HighMaxDistance = I
            Hit = True
        End If
    End For
End For
setCompactNodeInUse(Fit(HighFit), HighStart)
```

In particular embodiments, setComPactNodeInUse encompasses the following example logic:

```
node = 0
For i = 0 to 2
    if Start[i] ≧ TorustSize[i]
        Start[i] = Start[i] mod TorusSize[i]
        End[i] = Start[i] + Size[i] − 1
    End If
End For
If NumMapDiminsions = 1
    If MapDiminsion[0] = 0
        order[0] = 1
        order[1] = 2
        order[2] = 0
    Else If MapDiminsion[0] = 1
        order[0] = 0
        order[1] = 2
        order[2] = 1
    Else
        order[0] = 0
        order[1] = 1
        order[2] = 2
    End If
Else
    order[0] = 3 − MapDiminsion[0] − MapDiminsion[1]
    order[1] = MapDiminsion[0]
    order[2] = MapDiminsion[1]
End If
count = 0
For i = Start[order[0]] to end[order[0]] and count < RequestedNodes
    index[order[0]] = i mod TorusSize[order[0]]
    For j = Start[order[1]] to end[order[1]] and count < RequestedNodes
        index[order[1]] = j mod TorusSize[order[1]]
        For k = Start[order[2]] to end[order[2]] and count < RequestedNodes
            index[order[2]] = k mod TorusSize[order[2]]
            If NodeInUse[index[0], index[1], index[2]] =
                NODE_NOT_IN_USE
                    NodeInUse[index[0], index[1], index[2]] = NODE_IN_USE
                    AssignedNodeList[node, order[0] = index[order[0]]
                    AssignedNodeList[node, order[1] = index[order[2]]
                    AssignedNodeList[node, order[2] = index[order[2]]
                    node = node + 1
            End If
        End For
    End For
End For
```

In particular embodiments, ScanCompact encompasses the following example logic:

```
For i = 0 to 2
    If PartWraps[i] = True
        end[i] =PartEnd[i]
    Else
        end[i] = PartEnd[i] − Start[i] + 1
    End If
```

```
For i = PartStar[0] to end[0]
    newX = True
    For n = 0 to TorusSize[2]
        ZPlane[n] = 0
    End For
    for (l = i to i + size[0]
        for (n = pStart[2]; n ≦ pEnd[2]; n++)
            l1 = l mod TorusSize[0];
            m1 = PartStart[1]
            m2 = (PartStart[1] + size[1]) mod TorusSize[1]
            If PartStart[1]+size[1] ≦ PartEnd[1])
                ZPlane[n] = zPlane[n] +FreeY[l1,m1,n] − FreeY[l1,m2,n]
            Else
                ZPlane[n] = zPlane[n] +FreeY[l1,m1,n]
            End If
        End For
    End For
    For j = PartStart[1] to End[1]
        newY = True
        If newX = False
            l1 = i
            l2 = (i + size[0]) mod TorusSize[0]
            m1 = j − 1
            If PartWraps[0] = False or i+Start[0] ≦ PartEnd[0]
                For n = PartStart[2] to PartEnd[2]
                    If i+size[0] ≦ PartEnd[0]
                        ZPlane[n] = zPlane[n] − (FreeX [l1,m1,n] −
                                    FreeX[l2,m1,n])
                    else
                        zPlane[n] = zPlane[n] − FreeX [l1,m1,n]
                    End If
                End For
            Else
                For n = PartStart[2] to PartEnd[2]
                    zPlane[n] = zPlane[n] − (FreeX [l1,m1,n] +
                                (FreeX[0,m1,n] − FreeX [l2,m1,n]))
                End For
            End If
            l1 = i
            l2 = (i + Start[0]) mod TorusSize[0]
            m1 = (j + size[1] − 1) mod TorusSize[1]
            If PartWraps[0] = False or i + Start[0]) ≦ PartEnd[0]
                For n = PartStart[2] to PartEnd[2]
                    If (i + Start[0] ≦ PartEnd[0])
                        ZPlane[n] = zPlane[n] + (FreeX[l1,m1,n] −
                                    FreeX[l1,m2,n]
                    Else
                        ZPlane[n] = zPlane[n] + FreeX[l1,m1,n]
                    End If
                End For
            Else
                For n = PartStart[2] to PartEnd[2]
                    ZPlane[n] = zPlane[n] + (FreeX[l1,m1,n] +
                                (FreeX[0,m1,n] − FreeX[l1,m2,n]))
                End For
            End If
        Else
            newX = False
        End If
        For k = PartStart[2] to end[2]
            if newY = True
                newY = False
                count = 0;
                For n = k to k + size[2]
                    count = count + zPlane[n mod TorusSize[2]]
                End For
            Else
                count = count − zPlane[k − 1]
                k1 = (k + size[2] − 1) mod TorusSize[2]
                zPlane[k1] = 0
                l1 = i
                l2 = (i + size[0]) mod TorusSize[0]
                If PartWraps[0] = False or i + size[0]) ≦ PartEnd[0]
                    For m = j to j + size[1]
                        m1 = m mod TorusSize[1]
                        If i + size[0] ≦ PartEnd[0]
                            ZPlane[k1] = zPlane[k1] + (FreeX[l1,m1,k1] −
                                        FreeX[l2,m1,k1])
```

-continued

```
        Else
            ZPlane[k1] = zPlane[k1] + FreeX[l1,m1,k1]
        End For
    Else
        For m = j to j + size[1]
            ZPlane[k1] = zPlane[k1] + FreeX[l1,m1,k1] +
                            (FreeX[0,m1,k1] − FreeX[l2,m1,k1])
        End For
    End If
    count= count + zPlane[k1]
    End If
    If count ≧ NumberOf Nodes
        Start[0] = i
        Start[1] = j
        Start[2] = k
        return True
    End If
    End For
    End For
End For
End For
return False
```

In particular embodiments, scheduleAny encompasses the following logic:

```
Node = 0
Remainder = RequestedNodes
For m = 0 to NumFreeMeshes while Remainder > 0
    If FreeMesh[m].Rank[0] = 2
        iNdx = FreeMesh[m].Rank[2]
        jNdx = FreeMesh[m].Rank[1]
    Else If FreeMesh[m].Rank[1] = 2
        iNdx = FreeMesh[m].Rank[2]
        jNdx = FreeMesh[m].Rank[0]
    Else
        iNdx = FreeMesh[m].Rank[1]
        jNdx = FreeMesh[m].Rank[0]
    End If
    For i = FreeMesh[m].Start[iNdx] toFreeMesh[m].end[iNdx] while
                        Remainder > 0
        For j = FreeMesh[m].Start[jNdx] to FreeMesh[m].end[jNdx] while
                        Remainder > 0
            For k = FreeMesh[m].Start[2] to FreeMesh[m].end[2] while
                        Remainder > 0
                i1 = i mod TorusSize[iNdx]
                j1 = j mod TorusSize[iMod]
                k1 = k mod TorusSize[2]
                If iNdx = 0
                    NodeInUse[i1,j1,k1] = NODE_IN_USE
                Else
                    NodeInUse[j1,i1,k1] = NODE_IN_USE
                End If
                AssignedNodeList[Node].[iNdx] = i1
                AssignedNodeList[Node].[jNdx] = j1
                AssignedNodeList[Node, 2] = k1
                Node = Node + 1
            End For
        End For
    End For
End For
```

In particular embodiments, setMpiRank encompasses the following logic:

```
For node = 0 to RequestedNodes − 1
    to[0] = AssignedNodeList[node, 0]
    to[1] = AssignedNodeList[node, 1]
    to[2] = AssignedNodeList[node, 2]
    If NumMapDiminsions = 1
        to[MapDiminsion[0]] = AssignedNodeList[node,
                            MapDimension[0]] /MapMod[0]
        to[3] = AssignedNodeList[node, MapDimension[0]] mod MapMod[0]
    Else
        to[MapDiminsion[0]] = AssignedNodeList[node, MapDiminsion[0]] /
                            MapMod[0]
        to[MapDiminsion[1]] = AssignedNodeList[node, MapDiminsion[1]] /
                            MapMod[1]
        to[3] = (AssignedNodeList[node, MapDiminsion[0]]
                            mod MapMod[0]) × MapMod[1] +
            AssignedNodeList[node, MapDiminsion[1]] mod MapMod[1]
    End If
    hit = False
    for (node1 = 0 to NumFreeNodes − 1 while hit = False
        If to[0] = FreeNodeList[node1],coordinate[0] and
            to[1] = FreeNodeList[node1].coordinate[1] and
            to[2] = FreeNodeList[node1].coordinate[2] and
            to[3] = FreeNodeList[node1].coordinate[3]
            FreeNodeList[node1].mpiRank = node
            Hit = True
        End If
    End For
End For
```

In particular embodiments, scheduler 515 uses the following example structures, which are defined as follows, to allocate nodes 115 to jobs 150. As described above, cluster management engine 130 communicates a list of FreeNode structures to scheduler 515 along with a job 150. The list includes all nodes 115 available for scheduling. In the list, switch-based coordinates identify available nodes 115 in the list. If scheduler 515 schedules job 150, scheduler 515 sets mpiRank before returning.

```
Structure FreeNode
    integer     coordinate[4]
    integer     mpiRank
End Structure
```

In particular embodiments, scheduler 515 uses a Fold Structure to record how scheduler 515 folds one dimensional and two dimensional spatial requests.

```
Structure Fold
    integer     foldLength
    integer     numFolds
    integer     remainder
    integer     foldDimension
    integer     fixDdimension
    integer     oneDimension
End Structure
```

In particular embodiments, scheduler 515 uses a Try structure to store information on meshes used for scheduling a spatial job 150. A Try structure includes information on a base mesh and up to two concatenated meshes.

```
Structure Try
    integer     baseSize[3]
    integer     numConcats
    integer     concatSize[2,3]
    integer     concatStartNode[2,3]
    integer     rMap[3]
    integer     irMap[3]
    integer     numFoldMaps
```

```
              integer    foldLength[2]
              integer    foldFrom[2]
              integer    foldTo[2]
              integer    foldFix[2]
           End Structure
```

In particular embodiments, scheduler 515 uses a FreeMesh structure to store information on meshes in grid 110 available for scheduling. Scheduler 515 uses FreeMesh to schedule "any" requests.

```
           Structure FreeMesh
              integer    start[3]
              integer    end[3]
              integer    size[3]
              integer    rank[3]
              integer    numberOfNodes
           End Structure
```

In particular embodiments, scheduler 515 uses the following example variables, which are defined as follows, to allocate nodes 115 to jobs 150.

RequestedNodes: a number of nodes requested for a job 150.

RequestType: a type of job request: SPATIAL, COMPACT, or ANY.

OriginalSize[3]: if RequestType=SPATIAL, a size of a job 150.

AggressiveFlag: a floating-point number between zero and one indicating a degree of leeway allotted to scheduler 515 for purposes of allocating nodes 115 to a job 150.

JobMap[3]: if RequestType=SPATIAL, a mapping of indices of OriginalSize to an order more suitable to scheduler 515.

RequestedSize[3]: if RequestType=SPATIAL, size of a job 150 after scheduler 515 has applied JobMap.

TorusSize[3]: size of grid 110 in terms of CPUs 164.

NodesPerSwitch: number of nodes 115 per switch 166.

NumFreeNodes: number of nodes 115 available for scheduling.

FreeNodeList[NumFreeNodes]: list of nodes 115 available for scheduling passed to scheduler 515.

SpatialAllowed: set to True if spatial scheduling allowed.

CompactAllowed: set to True if compact scheduling allowed.

AnyAllowed: set to True if any scheduling allowed.

TorusMap[3]: a mapping of indices from a switch-based torus to an order more suitable to scheduler 515.

InverseTorusMap[3]: an inverse of TorusMap; applied to all output nodes 115 before returning to cluster management engine 130.

NumMapDimesions: number of dimensions modified when going from a switch-based torus to a node base torus; possible values are one and two.

MapDimensions[2]: indices of dimensions modified when going from a switch-based torus to the node base torus.

MapMod[2]: multipliers used when going from a switch-based torus to a node-based torus; possible values are MapMod[0]=4 for NumMapDimesions=1 and MapMod[0]=2 and MapMode[1]=2 for NumMapDimesions=2.

PartSize[3]: size of a partition.

PartStart[3]: start coordinate of a partition.

PartEnd[3]: end coordinate of a partition.

PartWraps[3]: PartWraps[i]=True if a partition wraps in dimension i.

NodeInUse[TorusSize[0],TorusSize[1],TorusSize[2]]: NodeInUse[i,j,k] indicates a state of a node 115; possible values include NODE_IN_USE (node 115 assigned to another job 150), NODE_NOT_IN_USE (node 115 available), and NODE_ON_HOLD (a temporary state used when assigning nodes 115 to a job 150).

FreeY[TorusSize[0],TorusSize[1],TorusSize[2]]: FreeY[i,j,k] indicates a number of free nodes 115 in line {i,j,k} through {i,TorusSize[1]−1,k} inclusively. A scan routine uses FreeY.

FreeX[TorusSize[0],TorusSize[1],TorusSize[2]]: FreeX[i,j,k] indicates a number of free nodes in the line {i,j,k} through {TorusSize[0]−1j,k} inclusively. A scan routine uses FreeX.

NumberOfTries: a number of Try structures constructed for a spatial request.

TryList[NumberOfTries]: a list of Try structures for a spatial request.

NumberOfFits: a number of meshes constructed for a compact request.

Fit[NumberOfFits,3]: a list of meshes constructed for a compact request.
  Fit[i,0]=size of mesh i in an x dimension.
  Fit[i,1]=size of mesh i in ay dimension.
  Fit[i,2]=size of mesh i in a z dimension.

NumMaxDistances: a number of unique maximum distances in Fit.

MaxDistance[NumMaxDistances,2]: a list of unique maximum distances in Fit. For any 0≦i<NumMaxDistances, MaxDistance[i,0]=index into Fit of a first mesh with maximum distance=MaxDistance[I,1].

NumFreeMeshes: a number of free meshes in grid 110. A free mesh is a mesh including only free nodes 115.

FreeMesh[NumFreeMeshes]: an array of FreeMesh structures.

AssignedNodeList[RequestedNodes,3]: a list of nodes 115 assigned to a job 115 in MPI rank order.

Cluster management engine 130, such as through scheduler 515, may be further operable to perform efficient checkpointing. Restart dumps typically comprise over seventy-five percent of data written to disk. This I/O is often done so that processing is not lost to a platform failure. Based on this, a file system's I/O can be segregated into two portions: productive I/O and defensive I/O. Productive I/O is the writing of data that the user calls for to do science such as, for example, visualization dumps, traces of key physics variables over time, and others. Defensive I/O is performed to manage a large simulation run over a substantial period of time. Accordingly, increased I/O bandwidth greatly reduces the time and risk involved in check-pointing.

Returning to engine 130, local memory 520 comprises logical descriptions (or data structures) of a plurality of features of system 100. Local memory 520 may be stored in any physical or logical data storage operable to be defined, processed, or retrieved by compatible code. For example, local memory 520 may comprise one or more eXtensible Markup Language (XML) tables or documents. The various elements may be described in terms of SQL statements or scripts, Virtual Storage Access Method (VSAM) files, flat files, binary data files, Btrieve files, database files, or comma-separated-value (CSV) files. It will be understood that each element may comprise a variable, table, or any other suitable data structure. Local memory 520 may also comprise a plurality of tables or files stored on one server 102 or across a plurality of servers or nodes. Moreover, while illustrated as residing inside engine 130, some or all of local memory 520 may be internal or external without departing from the scope of this disclosure.

Illustrated local memory 520 includes physical list 521, virtual list 522, group file 523, policy table 524, and job queue 525. But, while not illustrated, local memory 520 may include other data structures, including a job table and audit log, without departing from the scope of this disclosure. Returning to the illustrated structures, physical list 521 is operable to store identifying and physical management information about node 115. Physical list 521 may be a multidimensional data structure that includes at least one record per node 115. For example, the physical record may include fields such as "node," "availability," "processor utilization," "memory utilization," "temperature," "physical location," "address," "boot images," and others. It will be understood that each record may include none, some, or all of the example fields. In one embodiment, the physical record may provide a foreign key to another table, such as, for example, virtual list 522.

Virtual list 522 is operable to store logical or virtual management information about node 115. Virtual list 522 may be a multidimensional data structure that includes at least one record per node 115. For example, the virtual record may include fields such as "node," "availability," "job," "virtual cluster," "secondary node," "logical location," "compatibility," and others. It will be understood that each record may include none, some, or all of the example fields. In one embodiment, the virtual record may include a link to another table such as, for example, group file 523.

Group file 523 comprises one or more tables or records operable to store user group and security information, such as access control lists (or ACLs). For example, each group record may include a list of available services, nodes 115, or jobs for a user. Each logical group may be associated with a business group or unit, a department, a project, a security group, or any other collection of one or more users that are able to submit jobs 150 or administer at least part of system 100. Based on this information, cluster management engine 130 may determine if the user submitting job 150 is a valid user and, if so, the optimum parameters for job execution. Further, group table 523 may associate each user group with a virtual cluster 220 or with one or more physical nodes 115, such as nodes residing within a particular group's domain. This allows each group to have an individual processing space without competing for resources. However, as described above, the shape and size of virtual cluster 220 may be dynamic and may change according to needs, time, or any other parameter.

Policy table 524 includes one or more policies. It will be understood that policy table 524 and policy 524 may be used interchangeably as appropriate. Policy 524 generally stores processing and management information about jobs 150 and/or virtual clusters 220. For example, policies 524 may include any Number of parameters or variables including problem size, problem run time, timeslots, preemption, users' allocated share of node 115 or virtual cluster 220, and such.

Job queue 525 represents one or more streams of jobs 150 awaiting execution. Generally, queue 525 comprises any suitable data structure, such as a bubble array, database table, or pointer array, for storing any Number (including zero) of jobs 150 or reference thereto. There may be one queue 525 associated with grid 110 or a plurality of queues 525, with each queue 525 associated with one of the unique virtual clusters 220 within grid 110.

In one aspect of operation, cluster management engine 130 receives job 150, made up of N tasks which cooperatively solve a problem by performing calculations and exchanging information. Cluster management engine 130 allocates N nodes 115 and assigns each of the N tasks to one particular node 115 using any suitable technique, thereby allowing the problem to be solved efficiently. For example, cluster management engine 130 may utilize job parameters, such as job task placement strategy, supplied by the user. Regardless, cluster management engine 130 attempts to exploit the architecture of server 102, which in turn provides the quicker turnaround for the user and likely improves the overall throughput for system 100.

In one embodiment, cluster management engine 130 then selects and allocates nodes 115 according to any of the following example topologies:

Specified 2D (x,y) or 3D (x,y,z)—Nodes 115 are allocated and tasks may be ordered in the specified dimensions, thereby preserving efficient neighbor to neighbor communication. The specified topology manages a variety of jobs 150 where it is desirable that the physical communication topology match the problem topology allowing the cooperating tasks of job 150 to communicate frequently with neighbor tasks. For example, a request of 8 tasks in a 2×2×2 dimension (2, 2, 2) will be allocated in a cube. For best-fit purposes, 2D allocations can be "folded" into 3 dimensions, while preserving efficient neighbor to neighbor communications. Cluster management engine 130 may be free to allocate the specified dimensional shape in any orientation. For example, a 2×2×8 box may be allocated within the available physical nodes vertically or horizontally Best Fit Cube—cluster management engine 130 allocates N nodes 115 in a cubic volume. This topology efficiently handles jobs 150 allowing cooperating tasks to exchange data with any other tasks by minimizing the distance between any two nodes 115.

Best Fit Sphere—cluster management engine 130 allocates N nodes 115 in a spherical volume. For example, the first task may be placed in the center node 115 of the sphere with the rest of the tasks placed on nodes 115 surrounding the center node 115. It will be understood that the placement order of the remaining tasks is not typically critical. This topology may minimize the distance between the first task and all other tasks. This efficiently handles a large class of problems where tasks 2–N communicate with the first task, but not with each other.

Random—cluster management engine 130 allocates N nodes 115 with reduced consideration for where nodes 115 are logically or physically located. In one embodiment, this topology encourages aggressive use of grid 110 for backfilling purposes, with little impact to other jobs 150.

It will be understood that the prior topologies and accompanying description are for illustration purposes only and may not depict actual topologies used or techniques for allocating such topologies.

Cluster management engine 130 may utilize a placement weight, stored as a job 150 parameter or policy 524 parameter. In one embodiment, the placement weight is a modifier value between 0 and 1, which represents how aggressively cluster management engine 130 should attempt to place nodes 115 according to the requested task (or process) placement strategy. In this example, a value of 0 represents placing nodes 115 only if the optimum strategy (or dimensions) is possible and a value of 1 represents placing nodes 115 immediately, as long as there are enough free or otherwise available nodes 115 to handle the request. Typically, the placement weight does not override administrative policies 524 such as resource reservation, in order to prevent starvation of large jobs 150 and preserve the job throughput of HPC system 100.

The preceding illustration and accompanying description provide an exemplary modular diagram for engine 130 implementing logical schemes for managing nodes 115 and jobs 150. However, this figure is merely illustrative and system 100 contemplates using any suitable combination and arrangement of logical elements for implementing these and other algorithms. Thus, these software modules may include any suitable combination and arrangement of elements for effectively managing nodes 115 and jobs 150. Moreover, the operations of the various illustrated modules may be combined and/or separated as appropriate.

Figure 11:
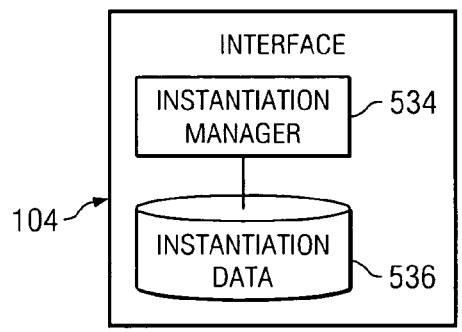
FIG. 11 illustrates an example interface of the HPC system illustrated in FIG. 1.

FIG. 11 illustrates an example interface 104. Interface 104 includes a hardware, software, or embedded logic component or a combination of two or more such components providing an interface between network 106 and HPC server 102. In particular embodiments, interface 104 includes an instantiation manager 534 and instantiation data 536. Instantiation manager 534 includes a hardware, software, or embedded logic component or a combination of two or more such components dynamically instantiating hosts at nodes 115 in response to connection requests from clients 120. In particular embodiments, connection requests from clients 120 are Transmission Control Protocol (TCP) connection requests. In particular embodiments, instantiation manager 534 functions as a router or an interface to a router that maps host names and port numbers advertised externally with respect to HPC server 102 to host names and port numbers internal to HPC server 102. Instantiation manager 534 may interact with one or more components of cluster management engine 130 (such as, for example, physical manager 505, virtual manager 510, or both) to dynamically instantiate one or more hosts at one or more nodes 115 in response to a connection request from a client 120, according to particular needs.

Instantiation data 536 includes data for instantiating hosts at nodes 115 in response to connection requests from clients 120. In particular embodiments, instantiation data 536 includes one or more lists of services advertised externally with respect to HPC server 102. Reference to a service encompasses an application, where appropriate, and vice versa, where appropriate. Reference to a list of services advertised externally with respect to HPC server 102 may encompass a routing table, where appropriate, and vice versa, where appropriate. In particular embodiments, instantiation manager 534 sets up and maintains such routing tables. In particular embodiments, an entry in a list of services advertised externally with respect to HPC server 102 specifies (1) a service, (2) a host name and a port number advertised externally with respect to HPC server 102 corresponding to the service, and (3) a host name and a port number internal to HPC server 102 corresponding to a host that, when instantiated, provides the service. The entry may also specify rules, conditions, or both governing when the host should be made available, when instantiation of the host should take place, and when the host should be made unavailable. As an example and not by way of limitation, a host may provide a web server. If instantiation manager 534 receives no HTTP requests at an HTTP port corresponding to the web server during business hours, the host may remain uninstantiated during business hours and one or more resources (such as nodes 115 in grid 110) that the host would use if instantiated may be available for other hosts, services, or both. If a user at a client 120 uses a web browser to access the web server during business hours, instantiation manager 534 may instantiate the host to provide the web server to client 120. If the user at client 120 uses a web browser to access the web server outside business hours, instantiation manager 534 blocks the HTTP port corresponding to the web server to prevent the host from providing the web server to client 120.

In particular embodiments, instantiation data 536 includes one or more boot images for instantiating hosts at nodes 115 to provide services. In particular embodiments, instantiation data 536 also includes one or more file systems for instantiating hosts at nodes 115 to provide services. In particular embodiments, instantiation data 536 also includes one or more OS configuration files for instantiating hosts at nodes 115 to provide services. As an example and not by way of limitation, in response to instantiation manager 534 receiving a connection request from a client 120 specifying an port number advertised externally with respect to HPC server 102 that corresponds to a service advertised externally with respect to HPC server 102, instantiation manager 534 may boot an available node 115 in grid 110 using a boot image and one or more file systems for the service to initialize a host for the service at node 115. Instantiation manager 534 may also update one or more of local routing tables and one or more OS configuration files to route IP traffic from client 120 to node 115. In particular embodiments, to decrease time requirements associated with HPC server 102 responding to a connection request from a client 120, instantiation manager 534 spoofs an IP/MAC address of a target host and starts a TCP/IP connection sequence on behalf of the target host. The TCP/IP connection sequence between client 120 and instantiation manager 534 takes place while the target host is booting.

In particular embodiments, instantiation manager 534 tracks whether each host at HPC server 102 is active or inactive. In particular embodiments, instantiation manager 534 also controls whether each host at HPC server 102 is active or inactive. In particular embodiments, instantiation manager 534 may determine whether a service should be available. If instantiation manager 534 determines that a service should no longer be available, instantiation manager 534 shuts down, idles, or otherwise makes unavailable one or more nodes 115 at which instantiation manager 534 instantiated a host to provide the service and updates one or more routing tables accordingly.

Figure 12:
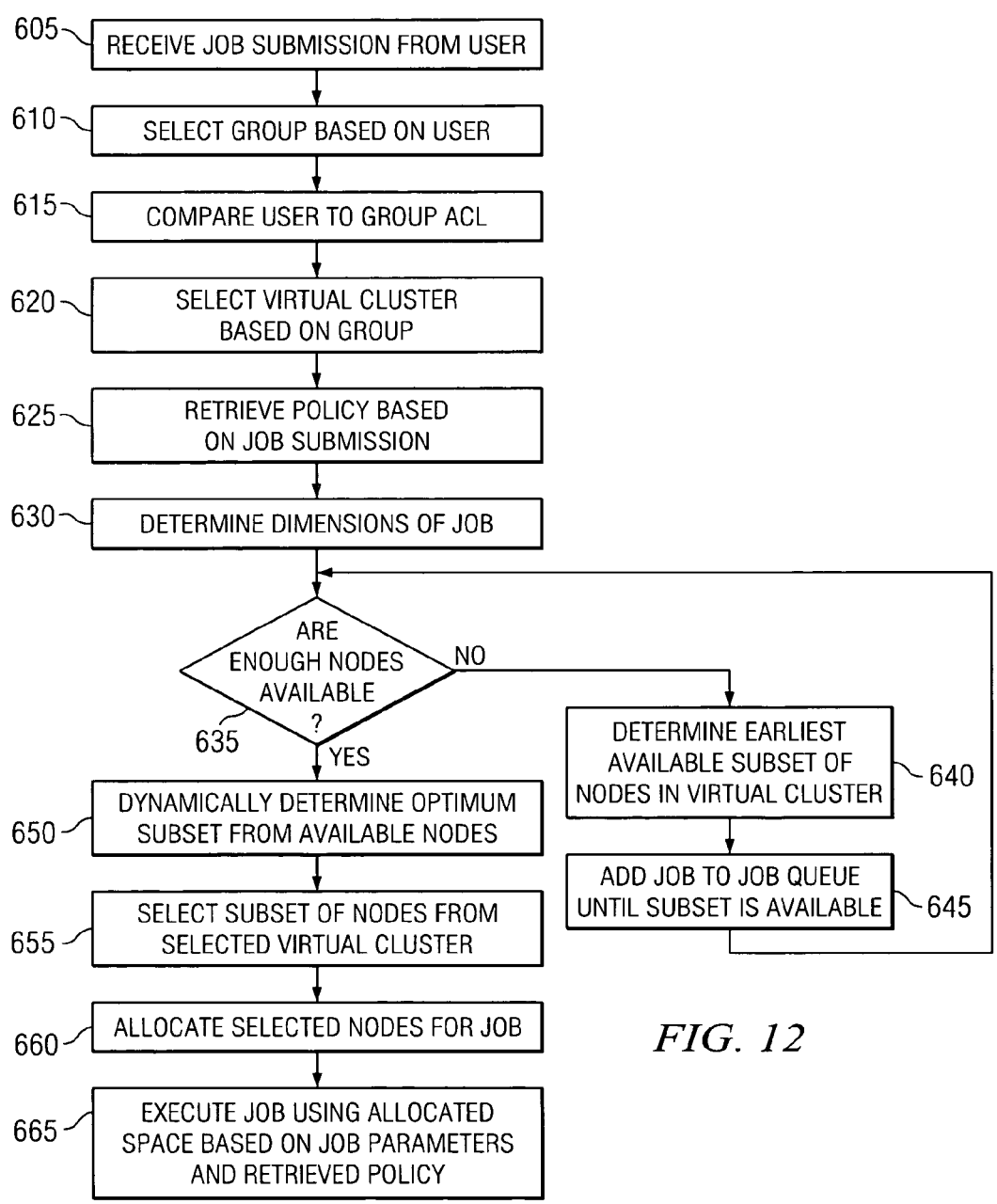
FIG. 12 is a flowchart illustrating a method for submitting a batch job in accordance with the high-performance computing system of FIG. 1.

FIG. 12 is a flowchart illustrating an example method 600 for dynamically processing a job submission in accordance with one embodiment of the present disclosure. Generally, FIG. 12 describes method 600, which receives a batch job submission, dynamically allocates nodes 115 into a job space 230 based on the job parameters and associated policies 524, and executes job 150 using the allocated space. The following description focuses on the operation of cluster management module 130 in performing method 600. But system 100 contemplates using any appropriate combination and arrangement of logical elements implementing some or all of the described functionality, so long as the functionality remains appropriate.

Method 600 begins at step 605, where HPC server 102 receives job submission 150 from a user. As described above, in one embodiment the user may submit job 150 using client 120. In another embodiment, the user may submit job 150 directly using HPC server 102. Next, at step 610, cluster management engine 130 selects group 523 based upon the user. Once the user is verified, cluster management engine 130 compares the user to the group access control list (ACL) at step 615. But it will be understood that cluster management engine 130 may use any appropriate security technique to verify the user. Based upon determined group 523, cluster management engine 130 determines if the user has access to the requested service. Based on the requested service and hostname, cluster management engine 130 selects virtual cluster 220 at step 620. Typically, virtual cluster 220 may be identified and allocated prior to the submission of job 150. But, in the event virtual cluster 220 has not been established, cluster management engine 130 may automatically allocate virtual cluster 220 using any of the techniques described above. Next, at step 625, cluster management engine 130 retrieves policy 524 based on the submission of job 150. In one embodiment, cluster management engine 130 may determine the appropriate policy 524 associated with the user, job 150, or any other appropriate criteria. Cluster management engine 130 then determines or otherwise calculates the dimensions of job 150 at step 630. It will be understood that the appropriate dimensions may include length, width, height, or any other appropriate parameter or characteristic. As described above, these dimensions are used to determine the appropriate job space 230 (or subset of nodes 115) within virtual cluster 220. After the initial parameters have been established, cluster management 130 attempts to execute job 150 on HPC server 102 in steps 635 through 665.

At decisional step 635, cluster management engine 130 determines if there are enough available nodes to allocate the desired job space 230, using the parameters already established. If there are not enough nodes 115, then cluster management engine 130 determines the earliest available subset 230 of nodes 115 in virtual cluster 220 at step 640. Then, cluster management engine 130 adds job 150 to job queue 125 until the subset 230 is available at step 645. Processing then returns to decisional step 635. Once there are enough nodes 115 available, then cluster management engine 130 dynamically determines the optimum subset 230 from available nodes 115 at step 650. It will be understood that the optimum subset 230 may be determined using any appropriate criteria, including fastest processing time, most reliable nodes 115, physical or virtual locations, or first available nodes 115. At step 655, cluster management engine 130 selects the determined subset 230 from the selected virtual cluster 220. Next, at step 660, cluster management engine 130 allocates the selected nodes 115 for job 150 using the selected subset 230. According to one embodiment, cluster management engine 130 may change the status of nodes 115 in virtual node list 522 from "unallocated" to "allocated". Once subset 230 has been appropriately allocated, cluster management engine 130 executes job 150 at step 665 using the allocated space based on the job parameters, retrieved policy 524, and any other suitable parameters. At any appropriate time, cluster management engine 130 may communicate or otherwise present job results 160 to the user. For example, results 160 may be formatted and presented to the user via GUI 126.

FIG. 13 is a flowchart illustrating an example method 700 for dynamically backfilling a virtual cluster 220 in grid 110 in accordance with one embodiment of the present disclosure. At a high level, method 700 describes determining available space in virtual cluster 220, determining the optimum job 150 that is compatible with the space, and executing the determined job 150 in the available space. The following description will focus on the operation of cluster management module 130 in performing this method. But, as with the previous flowchart, system 100 contemplates using any appropriate combination and arrangement of logical elements implementing some or all of the described functionality.

Method 700 begins at step 705, where cluster management engine 130 sorts job queue 525. In the illustrated embodiment, cluster management engine 130 sorts the queue 525 based on the priority of jobs 150 stored in the queue 525. But it will be understood that cluster management engine 130 may sort queue 525 using any suitable characteristic such that the appropriate or optimal job 150 will be executed. Next, at step 710, cluster management engine 130 determines the Number of available nodes 115 in one of the virtual clusters 220. Of course, cluster management engine 130 may also determine the Number of available nodes 115 in grid 110 or in any one or more of virtual clusters 220. At step 715, cluster management engine 130 selects first job 150 from sorted job queue 525. Next, cluster management engine 130 dynamically determines the optimum shape (or other dimensions) of selected job 150 at 720. Once the optimum shape or dimension of selected job 150 is determined, then cluster management engine 130 determines if it can backfill job 150 in the appropriate virtual cluster 220 in steps 725 through 745.

At decisional step 725, cluster management engine 130 determines if there are enough nodes 115 available for the selected job 150. If there are enough available nodes 115, then at step 730 cluster management engine 130 dynamically allocates nodes 115 for the selected job 150 using any appropriate technique. For example, cluster management engine 130 may use the techniques describes in FIG. 6. Next, at step 735, cluster management engine 130 recalculates the Number of available nodes in virtual cluster 220. At step 740, cluster management engine 130 executes job 150 on allocated nodes 115. Once job 150 has been executed (or if there were not enough nodes 115 for selected job 150), then cluster management engine 130 selects the next job 150 in the sorted job queue 525 at step 745 and processing returns to step 720. It will be understood that while illustrated as a loop, cluster management engine 130 may initiate, execute, and terminate the techniques illustrated in method 700 at any appropriate time.

FIG. 14 is a flowchart illustrating an example method 800 for dynamically managing failure of a node 115 in grid 110 in accordance with one embodiment of the present disclosure. At a high level, method 800 describes determining that node 115 failed, automatically performing job recovery and management, and replacing the failed node 115 with a secondary node 115. The following description will focus on the operation of cluster management module 130 in performing this method. But, as with the previous flowcharts, system 100 contemplates using any appropriate combination and arrangement of logical elements implementing some or all of the described functionality.

Method 800 begins at step 805, where cluster management engine 130 determines that node 115 has failed. As described above, cluster management engine 130 may determine that node 115 has failed using any suitable technique. For example, cluster management engine 130 may pull nodes 115 (or agents 132) at various times and may determine that node 115 has failed based upon the lack of a response from node 115. In another example, agent 132 existing on node 115 may communicate a "heartbeat" and the lack of this "heartbeat" may indicate node 115 failure. Next, at step 810, cluster management engine 130 removes the failed node 115 from virtual cluster 220. In one embodiment, cluster management engine 130 may change the status of node 115 in virtual list 522 from "allocated" to "failed". Cluster management engine 130 then determines if a job 150 is associated with failed node 115 at decisional step 815. If there is no job 150 associated with node 115, then processing ends. As described above, before processing ends, cluster management engine 130 may communicate an error message to an administrator, automatically determine a replacement node 115, or any other suitable processing. If there is a job 150 associated with the failed node 115, then the cluster management engine 130 determines other nodes 115 associated with the job 150 at step 820. Next, at step 825, cluster management engine 130 kills job 150 on all appropriate nodes 115. For example, cluster management engine 130 may execute a kill job command or use any other appropriate technique to end job 150. Next, at step 830, cluster management engine 130 de-allocates nodes 115 using virtual list 522. For example, cluster management engine 130 may change the status of nodes 115 in virtual list 522 from "allocated" to "available". Once the job has been terminated and all appropriate nodes 115 de-allocated, then cluster management engine 130 attempts to re-execute the job 150 using available nodes 115 in steps 835 through 850.

At step 835, cluster management engine 130 retrieves policy 524 and parameters for the killed job 150 at step 835. Cluster management engine 130 then determines the optimum subset 230 of nodes 115 in virtual cluster 220, at step 840, based on the retrieved policy 524 and the job parameters. Once the subset 230 of nodes 115 has been determined, then cluster management engine 130 dynamically allocates the subset 230 of nodes 115 at step 845. For example, cluster management engine 130 may change the status of nodes 115 in virtual list 522 from "unallocated" to "allocated". It will be understood that this subset of nodes 115 may be different from the original subset of nodes that job 150 was executing on. For example, cluster management engine 130 may determine that a different subset of nodes is optimal because of the node failure that prompted this execution. In another example, cluster management engine 130 may have determined that a secondary node 115 was operable to replace the failed node 115 and the new subset 230 is substantially similar to the old job space 230. Once the allocated subset 230 has been determined and allocated, then cluster management engine 130 executes job 150 at step 850.

The preceding flowcharts and accompanying description illustrate exemplary methods 600, 700, and 800. In short, system 100 contemplates using any suitable technique for performing these and other tasks. Accordingly, many of the steps in this flowchart may take place simultaneously and/or in different orders than as shown. Moreover, system 100 may use methods with additional steps, fewer steps, and/or different steps, so long as the methods remain appropriate.

Figure 15:
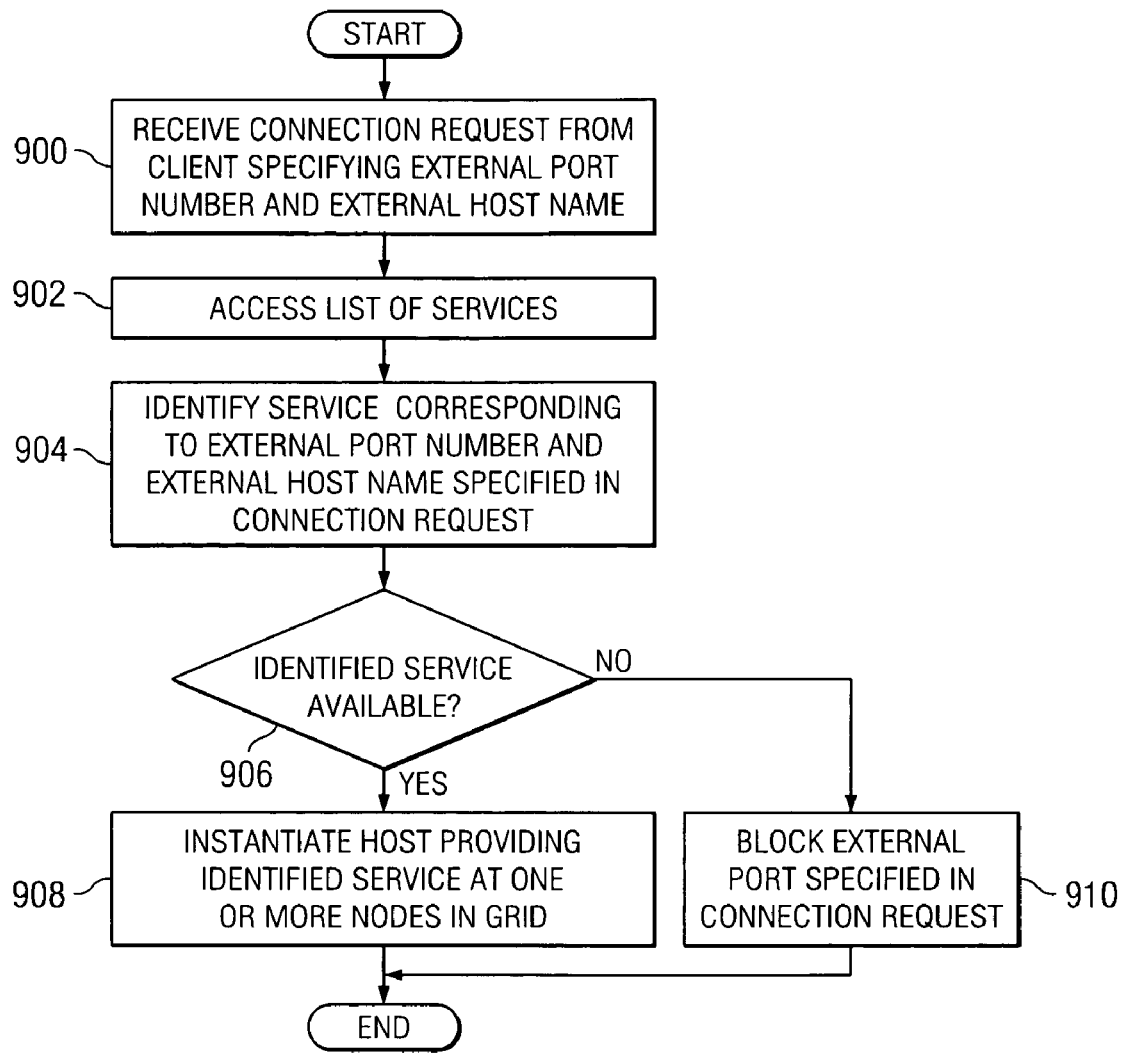
FIG. 15 illustrates an example method for on-demand instantiation in the HPC system illustrated in FIG. 1.

FIG. 15 illustrates an example method for on-demand instantiation in HPC system 100. The method begins at step 900, where interface 104 receives a connection request from a client 120 specifying a port number and a host name advertised externally with respect to HPC server 102. At step 902, in response to the connection request, instantiation manager 534 accesses instantiation data 536 providing a list of services advertised externally with respect to HPC server 102. At step 904, instantiation manager 534 uses the list of services to identify a service corresponding to the port number and the host name specified in the connection request. At step 906, instantiation manager 534 determines, according to the list of services, whether the identified service is available to client 120. As described above, whether the identified service is available to client 120 may depend on a time associated with the connection request, an identity of a user at client 120, or other aspect of the connection request. At step 906, if the identified service is available to client 120, the method proceeds to step 908. At step 908, instantiation manager 534 uses instantiation data 536 indicating a host name and a port number internal to HPC server 102 corresponding to the identified service to instantiate the host at one or more nodes 115 in grid 110 to provide the identified service to client 120. As described above, instantiation manager 534 may also use instantiation data 536 including a boot image, a file system, and an OS configuration to instantiate the host at nodes 115, at which point the method ends. At step 906, if the identified service is unavailable to client 120, the method proceeds to step 910. At step 910, instantiation manager 534 blocks the port specified in the connection request to prevent client 120 from accessing the identified service, at which point the method ends. Although particular steps in the method illustrated in FIG. 15 have been illustrated and described as occurring in a particular order, any suitable steps in the method illustrated in FIG. 15 may occur in any suitable order.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-readable medium comprising software that, when executed by a processor, operates to:
   receive a connection request from a client specifying a first port number and a first host name, the first port number and the first host name advertised externally with respect to a plurality of nodes, each node comprising a switching fabric integrated to a card and at least two processors integrated to the card;
   identify a service at the plurality of nodes, the identified service corresponding to the first port number and the first host name;
   determine whether the identified service is available based on one or more aspects of the connection request and one or more rules indicating whether the service is available;
   if the identified service is determined to be available based on one or more aspects the connection request and one or more rules indicating whether the service is available, instantiate a host providing the identified service at one or more nodes in the plurality of nodes, wherein instantiating the host comprises using a boot image, a file system, and an operating system (OS) configuration file corresponding to the identified service to boot at least one node in the plurality of nodes in response to the received connection request;
   cause a first node of the plurality of nodes to stop providing a second service in response to not detecting one or more requests related to the second service;
   cause the first node of the plurality of nodes to provide a third service, the third service being distinct from the second service, after causing the first node to stop providing the second service; and
   in response to receiving a request relating to the second service, causing a second node of the plurality of nodes to provide the second service.

2. The computer-readable medium of claim 1, wherein the connection request is a Transmission Control Protocol (TCP) connection request or a User Datagram Protocol (UDP) connection request.

3. The computer-readable medium of claim 1, wherein the software, when executed by the processor, further operates to:
   access a list of services at the plurality of nodes comprising a plurality of entries that each specify a service and one or more rules indicating whether the service is available; and
   determine, according to the list of services, whether the identified service is available.

4. The computer-readable medium of claim 3, wherein the rules indicate whether the service is available based on a time associated with the connection request from the client.

5. The computer-readable medium of claim 4, wherein the software further operates when executed by the processor to, if the identified service is unavailable based on the time associated with the connection request, block a port on the plurality of nodes corresponding to the first port number to prevent the client from accessing the identified service.

6. The computer-readable medium of claim 1, wherein the software, when executed by the processor, further operates to:
access the boot image, the file system, and the OS configuration file at the plurality of nodes corresponding to the host providing the identified service at one or more nodes in the plurality of nodes; and
use the boot image, the file system and the OS configuration file to instantiate the host providing the identified service at one or more nodes in the plurality of nodes in response to the received connection request.

7. The computer-readable medium of claim 1, wherein the identified service is a web server.

8. The computer-readable medium of claim 1, wherein the software, when executed by the processor, further operates to spoof an address of the host providing the identified service at one or more nodes in the cluster and initiate a connection sequence on behalf of the host while the host is booting, wherein the booting is performed in response to the received connection request.

9. The computer-readable medium of claim 1, wherein:
the address is an Internet Protocol over Media Access Control (IP/MAC) address; and
the connection sequence is a Transmission Control Protocol over IP (TCP/IP) connection sequence or a USER Datagram Protocol (USP) over IP (USP/IP) connection sequence.

10. The computer-readable medium of claim 1, wherein the plurality of nodes comprises nodes coupled to each other according to a topology comprising a three dimensional torus.

11. The computer-readable medium of claim 1, wherein the software, when executed by the processor, further operates to access a list of services at the plurality of nodes comprising a plurality of entries, at least one entry specifying:
the service;
the first port number and the first host name advertised externally with respect to the plurality of nodes; and
a port number and a host name internal to the plurality of nodes that correspond to a host that, when executed at one or more nodes in the plurality of nodes, provides the service.

12. A method comprising:
receiving a connection request form a client specifying a first port number and a first host name, the first port number and the first host name advertised externally with respect to a plurality of nodes, each node comprising a switching fabric integrated to a card and at least two processors integrated to the card;
identifying a service at the plurality of nodes, the identified service corresponding to the first port number and the first host name;
determining whether the identified service is available based on one or more aspects of the connection request and one or more rules indicating whether the service is available;
if the identified service is determined to be available based on one or more aspects the connection request and one or more rules indicating whether the service is available, instantiating a host providing the identified service at one or more nodes in the plurality of nodes, wherein instantiating the host comprises using a boot image, a file system, and an operating system (OS) configuration file corresponding to the identified service to boot at least one node in the plurality of nodes in response to the received connection request;
causing a first node of the plurality of nodes to stop providing a second service in response to not detecting one or more requests related to the second service;
causing the first node of the plurality of nodes to provide a third service, the third service being distinct from the second service, after causing the first node to stop providing the second service; and
in response to receiving a request relating to the second service, causing a second node of the plurality of nodes to provide the second service.

13. The method of claim 12, wherein the connection request is a Transmission Control Protocol (TCP) connection request or a User Datagram Protocol (UDP) connection request.

14. The method of claim 12, further comprising:
accessing a list of services at the plurality of nodes comprising a plurality of entries that each specify a service and one or more rules indicating whether the service is available; and
determining according to the list of services, whether the identified service is available.

15. The method of claim 14, wherein the rules indicate whether the service is available based on a time associated with the connection request from the client.

16. The method of claim 15, further comprising, if the identified service is unavailable based on the time associated with the connection request, blocking a port on the plurality of nodes corresponding to the first port number to prevent the client from accessing the identified service.

17. The method of claim 12, further comprising:
accessing the boot image, the file system, and the OS configuration file at the plurality of nodes corresponding to the host providing the identified service at one or more nodes in the plurality of nodes; and
using the boot image, the file system and the OS configuration file to instantiate the host providing the identified service at one or more nodes the plurality of nodes in response to the received connection request.

18. The method of claim 12, wherein the identified service is a web server.

19. The method of claim 12, further comprising spoofing an address of the host providing the identified service at one or more nodes in the plurality of nodes and initiating a connection sequence on behalf of the host while the host is booting, wherein the booting is performed in response to the received connection request.

20. The method of claim 12, wherein:
the address is an Internet Protocol over Media Access Control (IP/MAC) address; and the connection sequence is a Transmission Control Protocol over IP (TCP/IP) connection sequence or a User Datagram Protocol (USP) over IP (USP/IP) connection sequence.

21. The method of claim 12, wherein the plurality of nodes comprises nodes coupled to each other according to a topology comprising a three dimensional torus.

22. The method of claim 12, further comprising accessing a list of services at the plurality of nodes comprising a plurality of entries, at least one entry specifying:
the service;
the first port number and the first host name advertised externally with respect to the plurality of nodes; and
a port number and a host name internal to the plurality of nodes that correspond to a host that, when executed at one or more nodes in the cluster, provides the service.

23. A system, comprising:
a memory that stores a list of services at a plurality of nodes, each node comprising a switching fabric integrated to a card and at least two processors integrated to the card;
at least one processor that:
receives a connection request from a client specifying a first port number and a first host name, the first port number and the first host name advertised externally with respect to the plurality of nodes;
identifies a service at the plurality of nodes, the identified service corresponding to the first port number and the first host name;
determines whether the identified service is available based on one or more aspects of the connection request and one or more rules indicating whether the service is available; and
if the identified service is determined to be available based on one or more aspects of the connection request and one or more rules indicating whether the service is available, instantiates a host providing the identified service at one or more nodes in the plurality of nodes, wherein instantiating the host comprises using a boot image, a file system, and an operating system (OS) configuration file corresponding to the identified service to boot at least one node in the plurality of nodes in response to the received connection request;
causes a first node of the plurality of nodes to stop providing a second service in response to not detecting one or more requests related to the second service;
causes the first node of the plurality of nodes to provide a third service, the third service being distinct from the second service, after causing the first node to stop providing the second service; and
in response to receiving a request relating to the second service, causing a second node of the plurality of nodes to provide the second service.

24. The system of claim 23, wherein the connection request is a Transmission Control Protocol (TCP) connection request or a User Datagram Protocol (USP) connection request.

25. The system of claim 23, wherein if the identified service is unavailable based on a time associated with the connection request, the at least one processor blocks a port on the plurality of nodes corresponding to the first port number to prevent the client from accessing the identified service.

26. The system of claim 23, wherein at least one processor:
accesses the boot image, the file system, and the OS configuration file at the plurality of nodes corresponding to the host providing the identified service at one or more nodes in the plurality of nodes; and
uses the boot image, the file system and the OS configuration file to instantiate the host providing the identified service at one or more nodes in the plurality of nodes in response to the received connection request.

27. The system of claim 23, wherein the plurality of nodes comprises nodes coupled to each other according to a topology comprising a three dimensional torus.

28. The system of claim 23, wherein the at least one processor accesses the list of services, the list of services comprising a plurality of entries, at least one entry specifying:
the service;
the first port number and the first host name advertised externally with respect to the plurality of nodes; and
a port number and a host name internal to the plurality of nodes that correspond to a host that, when executed at one or more nodes in the cluster, provides the service.

29. The system of claim 23, wherein at least one processor operates to spoof an address of the host providing the identified service at one or more nodes in the cluster and initiate a connection sequence on behalf of the host while the host is booting, wherein the booting is performed in response to the received connection request.

* * * * *